[19] United States Patent
Nagai et al.

[11] Patent Number: 5,445,045
[45] Date of Patent: Aug. 29, 1995

[54] ACTUATOR AND ACTUATOR ARRANGEMENT

[75] Inventors: Shigekazu Nagai; Akio Saitoh; Toru Sugiyama; Masahisa Hasegawa, all of Ibaraki, Japan

[73] Assignee: SMC Kabushiki Kaisha, Tokyo, Japan

[21] Appl. No.: 261,881

[22] Filed: Jun. 17, 1994

Related U.S. Application Data

[60] Continuation of Ser. No. 80,949, Jun. 24, 1993, abandoned, which is a division of Ser. No. 922,986, Jul. 31, 1992, Pat. No. 5,234,386.

[30] Foreign Application Priority Data

| | | |
|---|---|---|
| Aug. 1, 1991 [JP] | Japan | 3-193269 |
| Sep. 9, 1991 [JP] | Japan | 3-229185 |
| Dec. 28, 1991 [JP] | Japan | 3-360632 |
| Dec. 28, 1991 [JP] | Japan | 3-360633 |

[51] Int. Cl.$^6$ ............ B25J 9/02; B25J 9/08; F16H 25/20
[52] U.S. Cl. .............. 74/490.09; 74/89.15; 74/89.21; 92/88; 403/170; 403/174; 901/16
[58] Field of Search ........... 74/89.15, 89.21, 479 PH, 74/490.09; 92/88; 403/169, 170, 174, 178; 901/16

[56] References Cited

U.S. PATENT DOCUMENTS

| | | | |
|---|---|---|---|
| 3,969,031 | 7/1976 | Kroopp | 403/178 |
| 4,921,471 | 5/1990 | Hosoi et al. | 474/101 |
| 4,986,797 | 1/1991 | Nemirovsky | 474/101 |
| 4,993,997 | 2/1991 | Stuhler | 474/101 X |
| 5,183,377 | 2/1993 | Becker et al. | 901/16 X |
| 5,234,386 | 8/1993 | Nagai et al. | 474/148 |

FOREIGN PATENT DOCUMENTS

| | | |
|---|---|---|
| 0340751 | 11/1989 | European Pat. Off. |
| 3336496 | 4/1985 | Germany |
| 3930676 | 3/1991 | Germany |

OTHER PUBLICATIONS

Brochure Deutsche Star, pp. 1-24, Apr. 1, 1991.
Patent Abstracts of Japan, vol. 8, No. 9 (M-268)(1446), Jan. 14, 1984, & JP-A 58-171-245, Oct. 7, 1983, Toshihiko Fujita, "Slide Unit".

*Primary Examiner*—Allan D. Herrmann
*Attorney, Agent, or Firm*—Oblon, Spivak, McClelland, Maier & Neustadt

[57] ABSTRACT

Disclosed is an actuator having a frame in which a drive source and a slider displaced under the action of the drive source are held, and an actuator arrangement comprising a plurality of actuators connected to each other by connecting devices. A beam member, which constitutes the frame, has a concave portion defined in a side thereof and the drive source is held in the concave portion. A slider base is held in the concave portion and includes the slider displaced along the concave portion. A cover is used to cover the concave portion defined in the beam member. The beam member has grooves defined in respective outer sides thereof, which have substantially T-shaped cross sections and enable other beam members to be mounted to the beam member. The grooves are defined along the longitudinal direction thereof so as to be substantially identical in structure to one another. According to the above construction, either other beam members or the actuators can be connected to one another by means of the grooves so as to assemble a desired actuator arrangement having a desired shape, thereby making it possible to place the actuator arrangement on a production line in a factory.

10 Claims, 43 Drawing Sheets

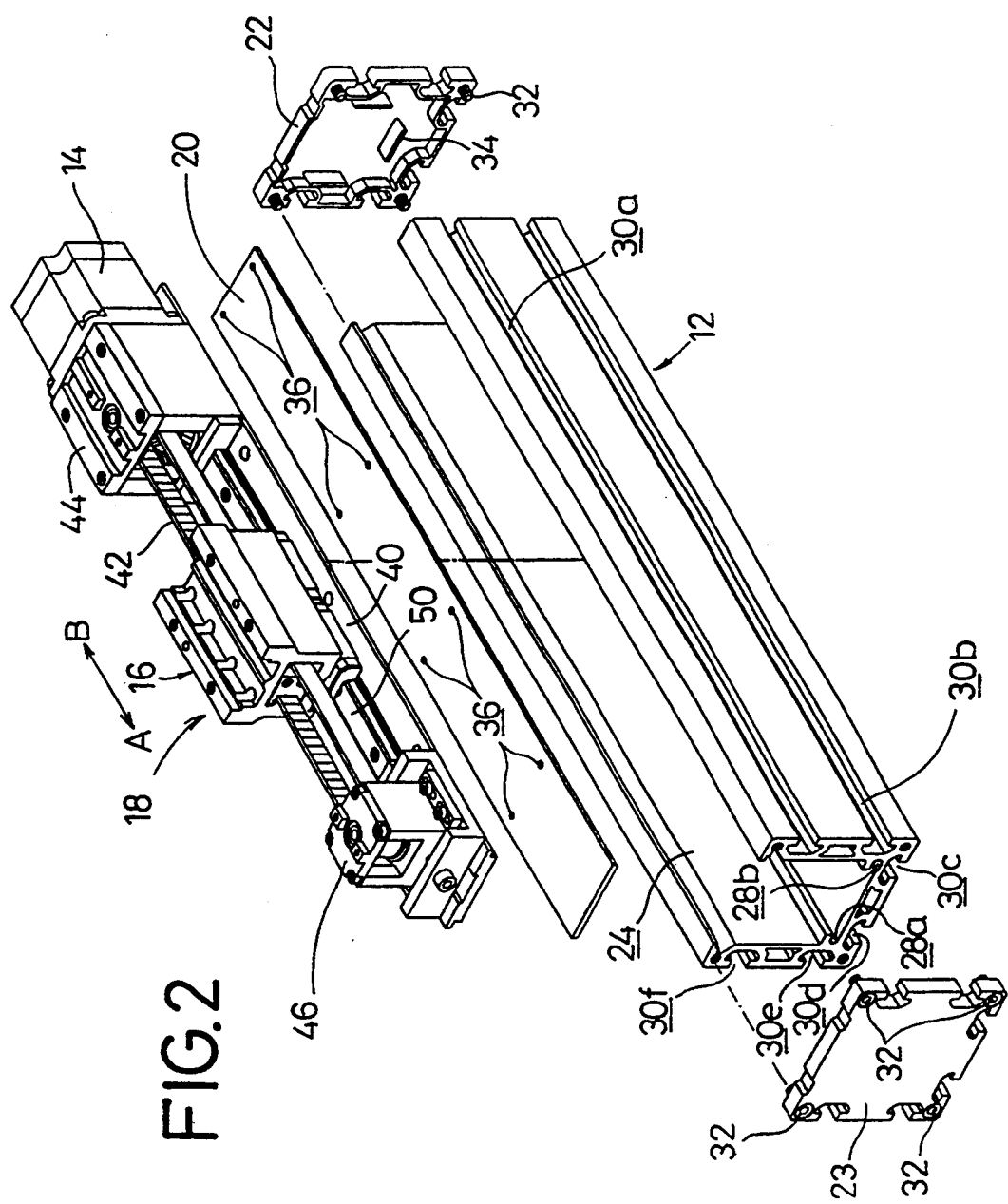

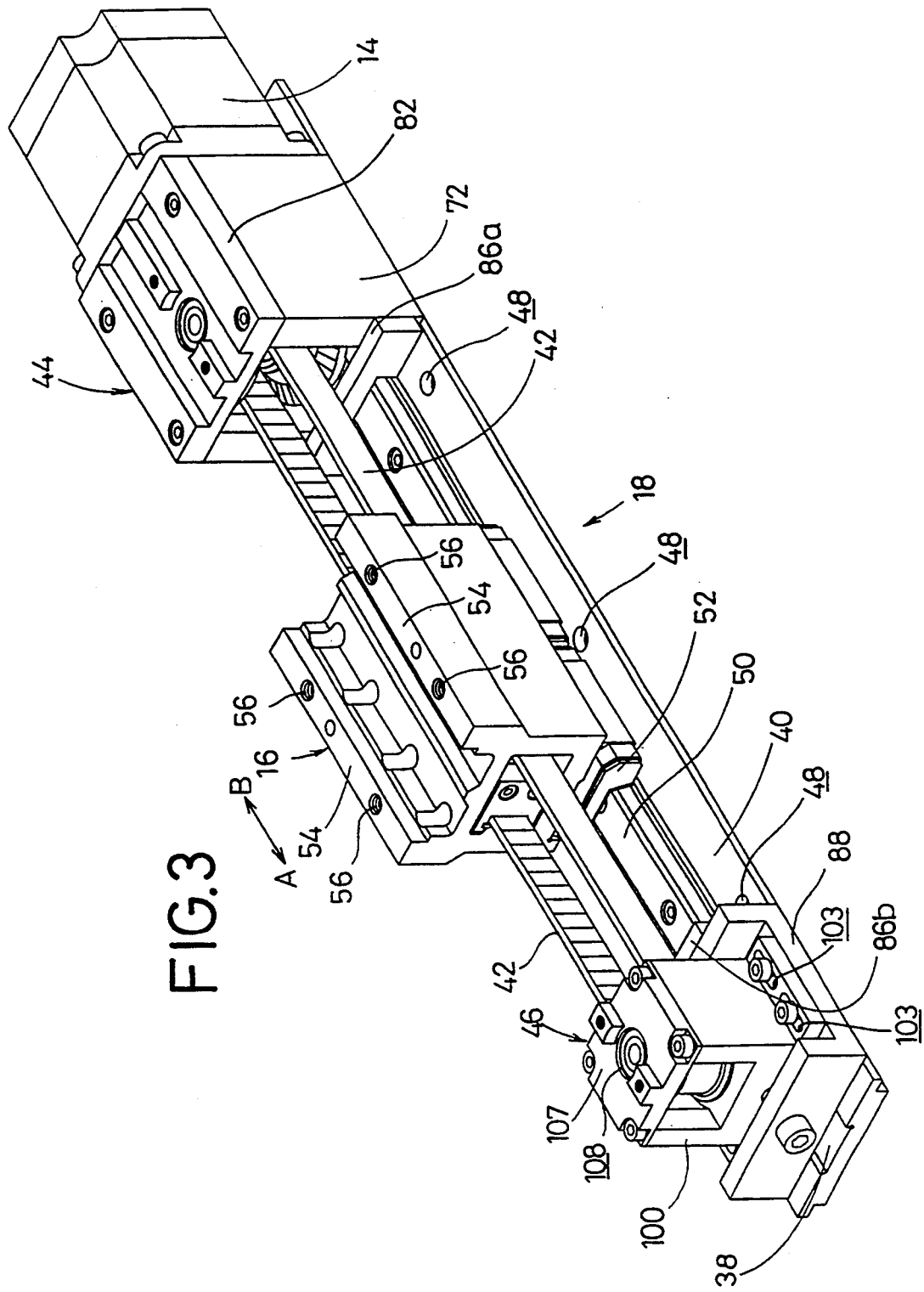

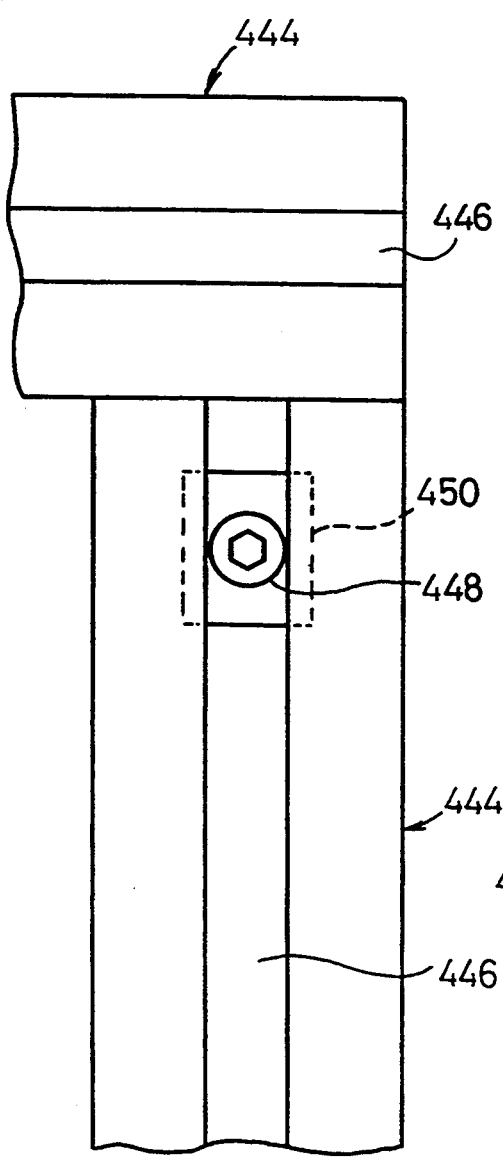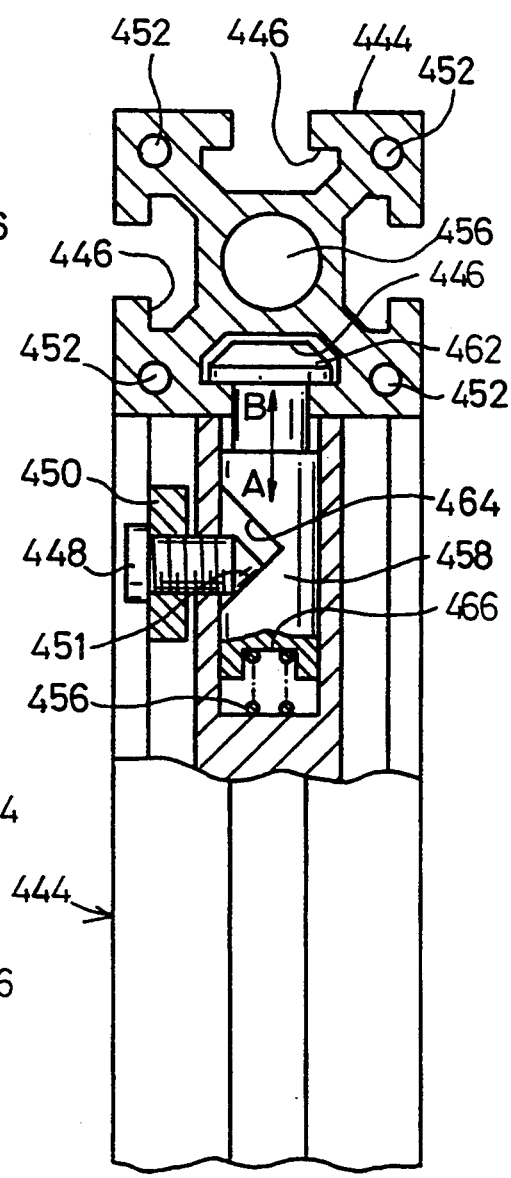

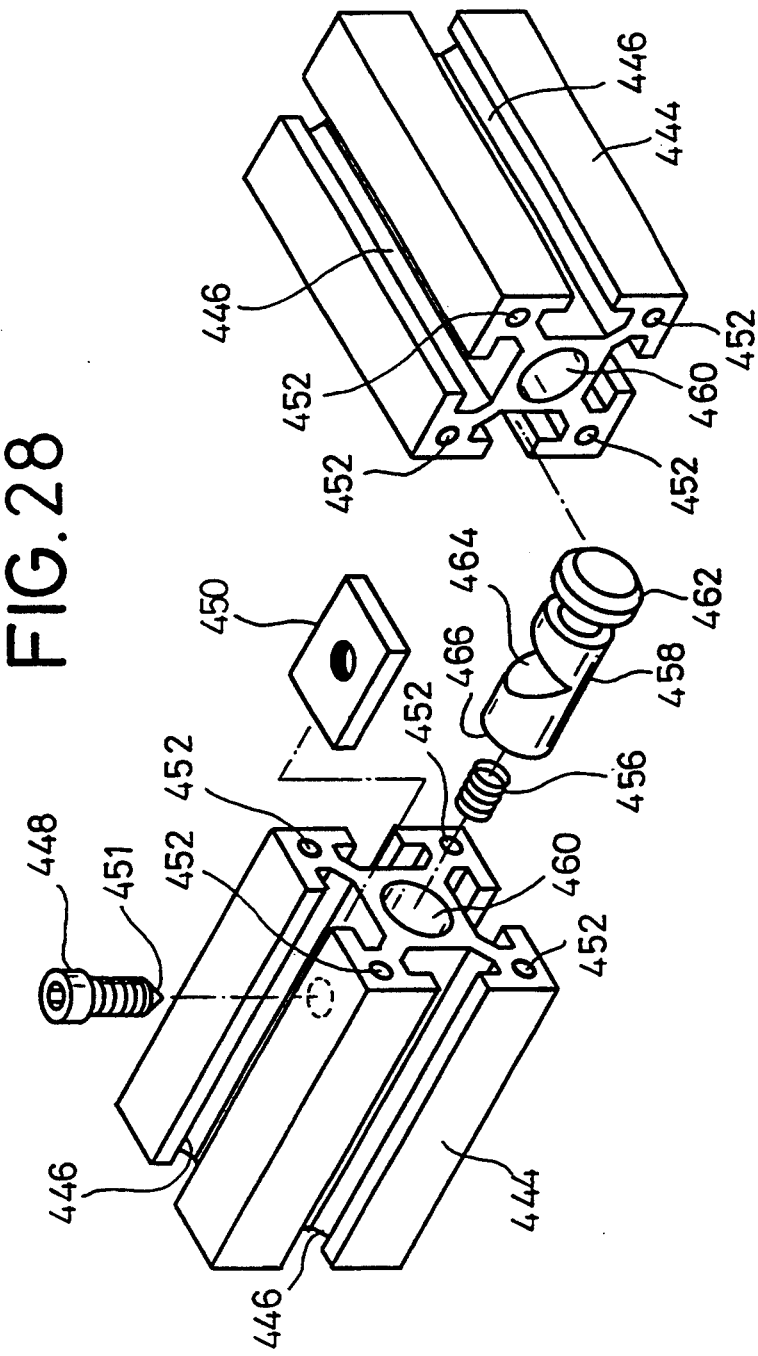

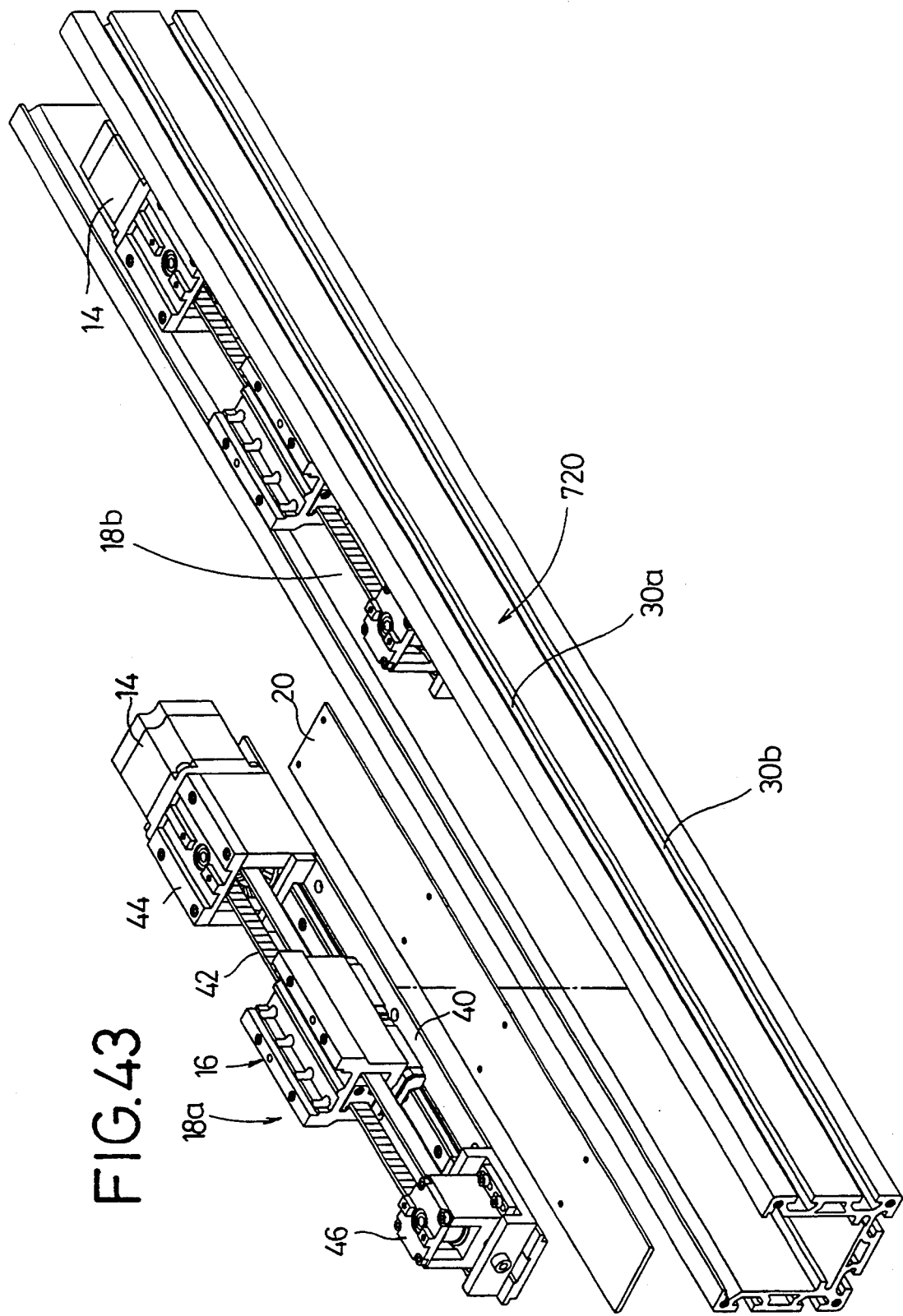

ACTUATOR AND ACTUATOR ARRANGEMENT

This application is a Continuation of application Ser. No. 08/080,949, filed on Jun. 24, 1993, now abandoned, which is a divisional of Ser. No. 07/922,986, filed on Jul. 31, 1992, now U.S. Pat. No. 5,234,386.

BACKGROUND OF THE INVENTION

1. Field of the Invention

The present invention relates to an actuator having a frame in which a drive source and a slider displaced under the action of the drive source are held, and more specifically to an actuator arrangement comprising a plurality of actuators connected with each other by connecting means.

2. Description of the Related Art

An actuator has heretofore been used, for example, in a device for attracting a workpiece by a suction pad or holding it by a mechanical hand or a chuck so as to feed it to a desired position. In this type of actuator, a slider such as a table is attached through a guide to a body integrally formed by casting extruding, drawing or the like. The slider is moved by a drive mechanism such as a ball screw, a timing belt or the like, which is driven by a drive source such as a servomotor, a stepping motor or the like. When the slider is moved, an attracting and holding means coupled to the slider is also displaced to thereby feed a workpiece attracted by the attracting and holding means to a desired position under the sliding movement of the slider.

However, the above prior art makes use of a structure wherein the slider such as the table is directly attached to the body so as to feed the workpiece to the desired position. Thus, when it is desired to adjust or change a shift position of the slider and carry out processes for maintaining and checking the slider, for example after a desired position for feeding the workpiece has been first determined and set up as described above, the set-up structure should be disassembled and rearranged, thereby causing a great cumbersome problem. Since the body, the slider, the drive mechanism, the drive source, etc. are integrally formed as the actuator, the position of the actuator to be placed is restricted and on-site work cannot be smoothly carried out.

SUMMARY OF THE INVENTION

It is a general object of the present invention to provide an actuator which has a frame and a slider both separately and detachably mounted to each other, which enables an actuator arrangement to be constructed by freely assembling actuators or beam members using connecting means within a desired space.

It is another object of the present invention to provide an actuator comprising a beam member having a concave portion defined in a side thereof, a drive source held in the concave portion, a slider base held in the concave portion and having a slider displaced along the concave portion under the action of the drive source, and a cover for covering the concave portion defined in the beam member, the beam member having at least a groove which enable other beam members to be mounted thereto, the groove being defined in at least an outer side of the beam member along the longitudinal direction thereof in a substantially identical structure to one another.

It is a further object of the present invention to provide an actuator arrangement including at least an actuator comprising a beam member having concave portion defined in a side thereof, a drive source held in the concave portion and a slider held in the concave portion and displaced along the concave portion under the action of the drive source, the actuator arrangement comprising mounting means for placing and removing the drive source in and from the concave portion of the beam member, a cover for closing the concave portion defined in the beam member, and connecting means for connecting a plurality of actuators or a plurality of beam members with one another, the beam member having at least a groove to cause the connecting means for connecting the beam member with other beam members to engage therewith, the groove being defined in at least an outer side of the beam member along the longitudinal direction thereof in a substantially identical structure to one another.

It is a further object of the present invention to provide an actuator further comprising driving force transmitting means for transmitting a driving force of the drive source to the slider, and supporting means extending along the direction of displacement of the slider to support the slider thereon when the slider is displaced along the concave portion.

It is a still further object of the present invention to provide an actuator wherein the driving force transmitting means has a driving pulley and a follow-up pulley coupled to each other by a timing belt and adjusting means for adjusting a distance between the driving pulley and the follow-up pulley.

It is a still further object of the present invention to provide an actuator wherein the supporting means comprises a rod.

It is a still further object of the present invention to provide an actuator wherein the adjusting means comprises a pulley box displaceable along elongated slots defined therein, a pulley base connected with the pulley box by screws inserted in the elongated slots of the pulley box and a bolt extending through the pulley base and held in meshing engagement with a foundation base of the pulley box, the adjusting means being activated to rotate the bolt and displace the pulley box along the elongated slots to thereby adjust the distance between the driving pulley and the follow-up pulley.

It is a still further object of the present invention to provide an actuator wherein the beam member and the slider base are independently formed so as to be separated from each other, and detachably mounted to each other by mounting means, the slider base being freely moved to a predetermined position after the slider base has been fitted fen the concave portion of the beam member.

It is a still further object of the present invention to provide an actuator wherein longitudinallyextending opposing grooves are defined in the inner bottom of the concave portion of the beam member and the slider base having a motor and the slider displaced along the longitudinal direction of the beam member under the rotation of the motor is fixed to a plate, which is in turn fitted in the grooves and positioned by screws, the plate being displaceable through the screws along the direction in which the grooves extend after the slider base has been first mounted to the plate.

It is a still further object of the present invention to provide an actuator wherein the mounting means comprises a plate inserted in opposing grooves defined in the bottom of he concave portion of the beam member.

It is a still further object of the present invention to provide an actuator wherein a step is formed so as to extend to one of the grooves in which the plate is inserted.

It is a still further object of the present invention to provide an actuator wherein the beam member and the slider are independently formed so as to be separated from each other.

It is a still further object of the present invention to provide an actuator wherein the drive source held in the concave portion of the beam member is provided in such a manner that the upper surface of the drive source is flush with an upper end face of an aperture of the beam member.

It is a still further object of the present invention to provide an actuator arrangement wherein the actuator includes driving force transmitting means for transmitting driving force of the drive source to the slider and supporting means extending along the direction of displacement of the slider and used to support the slider thereon when the slider is displaced along the concave portion.

It is a still further object of the present invention to provide an actuator arrangement wherein the actuator has a path defined therein, for transmitting any one of signals in the form of at least electricity, air, oil and water.

It is a still further object of the present invention to provide an actuator arrangement further comprising belt conveyor actuators each of which is provided with a conveying belt moved along the longitudinal direction of each actuator.

It is a still further object of the present invention to provide an actuator arrangement wherein the connecting means comprises a bolt whose one end is inserted in a hole extending through each of the beam members along its longitudinal direction and whose other end forms a head fitted in a corresponding groove defined in other beam member and having a substantially T-shaped cross section along its longitudinal direction, the bolt being disposed such that a slanted surface formed substantially centrally therein is held in abutment against the leading end of a screw through a plate, thereby making it possible to connect one of the actuators and its corresponding beam member to each other and connect the beam members to each other.

It is a still further object of the present invention to provide an actuator arrangement further including reinforcing means for reinforcing portions connected by the connecting means.

It is a still further object of the present invention to provide an actuator arrangement wherein each of the reinforcing means comprises either a member having a substantially L-shaped cross section or a convex plate which is joined to each of the connected portions and fixedly mounted in each of grooves defined in respective sides of the beam members by screws.

The above and other objects, features and advantages of the present invention will become apparent from the following description and the appended claims, taken in conjunction with the accompanying drawings in which preferred embodiments of the present invention are shown by way of illustrative example.

BRIEF DESCRIPTION OF THE DRAWINGS

FIG. 2 is a partly exploded perspective view illustrating the actuator shown in FIG. 1;

FIG. 3 is a perspective view depicting a slider base of the actuator shown in FIG. 1;

FIGS. 27(A) and 27(B) are a side view and a partly cross-sectional view both showing a first example of a connecting means;

FIG. 28 is a perspective view illustrating the first example of the connecting means;

FIG. 43 is a perspective view illustrating the manner in which a plurality of slider bases are disposed in an elongated frame.

DETAILED DESCRIPTION OF THE PREFERRED EMBODIMENTS

Figure 1:
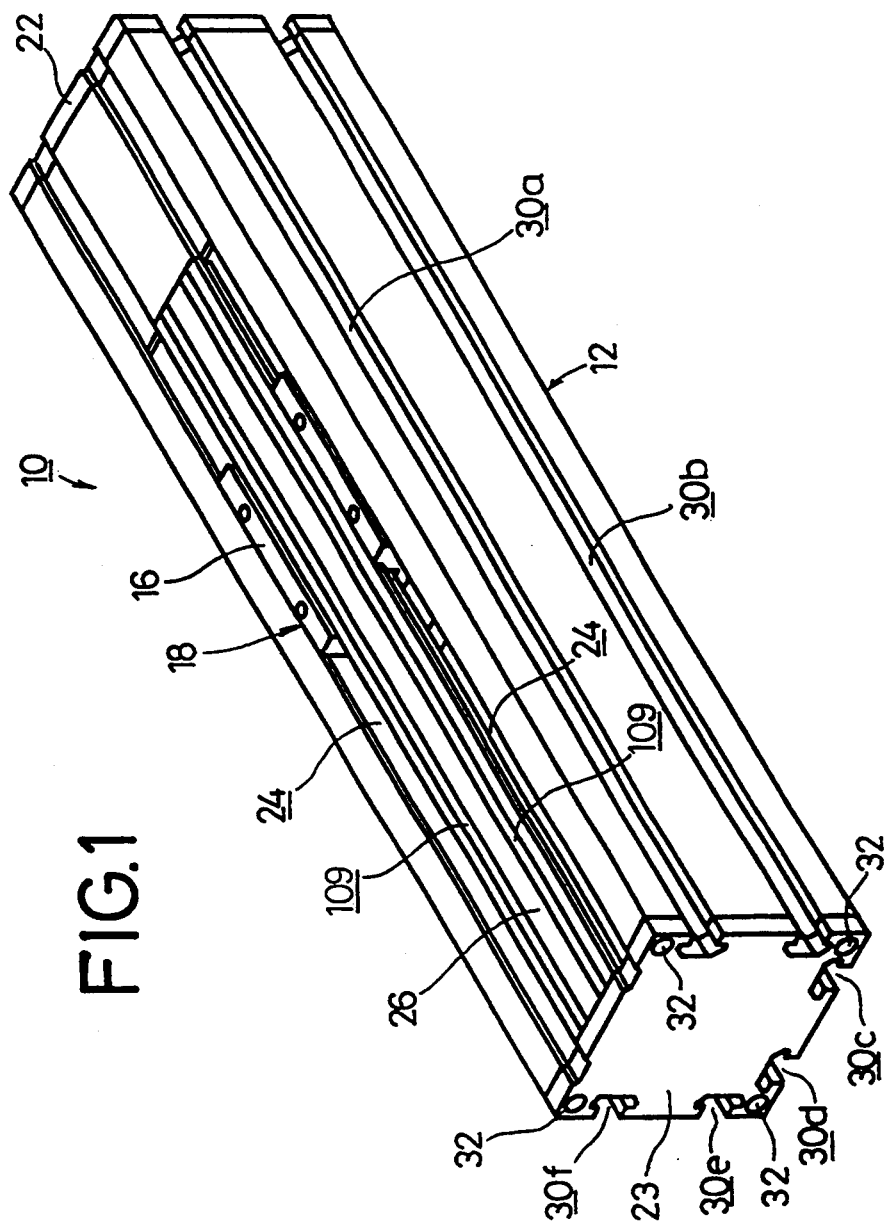
FIG. 1 is a perspective view showing an actuator according to a first embodiment of the present invention.

Actuators and actuator arrangements according to the present invention will hereinafter be described in detail with reference to the accompanying drawings in which preferred embodiments are shown by way of illustrative example.

FIGS. 1 through 8 show an actuator according to a first embodiment of the present invention.

The actuator 10 basically comprises a beam member which constitutes a frame 12, a slider base 18 which is disposed in a concave portion defined in the frame 12 and which is provided with a slider 16 linearly displaced under the drive operation of a motor 14, a plate (mounting means) 20 for detachably mounting the slider base 18 on the frame 12, end covers 22, 23 respectively mounted to both ends of the frame 12, and a cover 26 disposed in an opening or ,aperture 24 defined in the frame 12.

More specifically, as shown in FIGS. 1 and 2, the frame 12 has grooves 28a, 28b defined in inner bottom ends thereof in confronting relationship, for fitting the plate 20 therein along the longitudinal direction of the frame 12. On the other hand, the frame 12 also has a plurality of grooves 30a through 30f substantially identical in structure to one another and having substantially T-shaped cross sections, which are defined two by two in respective outer sides of the frame 12 exclusive of the aperture 24 so as to be substantially parallel to one another along the longitudinal direction of the frame 12. The frame 12 is formed by extruding or drawing a light metal. Incidentally, the grooves 30a through 30f defined in the respective outer sides of the frame 12 are used to connect other frames 12 and other actuators 10 or used as paths for wiring. At least one of the grooves 30a through 30f may be defined in the corresponding outer side as an alternative to the definition of the two grooves in the corresponding outer side. The end covers 22, 23 are connected to their corresponding longitudinally-extending both ends of the frame 12 by causing screws 32 to threadedly engage their corresponding holes defined in the four corners of the frame 12. Projections 34 for positioning the plate 20 are respectively formed on the sides of the end covers 22, 23 joined to one ends of the frame 12. The projections 34 are used to position the end covers 22, 23 when the end covers 22, 23 are attached to the corresponding ends of the frame 12. Incidentally, the plate 20 has a plurality of holes 36 defined therein for mounting the slider base 18 thereon.

As shown in FIG. 3, the slider base 18 basically comprises a guide plate 40 positioned by bringing the projections 34 into sliding engagement with a recess or concave portion 38 defined substantially centrally in the guide plate 40, the slider 16 linearly moved along the guide plate 40 by a timing belt 42, a motor pulley unit 44 attached to one end of the guide plate 40, for rotating the timing belt 42 under the rotation of the motor 14 coupled to the motor pulley unit 44, and an idle pulley unit 46 attached to the other end of the guide plate 40 and held in engagement with the timing belt 42.

The guide plate 40 is joined to the plate 20 by inserting screws into a plurality of holes 48 defined in positions in the vicinity of both sides thereof. In addition, the guide plate 40 has a linearly-extending support member 50 fitted in the recess 38. The support member 50 has longitudinally-extending steps 52 which are formed in both sides thereof and along which the lower part of the slider 16 slides. Incidentally, the bottoms of the motor pulley unit 44 and the idle pulley unit 46 are formed in such a manner that they conform to or meet the shape of the recess 38 of the guide plate 40 and are fitted in the recess 38 of the guide plate 40, thereby making it possible to provide high durability and rigidity and easy positioning upon assembling.

Figure 4A:
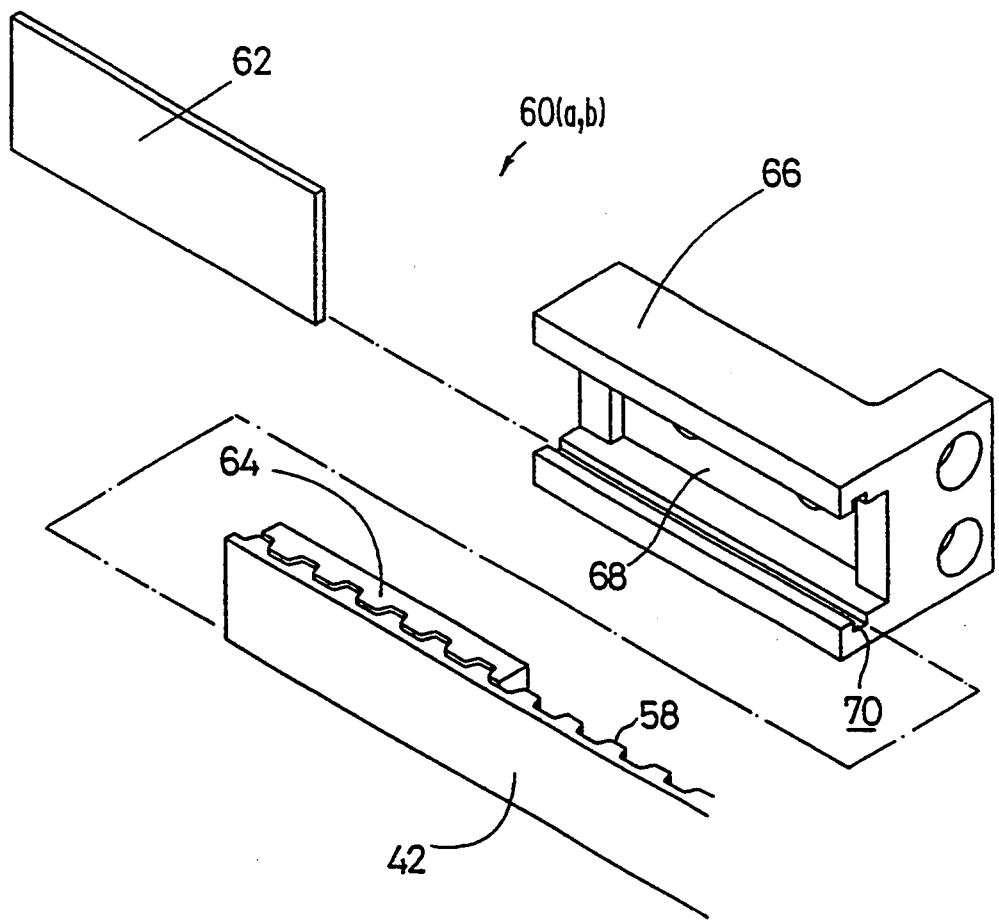
FIGS. 4(A) and 4(B) are perspective views showing a timing belt.
Figure 4B:
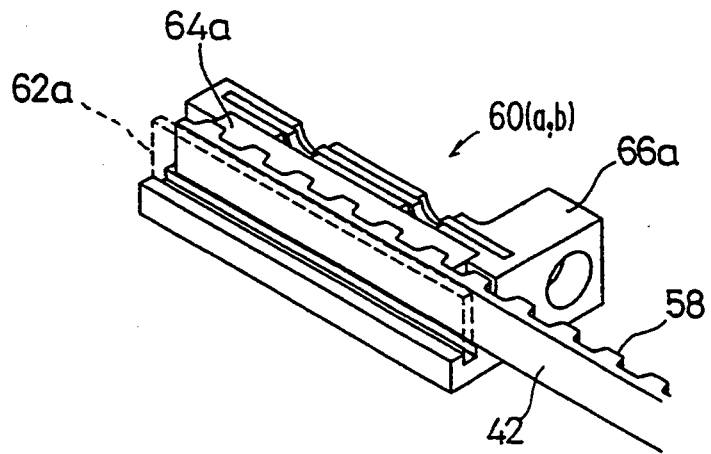

The slider 16 has a pair of opposed tables 54 which extends from the upper surface thereof substantially in parallel and are formed in such a manner that other members can be connected thereto through holes 56 defined in the tables 54. Incidentally, other members can be positioned with high accuracy by defining unillustrated positioning holes other than the connecting holes 56 in the tables 54. As shown in FIGS. 4(A) and 4(B), the slider 16 has a pair of holding means 60a, 60b (only one such holding means being illustrated for the sake of simplicity) each held in meshing engagement with one end of the timing belt 42 formed with teeth 58 for each given pitch so as to hold its one end. The timing belt 42 has one end used as a start point and the other end used as an end point, both of which are formed so as to be spaced away from each other and held by the holding means 60a, 60b respectively. As shown in FIG. 4(A), each of the holding means 60a, 60b is activated to hold one end of the timing belt 42 by bringing one side of the timing belt 42 into engagement with a first plate 62 shaped in flat form and bringing the other side thereof, i.e., concavo-convex portions corresponding to the teeth 58 of the timing belt 42 into meshing engagement with concavo-convex portions of a second plate 64. The timing belt 42 can be reliably held by inserting both plates 62, 64 into a concave portion 68 and a groove 70, respectively, defined in a block 66. Similarly to FIG. 4(A), FIG. 4(B) is a perspective view showing the manner in which one end of the timing belt 42 is held. Both sides of the timing belt 42 are interposed between a pair of plates 62a, 64a, whereas one of the sides thereof is held in meshing engagement with the teeth 58 defined in the plate 64a, thereby making it possible to hold the timing belt 42 by a block 66a. In the present embodiment, the timing belt 42 is used as a member for transmitting power output from the motor 14. However, the present invention is not necessarily limited to the present embodiment. For example, a steel belt, a chain, a wire rope, etc. may also be used as an alternative to the timing belt 42. When the positioning is carried out with higher accuracy, feed screws such as a ball screw, a trapezoidal screw, etc. may be used. Further, the driving force outputted from the motor 14 can be smoothly transmitted to the slider 16 without the need for oil such as lubricating oil by using screws comprised of either spiral sliding members or coiled sliding members having convex portions of substantially semicircular cross sections, which are fitted in grooves defined in screw shafts made of metal, ceramic, resin, etc. as an alternative to balls inserted in helical screw grooves of the ball screw.

Figure 5:
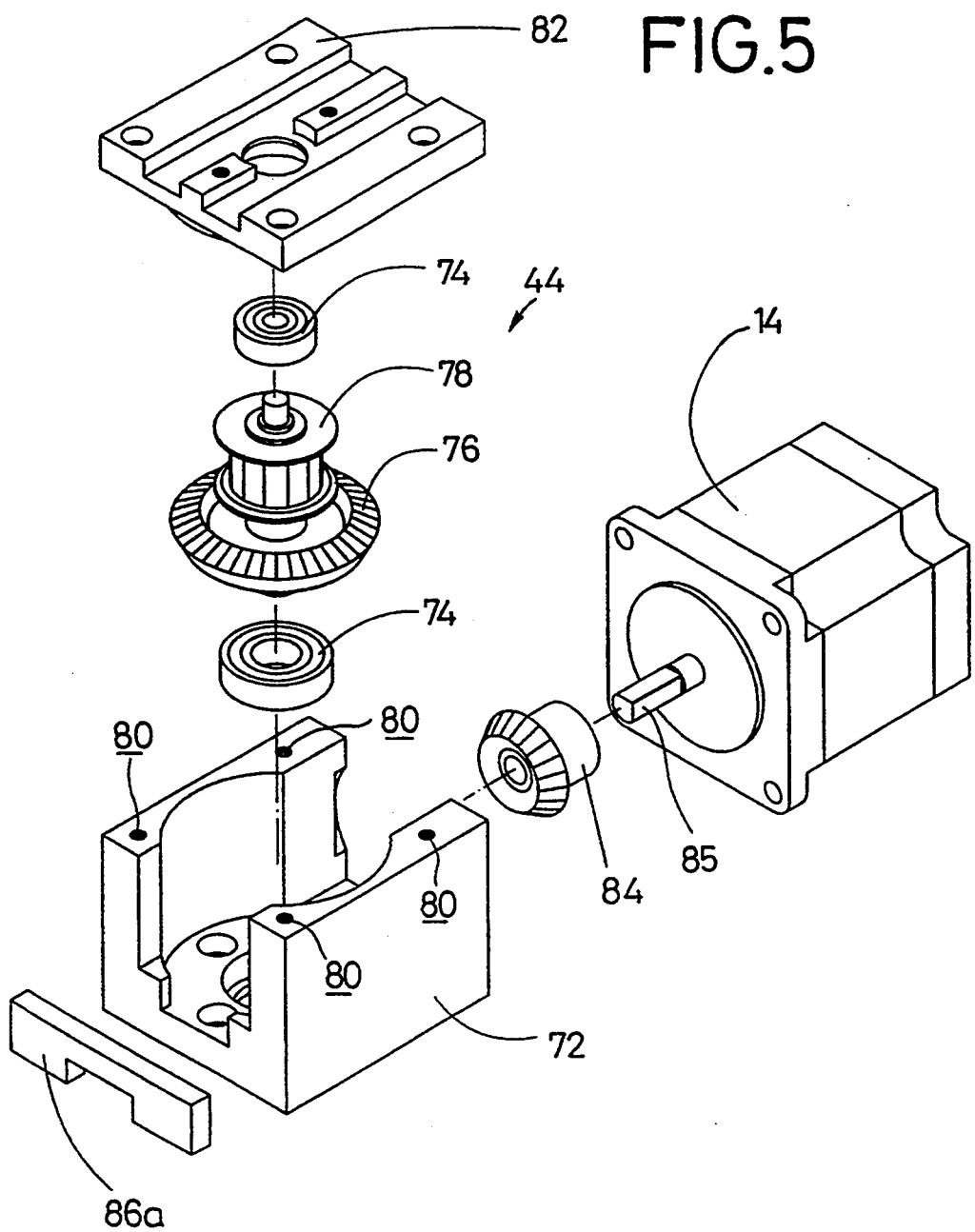
FIG. 5 is an exploded perspective view illustrating a motor pulley unit.

As shown in FIG. 5, the motor pulley unit 44 basically comprises a gear box 72 having a concave portion defined therein, a first bevel gear 76 which is rotatably disposed in the concave portion through a bearing 74 and has gear teeth formed in a slanted portion thereof, a pulley 78 which is coupled via a rotatable shaft to the first bevel gear 76 and supports the timing belt 42 thereon, a gear box cover 82 fixed to the gear box 72 by causing screws to threadedly engage their corresponding holes 80 defined in the four corners of the gear box 72, and a motor 14 which is coupled to one side of the gear box 72 and rotatably driven in such a manner that a second bevel gear 84 held in meshing engagement with the first bevel gear 76 is supported by a shaft 85 of the motor 14. In the motor pulley unit 44, the rotatable shaft 85 of the motor 14 to which the second bevel gear 84 is coupled, is held in engagement with the rotatable shaft of the pulley 78 for holding the first bevel gear 76 in such a manner that they meet at a right angle or obliquely to each other. The speed ratio of the first bevel gear 76 to the second bevel gear 84 may be equal or unequal to each other. Accordingly, the overall motor pulley unit 44 including the motor 14 can be accommodated in the concave portion of the frame 12 without projecting from the aperture 24 of the frame 12. There is provided a damper 86a for reducing impact developed when the slider 16 is brought into abutment against the other side of the gear box 72, which is opposite to the motor 14 mounted to one side thereof. It is preferable that the gear box 72 is formed integrally with the motor 14 in order to improve the accuracy of meshing engagement between the first and second bevel gears 76 and 84. It is also preferable that a servomotor and a stepping motor for accurately performing both a synchronous drive operation and positional control operation are used as an alternative to the motor 14.

Figure 6:
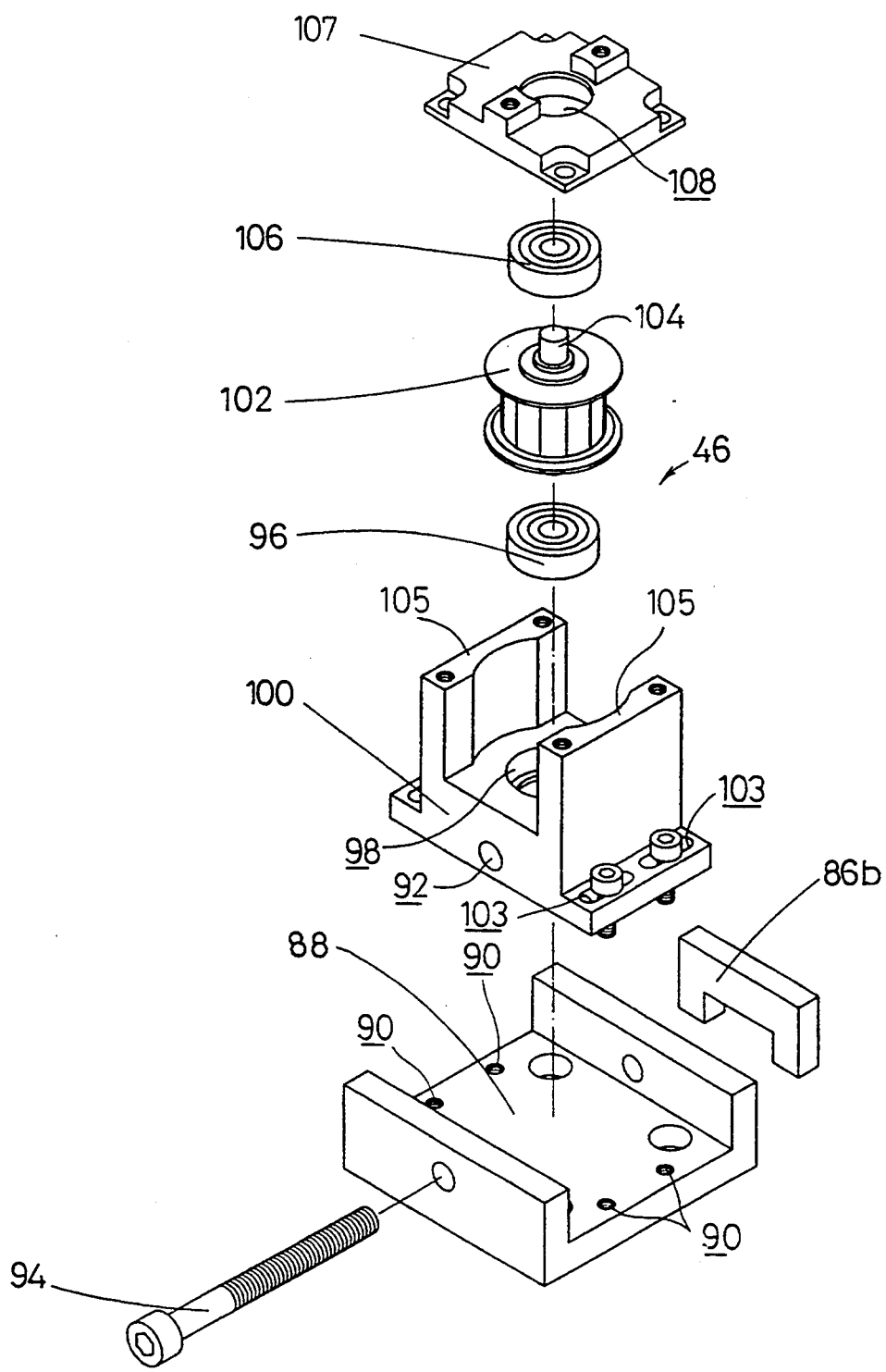
FIG. 6 is an exploded perspective view depicting an idle pulley unit.

As illustrated in FIG. 6, the idle pulley unit 46, which is disposed along an imaginary straight line extending in an opposing relationship to the motor pulley unit 44 with the slider 16 interposed therebetween, basically comprises a pulley base 88 which forms a foundation base, a pulley box 100 having a circular through hole 98 defined centrally therein for disposing a bearing 96 therein, said pulley box 100 being screwed to holes 90 defined in the upper surface of the pulley base 88, and coupled to the pulley base 88 by fitting a bolt 94 in through holes 92 defined in both sides of the pulley base 88, a pulley 102 which is rotatably disposed in the pulley box 100 by a rotatable shaft 104 thereof through the bearing 96 and supports the timing belt 42 thereon, and a pulley box cover 107 screwed to substantially parallel-extending portions 105 of the pulley box 100, for inserting a bearing 106 held in engagement with the shaft 104 extending from the upper surface of the pulley 102 in a substantially centrally-defined circular hole 108 so as to rotatably support the pulley 102. Incidentally, there is also provided a damper 86b which is joined to one of projections of the pulley base 88 and abuts against the slider 16. The bolt 94 is used as a bolt for adjusting a tensile force of the timing belt 42. That is, the idle pulley unit 46 temporarily screwed to the holes 90 of the pulley base 88 is fixedly mounted on the pulley base 88 by rotating the bolt 94 and tightening screws which are displaced along elongated slots 103 defined in a foundation base of the idle pulley unit 46 and which are fitted in the corresponding holes 90 at suitable positions.

Incidentally, the motor pulley unit 44 and the idle pulley unit 46 are disposed in an opposing relationship in both ends of the guide plate 40 having the positioning holes 48 defined substantially in the longitudinally-extending central portions of the guide plate 40 as shown in FIGS. 2 and 3. The timing belt 42 is trained around the outer peripheral surfaces of the pulleys 78, 102 of the motor pulley unit 44 and the idle pulley unit 46. The slider 16, which is displaced in the direction indicated by the arrow A or B in accordance with the rotation of the timing belt 42, is disposed in an intermediate position between the motor pulley unit 44 and the idle pulley unit 46.

Figure 7:
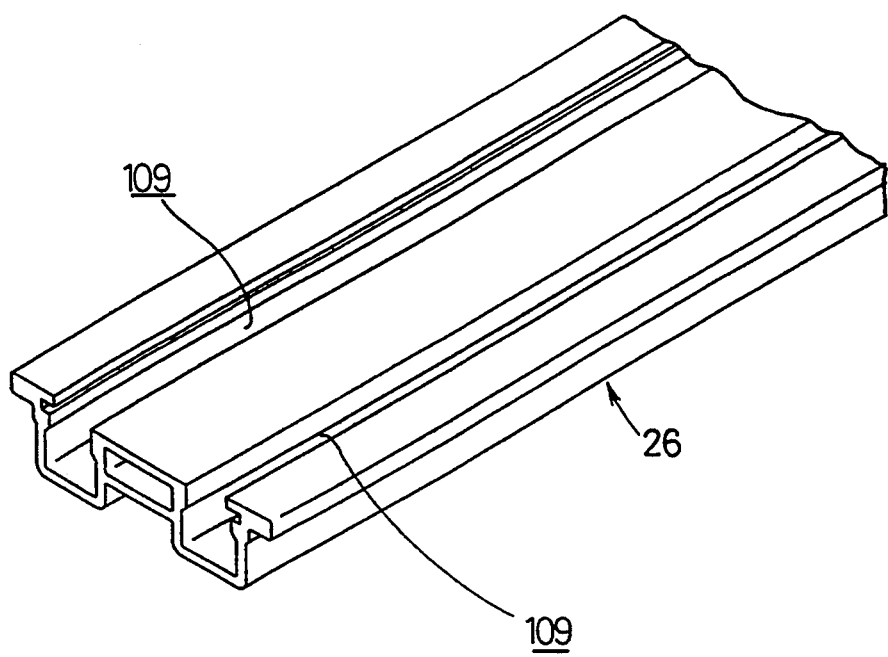
FIG. 7 is a partly perspective view showing a cover.

As illustrated in FIGS. 1 and 7, the cover 26 disposed in the aperture 24 of the frame 12 linearly extends and has two grooves 109 defined therein along the longitudinal direction thereof, for mounting sensors (not shown) on the upper surface of the cover 26. In addition, the cover 26 is formed so as to cover the aperture 24 of the frame 12 exclusive of the areas where the tables 54 of the slider 16 are displaced. The position of the slider 16 can be detected by the sensors attached to given positions of the grooves 109.

The actuator 10 according to the first embodiment is constructed as described above. The operation of the actuator 10 will now be described below.

Figure 8:
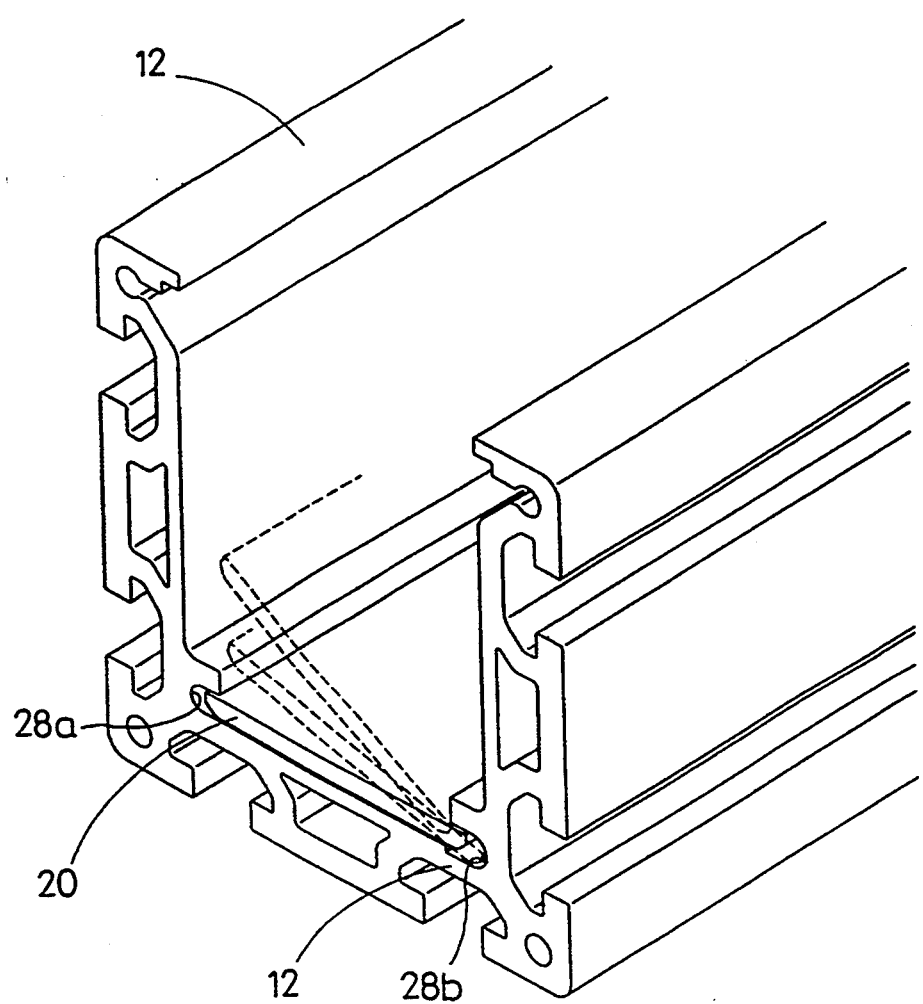
FIG. 8 is a view showing the manner in which a plate is loaded into a frame.

The timing belt 42 is first mounted on the idle pulley unit 46 connected with the motor pulley unit 44, the slider 16 and the motor 14. The motor pulley unit 44, the slider 16 and the idle pulley unit 46 are fixedly mounted on the guide plate 40 by the screws so as to be brought into alignment. Then, the guide plate 40 on which the motor pulley unit 44, the slider 16, the idle pulley unit 46, etc. have been fixedly mounted so as to be brought into alignment, is screwed to the plate 20 fixed to the concave bottom of the frame 12. Now, clearances or plays wider than the width of the plate 20 fitted in the opposed grooves 28a, 28b are defined in the grooves 28a, 28b defined in the bottom of the frame 12. Thus, as shown in FIG. 8, the plate 20 can be mounted to the bottom of the frame 12 by inserting the plate 20 obliquely, inserting one end of the plate 20 in the play defined in the groove 28b and inserting the other end of the plate 20 in the groove 28a opposite the groove 28b.

Then, the guide plate 40 on which the motor pulley unit 44, the slider 16, the idle pulley unit 46, etc. have been fixedly mounted by the screws, is fixed to the plate 20 fixed to the bottom of the frame 12. After the guide plate 40 has been fixed to the frame 12, the cover 26 is inserted in the aperture 24 of the frame 12. Now, the motor 14 electrically connected to an unillustrated power supply is energized. When the motor 14 is energized, the second bevel gear 84 coupled to the motor shaft 85 is rotated. When the first bevel gear 76 perpendicularly or obliquely coupled to the second bevel gear 84 is rotated, the pulley 78 coupled coaxially with the first bevel gear 76 is rotated. The timing belt 42, which is trained around the outer peripheral surface of the pulley 78, runs under the rotation of the pulley 78.

As shown in FIG. 4, the timing belt 42 has both ends held by the holding means 60a, 60b in a state in which the ends have been separated from each other. By rotating the motor 14 in both forward and reverse directions, the slider 16 can be linearly displaced by the first and second bevel gears 76, 84. Other members can be coupled to the tables 54 of the slider 16 by causing screws to threadedly engage their corresponding holes 56 defined in the tables 54 of the slider 16. Incidentally, the dampers 86a, 86b provided on the motor pulley unit 44 side and the idle pulley unit 46 side respectively, can reduce impact developed by the linear reciprocating motion of the slider 16.

An actuator according to a second embodiment will now be shown in FIGS. 9 through 15.

The actuator 110 according to the second embodiment basically comprises a frame (beam member) 112 which constitutes an outer frame thereof, a slider base 118 which is disposed in a concave portion defined in the frame 112 and which is provided with a slider 116 linearly displaced under the drive operation of a motor 114, insert plates 120a, 120b used to detachably mount the slider base 118 on the frame 112 and loaded in the frame 112 so as to be joined as a pair of plates, end covers 122, 123 respectively attached to both ends of the frame 112, and a cover 126 disposed in an opening or aperture 124 defined in the frame 112.

Figure 9:
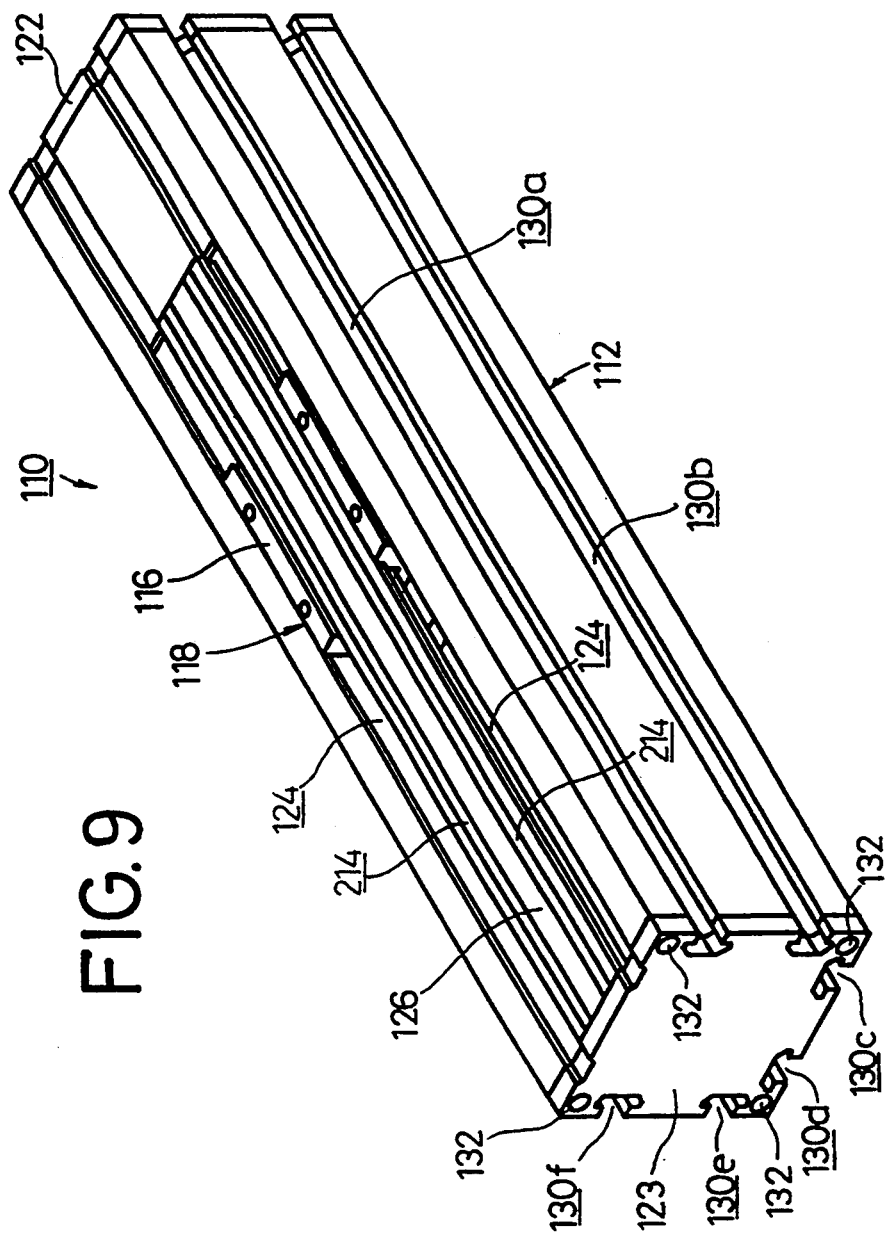
FIG. 9 is a perspective view showing an actuator according to a second embodiment of the present invention.
Figure 10:
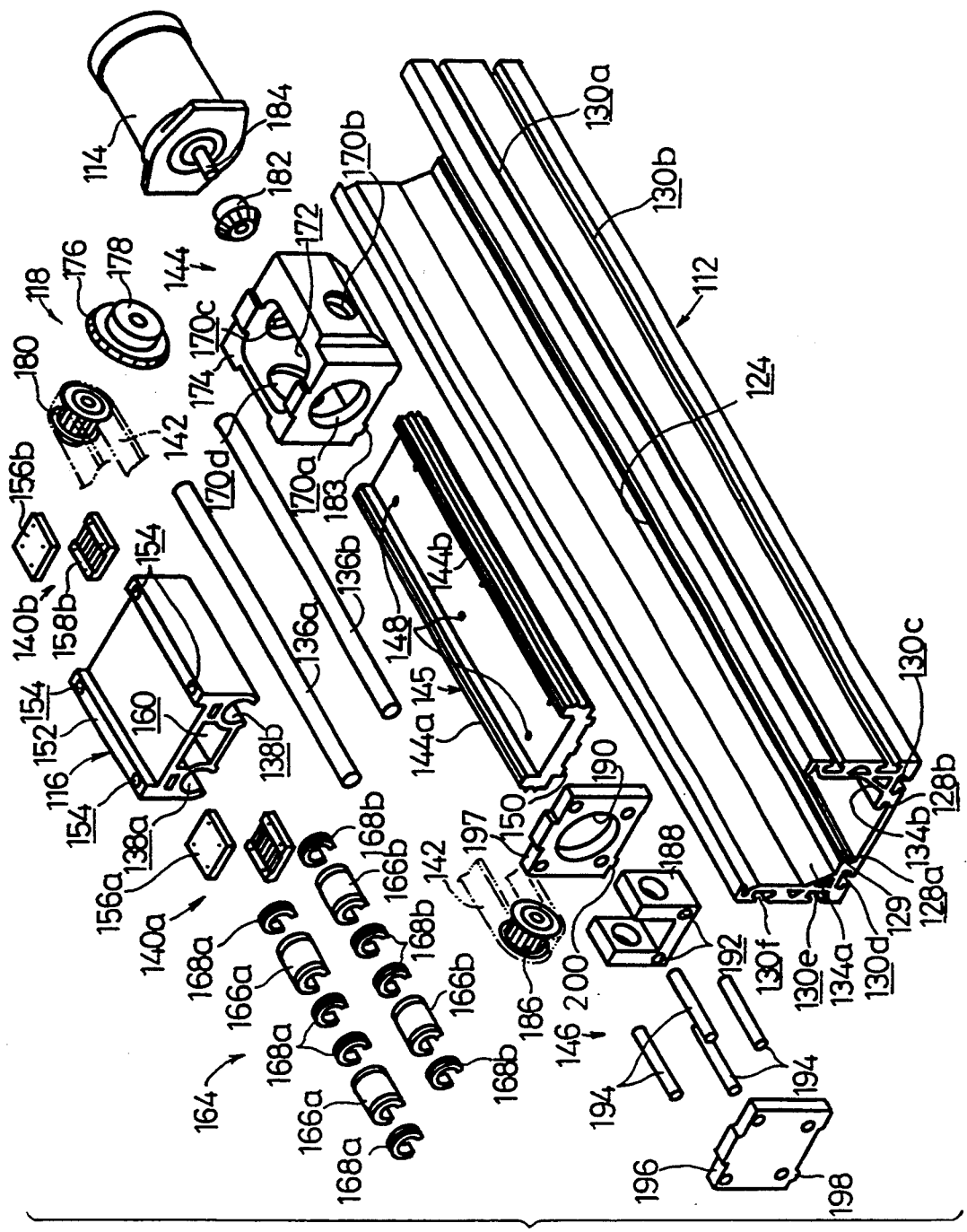
FIG. 10 is a partly exploded perspective view illustrating the actuator shown in FIG. 9.

More specifically, as shown in FIGS. 9 and 10, the frame 112 has opposed grooves 128a, 128b defined in inner bottom ends thereof, for mounting the insert plates 120a, 120b therein along the longitudinal direction thereof, and a step 129 formed adjacent to the groove 128a. In addition, the frame 112 has slanted and opposed reinforcing beams 134a, 134b formed in the inner bottom ends of the frame 112. On the other hand, the frame 112 also has a plurality of grooves 130a through 130f substantially identical in structure to one another and having substantially T-shaped cross sections, which are defined in pairs in respective outer sides of the frame 112 exclusive of the aperture 124 thereof so as to run substantially parallel to one another along the longitudinal direction of the frame 112. The frame 112 is formed by extruding or drawing a light metal. Incidentally, the grooves 130a through 130f defined in pairs in the respective outer sides of the frame 112 are used to interconnect other frames 112 and other actuators 110 or used as paths for wiring. At least one of the grooves 130a through 130f may be defined in the corresponding outer side as an alternative to the definition of the two grooves in the corresponding outer side. The end covers 122, 123 are disposed so as to be connected to longitudinally-extending both ends of the frame 112 by causing screws 132 to threadedly engage their corresponding holes defined in the four corners of the frame 112.

As shown in FIG. 10 the slider base 118 basically comprises a slider 116 having opposed grooves 138a, 138b defined therein for loading cylindrical shafts 136a, 136b therein, said grooves 138a, 138b being formed in bottom ends of the slider 116 in parallel to each other and having substantially arch-shaped cross sections, a timing belt 142 having ends held in the slider 116 by holding means 140a, 140b and used to linearly displace the slider 116 under the rotation of the timing belt 142, a guide member 145 having protrusions 144a, 144b formed substantially in parallel to each other along the longitudinal directions of both ends thereof and used to connect the shafts 136a, 136b to the corresponding protrusions 144a, 144b so as to support the slider 116, a motor pulley unit 144 attached to one end of the guide member 145, for rotating the timing belt 142 under the rotation of the motor 114 coupled to the motor pulley unit 144, and an idle pulley unit 146 attached to the other end of the guide member 145 and held in engagement with the timing belt 142.

The guide member 145 is joined to the insert plates 120a, 120b by causing screws 132 to threadedly engage their corresponding holes 148 defined in a flat portion thereof. In addition, the guide member 145 has the protrusions 144a, 144b, which are formed in the upper face ends thereof and to which the shafts 136a, 136b are coupled. Furthermore, the guide member 145 has an extension 150 formed in the bottom thereof and held in abutment against the step 129 of the frame 112 so that the extension 150 is positioned.

Figure 11:
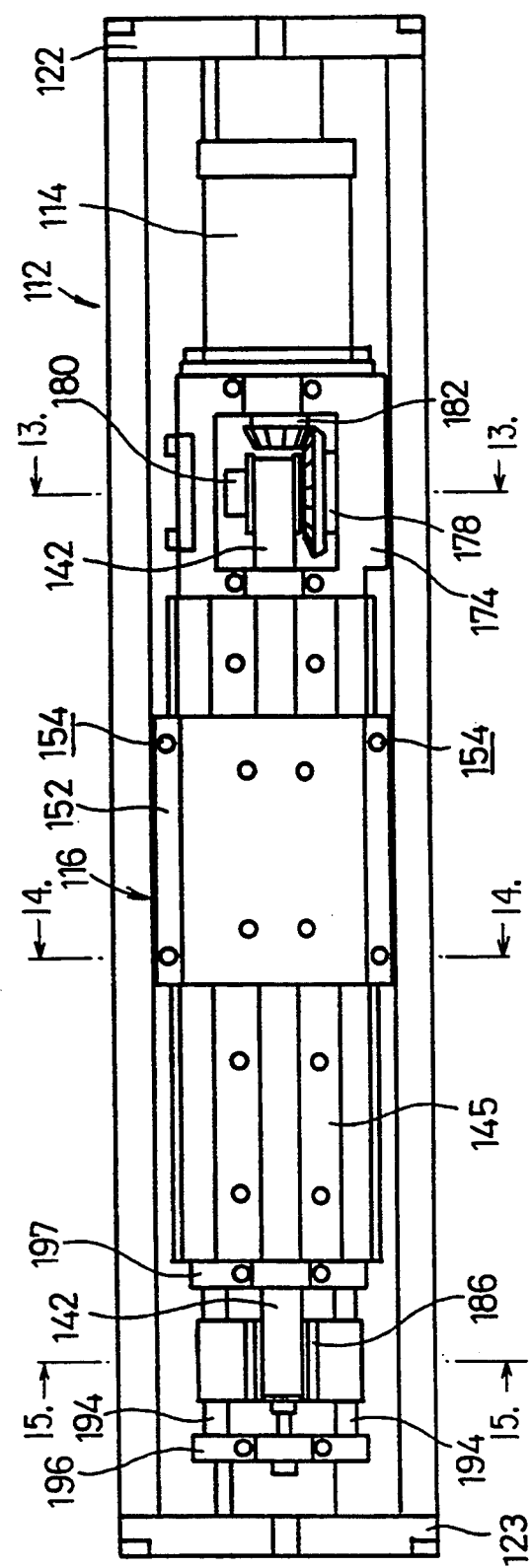
FIG. 11 is a front view showing the actuator of FIG. 9 whose cover has been opened.
Figure 12:
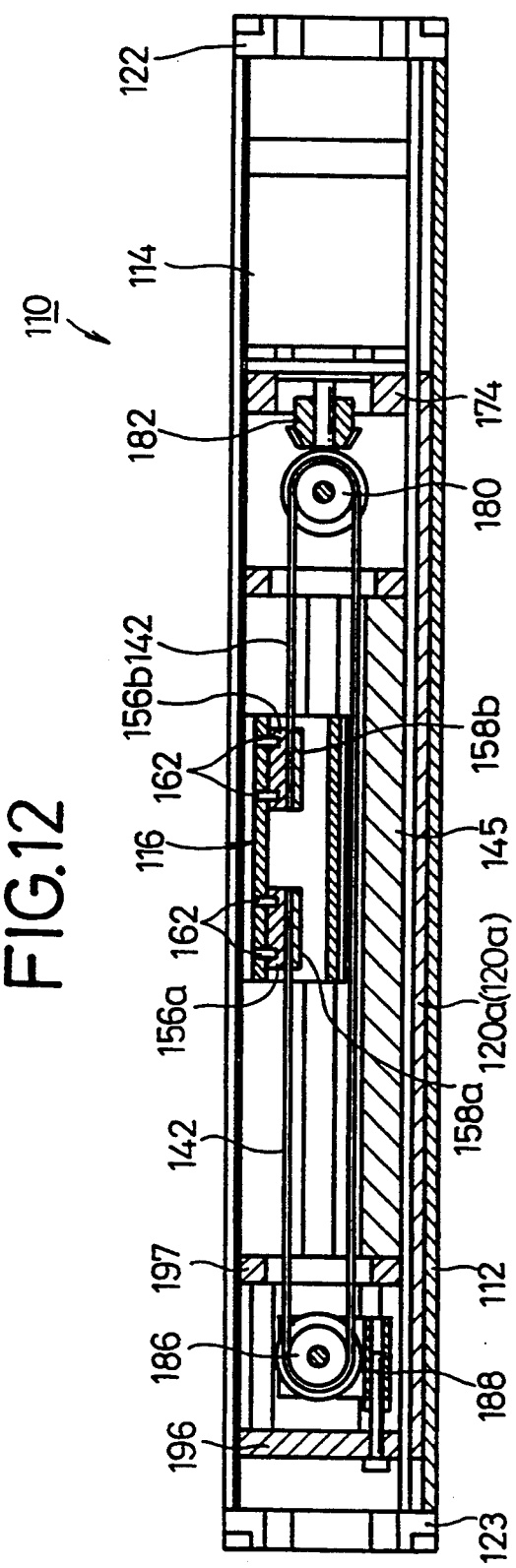
FIG. 12 is a side view, partly in cross section, illustrating the actuator shown in FIG. 9.
Figure 13:
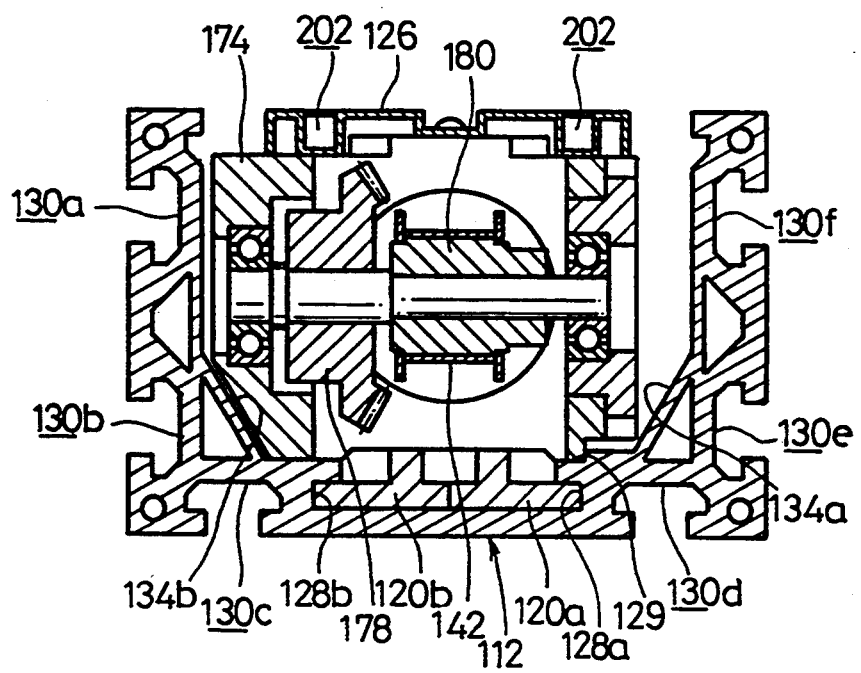
FIG. 13 is a cross-sectional view showing the actuator taken along line 13—13 of FIG. 11.
Figure 14:
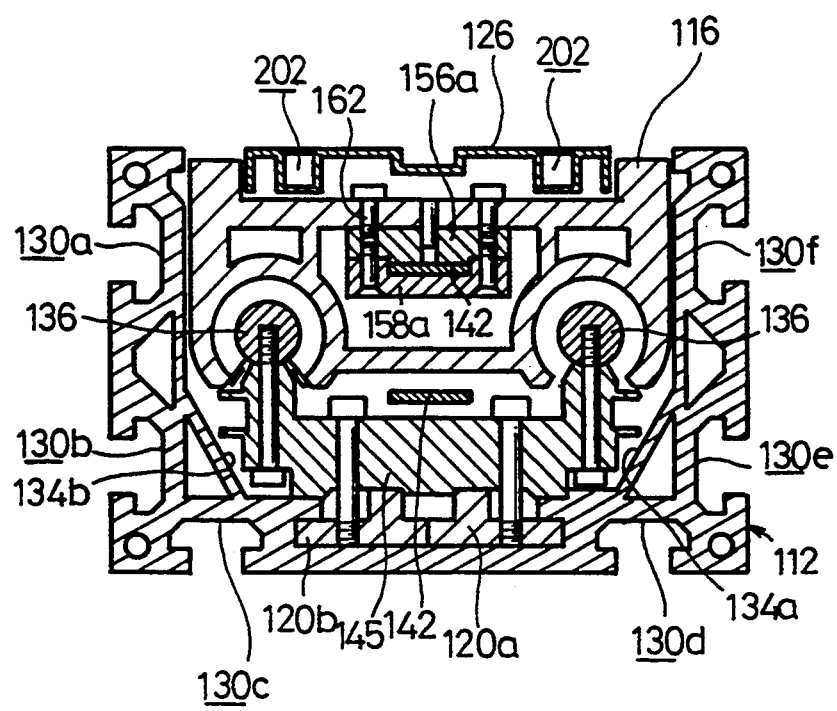
FIG. 14 is a cross-sectional view depicting the actuator taken along line 14—14 of FIG. 11.
Figure 15:
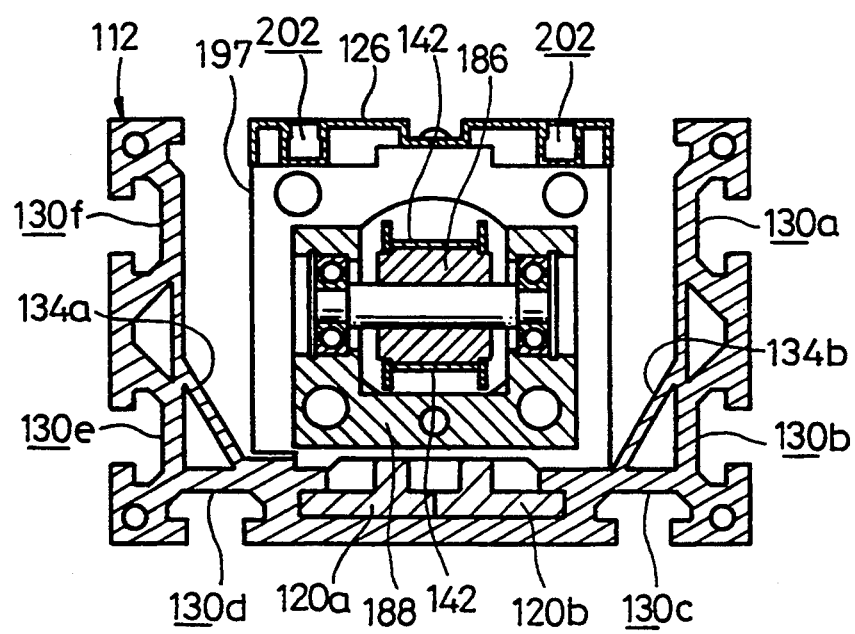
FIG. 15 is a cross-sectional view illustrating the actuator taken along line 15—15 of FIG. 11.

The slider 116 has a pair of tables 152 formed on the upper surface thereof and is formed in such a manner that other members can be coupled thereto through holes 154 defined in the tables 152. As shown in FIGS. 11 and 12, the slider 116 has the holding means 140a, 140b which are held in meshing engagement with one ends of the timing belt 142 formed with belt teeth for each given pitch so as to hold its one ends. The timing belt 142 has one end used as a start point and the other end used as an end point, both of which are provided so as to be spaced away from each other and held by the holding means 140a, 140b respectively. As shown in FIG. 12, each of the holding means 140a, 140b is activated to hold one end of the timing belt 42 by bringing one side of the timing belt 142 into engagement witch each of first plates 156a, 156b shaped in flat form and bringing the other side thereof, i.e., concavo-convex portions corresponding to the teeth of the timing belt 142 into meshing engagement with concavo-convex portions of each of second plates 158a, 158a. The timing belt 142 can be reliably held by mounting the first plates 156a, 156b and the second plates 158a, 158b in a hole 160 defined in the slider 116 by pins 162. The grooves 138a, 138b for receiving the shafts 136a, 136b therein through bearings 164 respectively are defined in the bottom of the slider 116. The grooves 138a, 138b are defined in two rows so as to run substantially parallel to each other along the longitudinal direction of the slider 116. The bearings 164 comprise substantially arch-shaped linear guide bearings 166a, 166b and rotation preventing members 168a, 168b, all of which are associated with the grooves 138a, 138b respectively. Incidentally, the present embodiment has shown a case in which the timing belt 142 is used as a member for transmitting power output from the motor 114. However, the present invention is not necessarily limited to the present embodiment. For example, a steel belt, a chain, a wire rope, etc. may also be used as an alternative to the timing belt 142. When the positioning is carried out with higher accuracy, feed screws such as a ball screw, a trapezoidal screw, etc. may be used.

As shown in FIG. 10, the motor pulley unit 144 basically comprises a gear box 174 which has a plurality of holes 170a through 170d having substantially circular cross sections and defined in peripheral sides of the gear box 174 and which has a substantially rectangular hole 172 defined in the upper surface of the gear box 174, a first bevel gear 178 which is rotatably loaded in the gear box 174 through the hole 172 and has gear teeth 176 formed onto a circular protrusion, a pulley 180 which is coupled to a rotatable shaft of the first bevel gear 178 and supports the timing belt 142 thereon, and the motor 114 which is coupled to one side of the gear box 174 and has a motor shaft 184 for rotatably supporting thereon a second bevel gear 182 held in meshing engagement with the gear teeth 176 of the first bevel gear 178. In the motor pulley unit 144, the shaft 184 of the motor 114 to which the second bevel gear 182 is coupled, is held in meshing engagement with the rotatable shaft of the pulley 180 for holding the first bevel gear 178 in such a manner that both shafts meet at a right angle or obliquely to each other. The speed ratio of the first bevel gear 178 to the second bevel gear 182 may be equal or unequal to each other. Accordingly, the entire motor pulley unit 144 including the motor 114 can be accommodated in the concave portion of the frame 112 without projecting from the aperture 124 of the frame 112. It is preferable that the gear box 174 is formed integrally with the motor 114 in order to improve the accuracy of meshing engagement between the first and second bevel gears 178 and 182. It is also preferable that a servomotor and a stepping motor for accurately performing both a synchronous drive operation and positional control operation are used as the motor 114. The gear box 174 has an extension 183 formed in the bottom thereof and held in abutment against the step 129 of the frame 112.

Then, the idle pulley unit 146, which is disposed along an imaginary straight line extending in an opposing relationship to the motor pulley unit 144 with the slider 116 interposed therebetween, basically comprises a slide block 188 used to hold therein a rotatably-disposed pulley 186 for supporting the timing belt 142 thereon and formed so as to be displaceable to adjust a tensile force of the timing belt 142, a plurality of guide rods 194 which are inserted in and extend through corresponding holes 192 defined in the lower part of the slide block 188, and first and second guide plates 196, 197 coupled via holes to the ends of the guide roots 194 respectively. The second guide plate 197 has a circular aperture 190 defined therein for inserting the timing belt 142 therethrough supported by the pulley 186. The slide block 188 is supported by the two guide rods 194 inserted in the corresponding holes 192, and formed so as to be slidable along the longitudinal direction of each guide rod 194. The first and second guide plates 196, 197 respectively have extensions 198, 200 formed in the bottom thereof, and are positioned such that the extensions 198, 200 are held in abutment against the step 129 formed in the bottom of the frame 112.

As shown in FIGS. 11 and 12, the motor pulley unit 144 and the idle pulley unit 146 are disposed in both ends of the guide member 145 in an opposing relationship. The timing belt 142 is trained around the outer peripheral surface of the pulley 180 of the motor pulley unit 144 and the outer peripheral surface of the pulley 186 of the idle pulley unit 146. The tensile force of the timing belt 142 can be adjusted by moving the slide block 188 for supporting the pulley 186 thereon. The slider 116, which is displaced in the direction indicated by the arrow A or B in accordance with the rotation of the timing belt 142, is disposed in an intermediate position between the motor pulley unit 144 and the idle pulley unit 146.

As illustrated in FIG. 9, the cover 126 disposed in the aperture 124 of the frame 112 linearly extends and is formed so as to cover the aperture 124 of the frame 112 exclusive of the areas where the tables 152 of the slider 116 are displaced. In addition, grooves 202 for mounting sensors (not shown) on the upper surface of the cover 126 are defined. Thus, the position of the slider 116 can be detected by the sensors disposed in given positions of the grooves 202.

The actuator 110 according to the second embodiment is constructed as described above. The operation of the actuator 110 will now be described below.

The insert plates 120a, 120b are first inserted in the corresponding grooves 128a, 128b defined in the inner bottom of the frame 1212. In this case, the insert plates 120a, 120b are substantially identical in structure to each other and formed in pairs. The ends of the insert plates 120a, 120b are obliquely inserted in the corresponding grooves 128a, 128b while backing on a substantially intermediate portion of the bottom of the frame 112. After the ends of the insert plates 120a, 120b have been inserted in the corresponding grooves 128a, 128b, the ends thereof are pressed against the substantially intermediate portion, i.e., the back of the frame 112 so as to join the insert plate 120a, 120b to the frame 112. Thus, the paired insert plates 120a, 120b can be mounted to the bottom of the frame 112.

Then, the guide member 145 is coupled to the insert plates 120a, 120b fixed to the bottom of the frame 112 by causing the screws to threadedly engage their corresponding holes 148 defined in the flat portion of the guide member 145. The motor pulley unit 144 connected with the motor and the idle pulley unit 146 are linearly attached to both ends of the guide member 145. In this case, the guide member 145, the gear box 174, the first and second guide plates 196, 197 have extensions 150, 183, 198, 200 formed in the bottoms thereof respectively. Thus, the guide member 145, the gear box 174, the first and second guide plates 196, 197 can be positioned by causing the extensions 150, 183, 198, 200 to abut against the step 129.

The slider 116 is then provided in continuation with the protrusions 144a, 144b of the guide member 145 fixed to the bottom Of the frame 112 through the shafts 136a, 136b. At this time, the bearings 164 comprising the linear guide bearings 166a, 166b and the rotation preventing members 168a, 168b respectively are inserted in the corresponding grooves 138a, 138b defined in the bottom of the slider 116. The slider 116 can be linearly slid along the shafts 136a, 136b by bringing the shafts 136a, 136b into engagement with the inner peripheral surfaces of the bearings 164, which are shaped substantially in the form of arches, respectively.

Now, the motor 114 electrically connected to an unillustrated drive source is energized. At this time, the second bevel gear 182 coupled to the motor shaft 184 is rotated. When the first bevel gear 178 perpendicularly or obliquely coupled to gear teeth of the second bevel gear 182 is rotated, the pulley 180 coupled coaxially with the first bevel gear 178 is rotated. The timing belt 142, which is trained around the outer peripheral surface of the pulley 180, is rotated under the rotation of the pulley 180.

As shown in FIG. 12, the timing belt 142 has both ends held by the first plates 156a, 156b and the second plates 158a, 158b in a state in which the ends have been separated from each other. When the motor 114 is rotated in both forward and reverse directions, the slider 116 can be linearly displaced by the first and second bevel gears 178, 182. Other members can be coupled to the tables 152 of the slider 116 by causing the screws to threadedly engage their corresponding holes 154 defined in the tables 152 of the slider 116.

An actuator 210 according to a third embodiment will now be shown in FIGS. 16 through 26.

Figure 16:
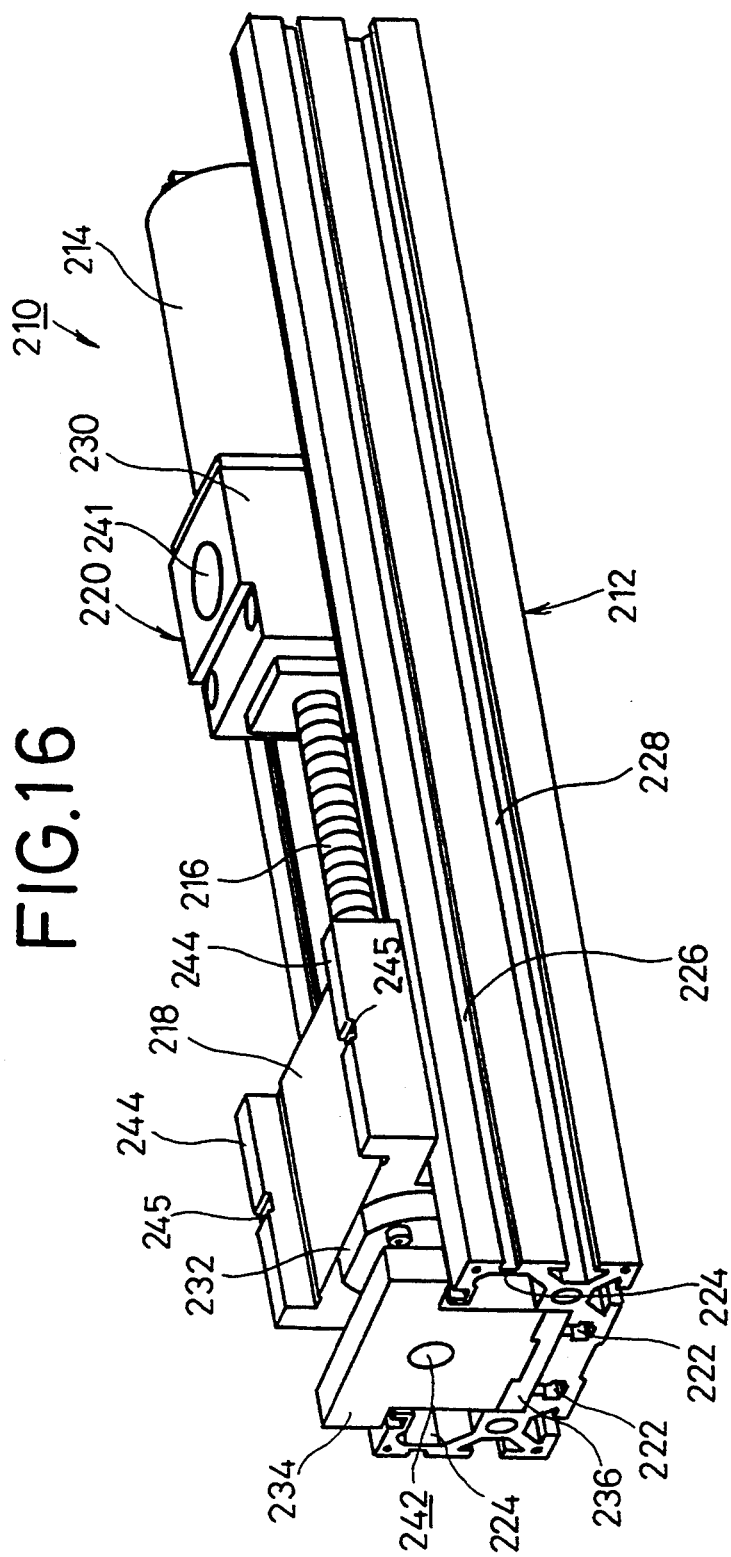
FIG. 16 is a partly perspective view showing an actuator according to a third embodiment of the present invention.

As shown in FIG. 16, the actuator 210 basically comprises a frame 212 which constitutes an outer frame thereof, a motor 214, i.e., one selected from a harmonic drive motor having an encoder, an AC servomotor, a DC servomotor, a stepping motor, an ultrasonic motor, etc., and a slider base 220 comprising a ball screw 216, a slider 218, etc.

The frame 212 has two rail-shaped grooves 222 defined in the inner bottom thereof. In addition, the frame 212 also has concave portions 224 defined in inner both sides thereof along the longitudinal direction thereof and concave portions 226, 228 defined in respective outer sides thereof along the longitudinal direction thereof. The frame 212 is shaped in the form of a single unit by any one of extruding, drawing and metal injection molding or formed of a resin or the like in integral manner.

The slider base 220 comprises a circular motor (e.g., an electric motor) 214 serving as a drive source, a casing 230 for transmitting a rotational driving force produced by the motor 214 to the ball screw 216, a slider 218 linearly moved under the rotation of the ball screw 216 and connected with a nut 232, a plate-like ball screw support 234, and a guide 246 and a base plate 236 for placing the casing 230 and the slider 218 into alignment. The ball screw 216 may be formed integrally with a rotatable shaft of the motor 214 so as to omit the coupling therebetween by making the ball screw 216 coaxial with the rotatable shaft thereof and making the balance in rotation between the ball screw 216 and the rotatable shaft thereof. Incidentally, a maintenance window 241 is defined in the upper surface of the casing 230. A plurality of screw holes 240 for fixing the slider base 220 to the frame 212 by screws 238 are defined in the base plate 236 at predetermined intervals.

The ball screw 216 has one end coupled to the casing 230 connected to the motor 214 and the other end inserted in a bearing hole 242 of the ball screw support 234. Between the casing 230 and the bearing hole 242, an internal screw thread defined in a hole (not shown) of the nut 232 coupled to the slider 218 is maintained in meshing engagement with an external screw thread engraved on the outer peripheral surface of the ball screw 216. The ball screw 216 can also be replaced by either a string screw or a trapezoidal screw which can be used in the same manner as described above. The slider 218 has a table including protrusions 244 extending from the upper ends thereof. Opposed positioning grooves 245 are defined substantially in the centers of the protrusions 244 extending from the upper ends of the slider 218. The guide 246 (see FIG. 17), which is brought into contact with a concave portion of the slider 218 so as to linearly move and guide the slider 218, is provided on the upper surface of the base plate 236. Incidentally, the casing 230 and the ball screw 216 serve as a drive mechanism for linearly moving the slider 218.

The operation of the actuator 210 according to the third embodiment, which has adopted the above-describe construction, will now be described below.

Figure 17:
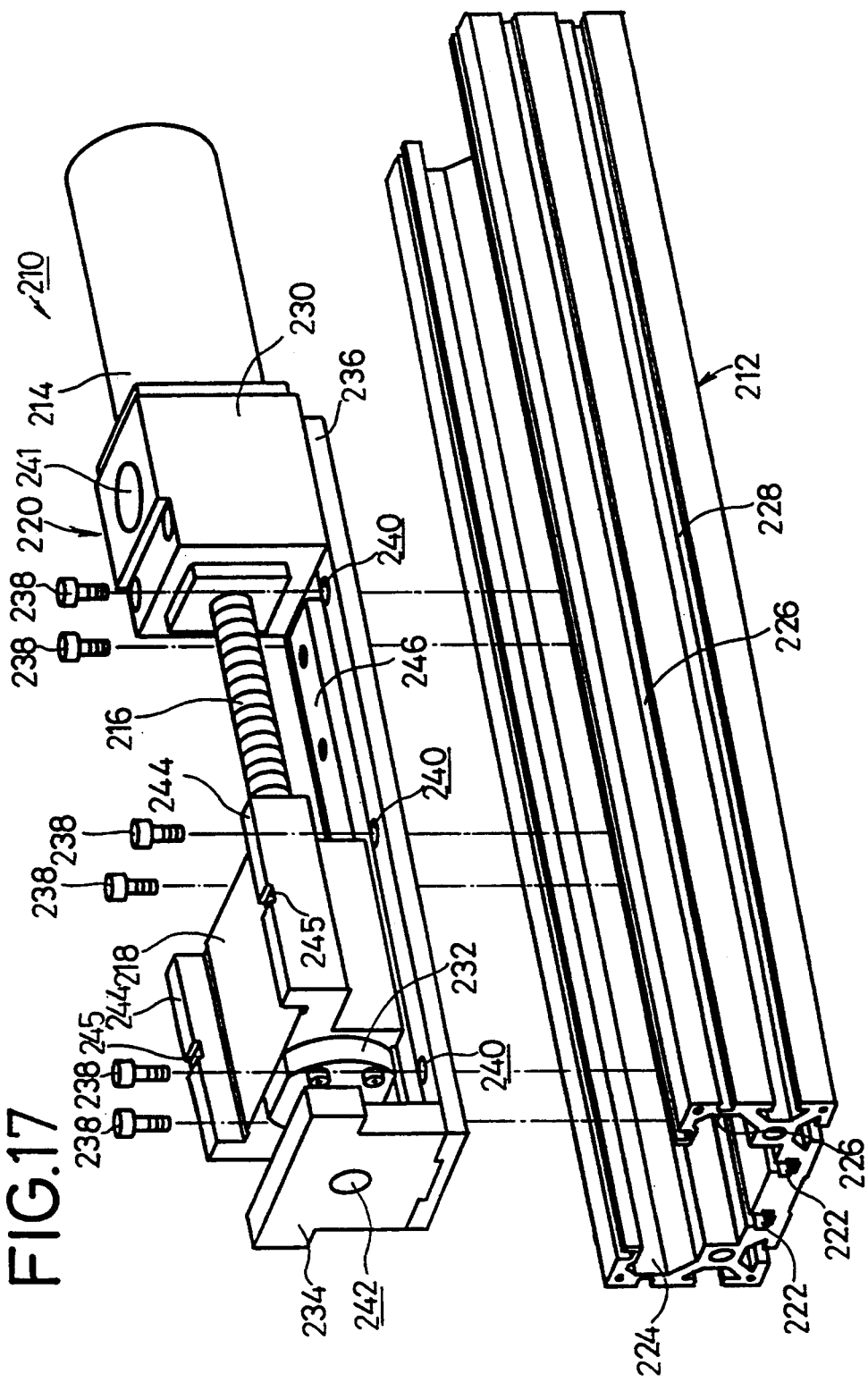
FIG. 17 is an exploded perspective view depicting the actuator shown in FIG. 16.

As shown in FIG. 17, the slider base 220 comprising the motor 214, the casing 230, the ball screw 216, the slider 218, the ball screw support 234, etc., which have been provided on the base plate 236 in continuation with one another, is fixed to the frame 212. At this time, either T nuts or nuts are inserted in the two rail-shaped grooves 222 engraved in the bottom of the frame 212 through the screw holes 240 defined in the base plate 236, and tightened by the screws 238, thereby fixing the slider base 220 to the frame 212. After the slider base 220 has been fixed to the frame 212 in this way, the motor 214 electrically connected to an unillustrated power source is energized. A gear shifter (not shown) is disposed in the casing 230. The ball screw 216 is rotated in synchronism with the rotation of the motor 214. The rotational motion of the ball screw 216 is transmitted to the nut 232 coupled to the slider 218 so as to fit the external thread formed on the outer peripheral surface of the ball screw 216 on the inner peripheral surface of the hole (not shown) defined in the center of the nut 232. The slider 218 connected to and formed integrally with the nut 232 can be moved to the maximum from the end of the casing 230 to the end of the ball screw support 234 by rotating the ball screw 216 under the above fitted condition. The bottom of an actuator 210 similar to that employed in the present embodiment may be fixedly mounted on the protrusions 244 of the table provided on the upper surface of the slider 218. Alternatively, other members connected with a work attracting and holding means such as a suction pad or the like may also be fixedly mounted on the protrusions 244.

When it is desired to readjust or change a shift position of a slider after a desired position for feeding a workpiece has been determined and set up, the screws 238 of the base plate 236 fixed to the frame 212 are loosened to enable the slider base 220 to be moved away from the frame 212 along the longitudinal direction of the frame 212. In this case, the slider base 220 can be moved in a state in which the frame 212 has been fixed to a working table or the like, for example. When the maintenance and checking of the actuator 210 is carried out, the screws 238, which have been fitted in the rail-shaped grooves 222 of the frame 212, are loosened to detach the slider base 220 from the frame 212, thereby making it possible to easily carry out its maintenance and checking.

Figure 18:
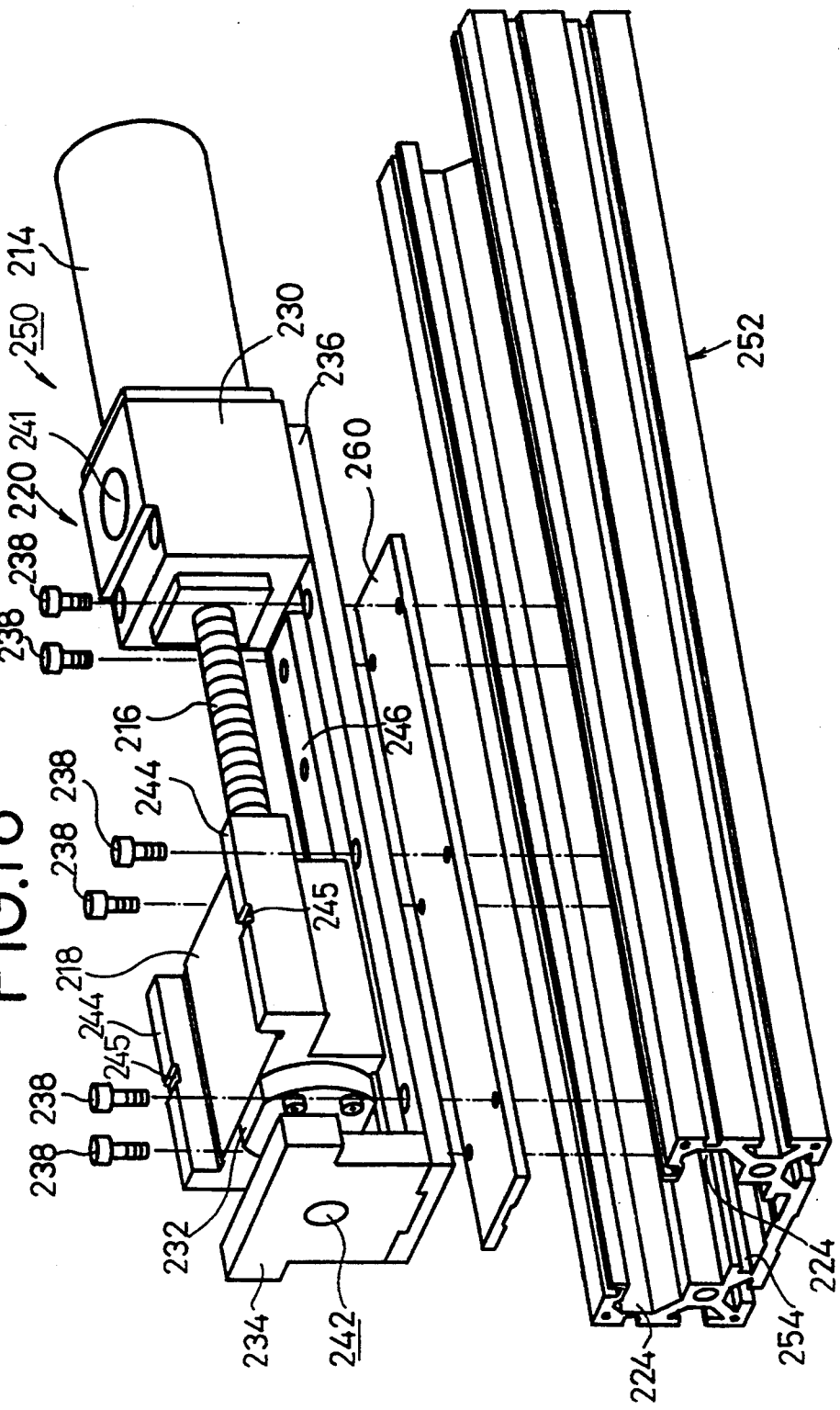
FIG. 18 is an exploded perspective view showing an actuator according to a fourth embodiment of the present invention.

FIG. 18 shows an actuator according to a fourth embodiment of the present invention.

The actuator 250 according to the fourth embodiment differs from that according to the third embodiment in that concave portions 254 are defined in the bottom of a frame 252 which constitutes an outer frame of the actuator 250 so as to fit a plate 260 in the concave portions 254 and a slider base 220 can be attached to a given position of a plate 260 from the above position. After the plate 260 has been inserted in the concave portions 254, it is fixed to a base plate 236 of the slider base 220 by screws 238, thereby making it possible to move the slider base 220 under the action of displacement of the plate 260.

Components employed in the fourth embodiment and embodiments subsequent to the fourth embodiment, which are identical to those employed in the third embodiment, are identified by like reference numerals and their detailed description will therefore be omitted.

The operation of the actuator 250 according to the fourth embodiment will now be described. The base plate 236 of the slider base 220 provided in continuation with a motor 214, a slider 218, etc. is first fixed to the plate 260 by the screws 238. Then, the plate 260 coupled to the base plate 236 of the slider base 220 is slid along the longitudinal direction of the frame 252 from one end on the frame 252 so as to be inserted in the concave portions 254 defined in the bottom of the frame 252. The plate 260 can also be attached to a desired position as seen from the upper surface of the frame 252. When it is desired to read-just or change a shift position of the slider base 220 after the slider base 220 has been coupled to the frame 252 and the position of a workpiece to be fed has been set, the screws 238 are loosened so as to slide the plate 260 inserted in the concave portions 254, thereby enabling the slider base 220 to be moved with ease.

A description will now be made of a fifth embodiment in which the slider base of the above actuator is used in plural form.

Figure 19:
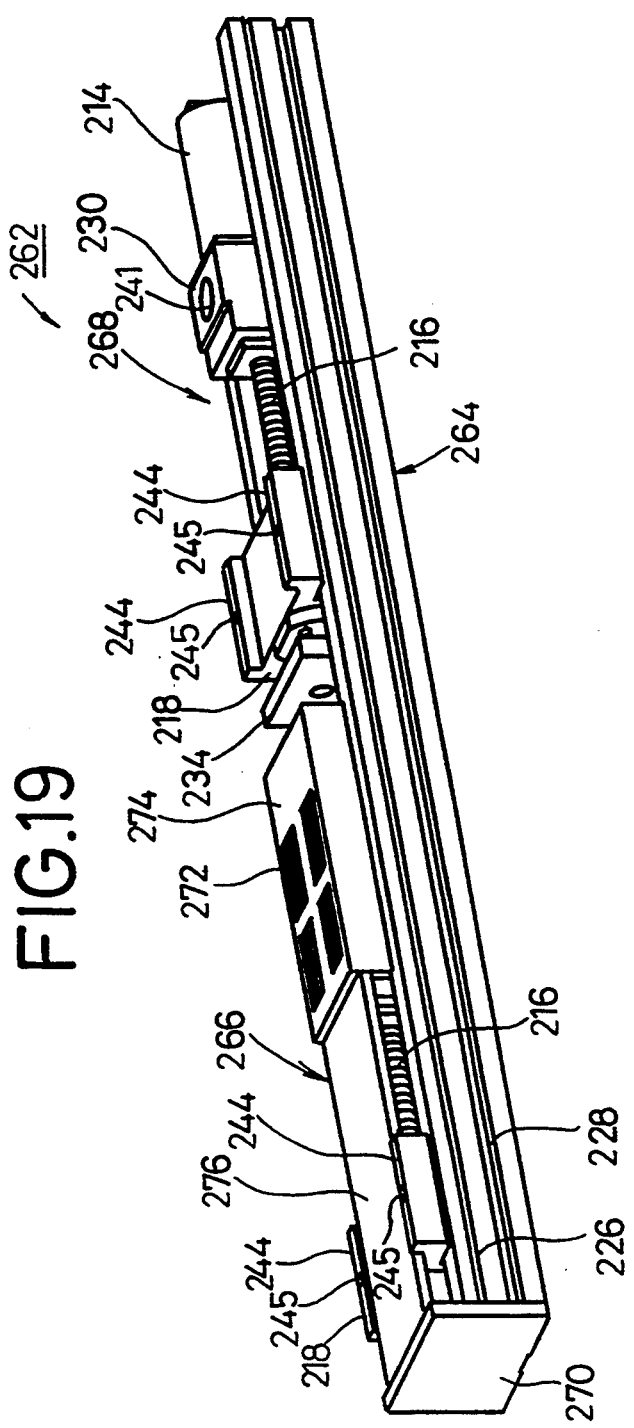
FIG. 19 is an exploded perspective view illustrating an actuator according to a fifth embodiment of the present invention.

As shown in FIG. 19, the actuator 262 according to the fifth embodiment basically comprises a slider base 266 and a slider base 268 both of which are disposed in an elongated frame 264 representative of an outer frame thereof and are disposed adjacent to each other in series, and two sliders 218. An end plate 270 is attached to one end of the frame 264. In addition to the components of the above-described actuator 210, the slider base 266 includes a motor 214 and a casing 230 held therein, and a cover 274 having a plurality of slits 272 engraved thereon. In addition, the slider base 266 also has a plate-shaped cover 276 disposed on a table of the slider 218. Opposed protrusions 244 are formed so as to extend upward from both ends of the table. The operation of each of both the slider bases 266 and 268 of the actuator 262 is identical to that of the fourth embodiment, and its detailed description will therefore be omitted.

An actuator according to a sixth embodiment of the present invention will now be described below.

Figure 20:
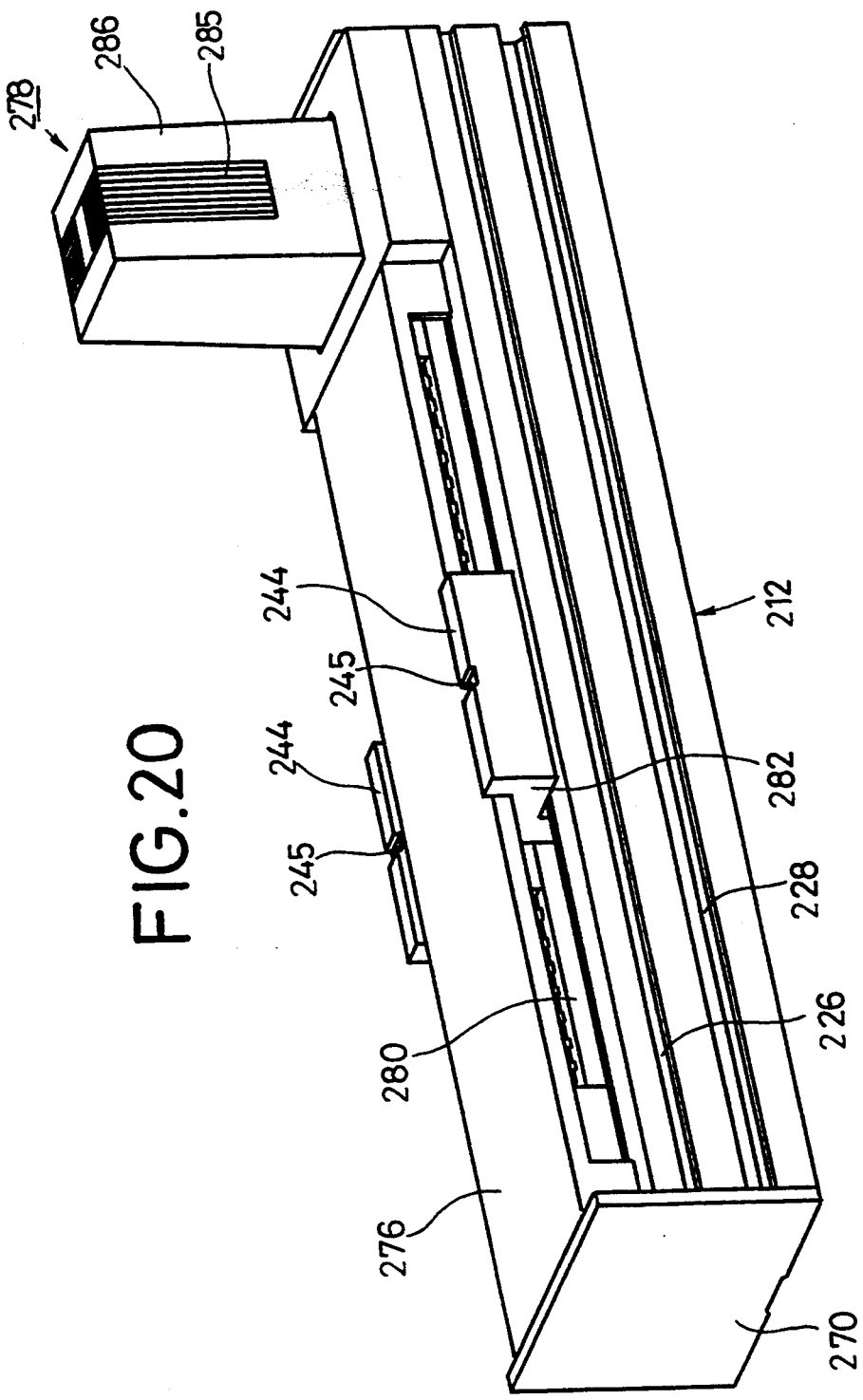
FIG. 20 is an exploded perspective view showing an actuator according to a sixth embodiment of the present invention.
Figure 21:
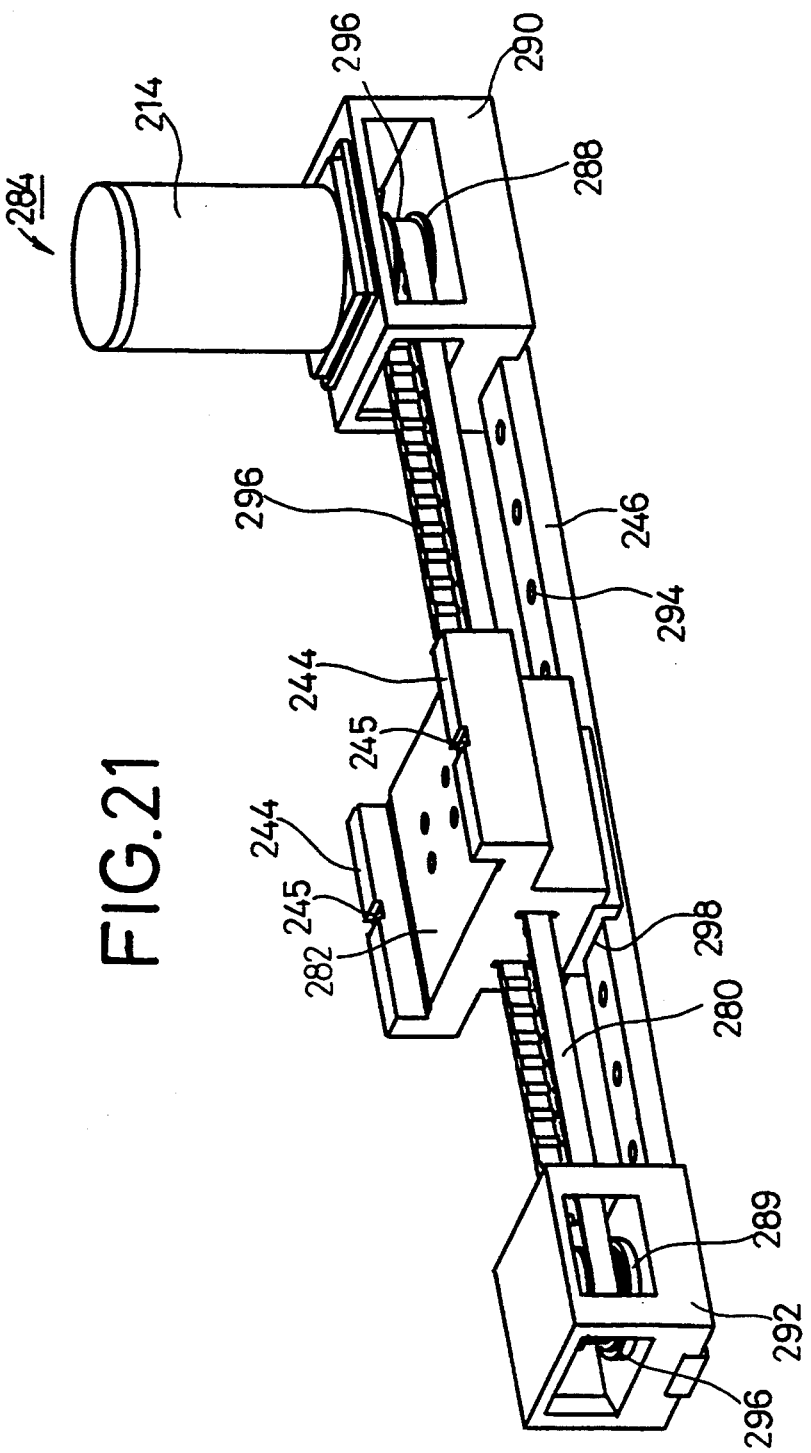
FIG. 21 is a perspective view depicting a slider base of the actuator shown in FIG, 20.

The actuator 278 shown in FIG. 20 has a feature in that a slider is moved by using a timing belt 280 serving as a drive mechanism (see FIG. 21).

The actuator 278 according to the sixth embodiment basically comprises a frame 212 which constitutes an outer frame thereof, and a slider base 284 comprising a motor 214, the timing belt 280, a slider 282, etc.

The frame 212 has rail-shaped grooves defined centrally in the inner bottom thereof and concave portions 224 defined in inner both sides thereof along the longitudinal direction thereof. The frame 212 is molded by casting in integral form. Incidentally, an end plate 270 is attached to one end of the frame 212.

The slider base 284 comprises the cylindrical motor 214 which is accommodated in a box-type cover 286 having a plurality of slits 285 engraved therein and which serves as a drive unit, a motor pulley unit 290 having a disk-shaped rotor 288 activated to transmit the rotational motion of the motor 214 and a tension adjusting mechanism, the timing belt 280 serving as a drive mechanism, the slider 282 linearly moved in both the left and right directions in accordance with the rotation of the timing belt 280, an idle pulley unit 292 located in one end of the timing belt 280 and having a disk-shaped rotor 289, and a guide 246 which has one end provided in continuation with the motor pulley unit 290 and the other end provided in continuation with the idle pulley unit 292 and which enables the slider 282 to be linearly moved between the motor pulley unit 290 and the idle pulley unit 292. A plurality of screw holes 294 for connecting the slider base 284 to a base plate 236 by screws are defined in the guide 246 at given intervals.

The timing belt 280 has a plurality of projections 296 formed for every given intervals. The timing belt 280 travels on a circumferential base by bringing the projections 296 into meshing engagement with respectively corresponding concave portions (not shown) de=fined in annular bodies of the rotors 288 and 289 of the motor pulley unit 290 and the idle pulley unit 292. The slider 282 has a concave portion 298 defined in the bottom thereof. When the concave portion 298 is held against the upper surface of the guide 246, the slider 282 can be slidingly moved along the guide 246. Further, the slider 282 has a substantially rectangular and plate-shaped cover 276 disposed on the upper surface thereof, and opposed protrusions 244 formed so as to extend upward from both ends of a table of the slider 282.

The operation of the actuator 278 according to the sixth embodiment will now be described below under the above-described construction.

As shown in FIG. 21, the slider base 284 provided in continuation with the motor pulley unit 290 attached to one end of the guide 246 and the idle pulley unit 292 attached to the other end thereof, is first fixed to the frame 212. At this time, the slider base 284 is coupled to the base plate 236 by causing the screws to threadedly engage their corresponding screw holes 294 defined in the guide 246. In addition, a plate is inserted in rail-shaped grooves 254 engraved in the bottom of the frame 212. Afterwards, the plate is tightened by screws 238 so as to fix the slider base 284 to the frame 212. After the slider base 284 has been fixed to the frame 212 in this way, CIM controller and a sequencer or the like, which are not shown, are activated to energize the motor 214 electrically connected to a power source so as to rotate the rotor 288 disposed in the motor pulley unit 290 in synchronism witch the rotation of the motor 214. When convex portions of the timing belt 280 are brought into meshing engagement with the corresponding concave portions defined in the rotor 288, the timing belt 280 travels on the circumferential base. The circumferential motion of the timing belt 280 is transmitted to the inside (not shown) of the slider 282, so that the slider 282 is moved in the direction of the circumferential motion of the timing belt 280. Thus, the slider 282 can be moved to the maximum from the end of the motor pulley unit 290 to the end of the idle pulley unit 292. An actuator 278 similar to that according to the present embodiment can also be mounted onto the protrusions 244 which extend from both ends of the upper surface of the slider 282. Alternatively, other members connected with a workpiece attracting and holding means may be coupled to the protrusions 244.

Thus, when it is desired to readjust a shift position of the slider base 284 after a desired position for feeding the workpiece has been determined and set up, the covers 276, 286 are detached from the frame 212 and the screws 238 by which the base plate 236 of the slider base 284 has been fixed to the frame 212, are loosened so as to slide the slider base 284. Afterwards, the slider base 284 is refixed to the frame 212 by the screws 238.

Figure 23:
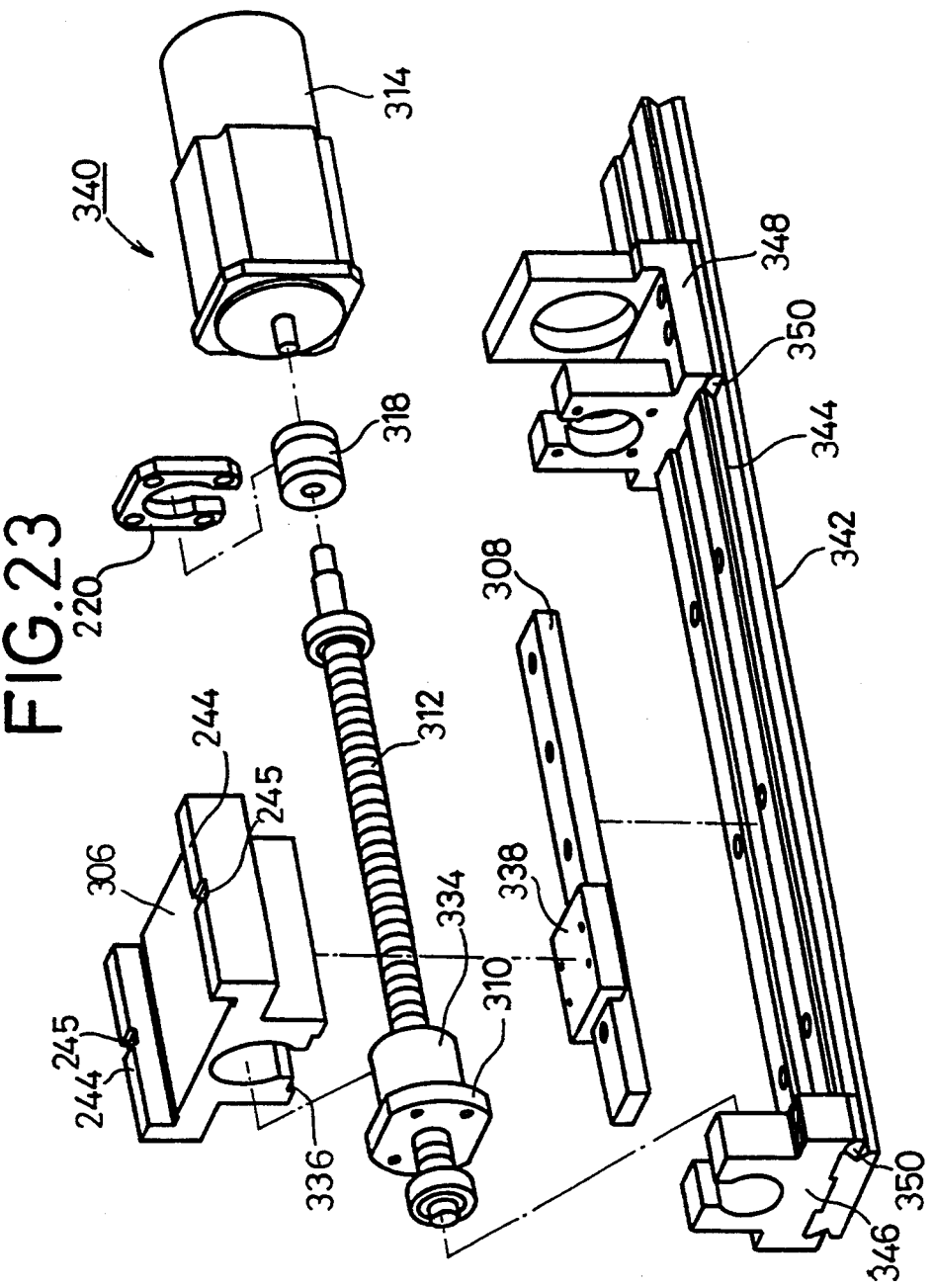
FIG. 23 is an exploded perspective view illustrating an actuator according to an eighth embodiment of the present invention.
Figure 24:
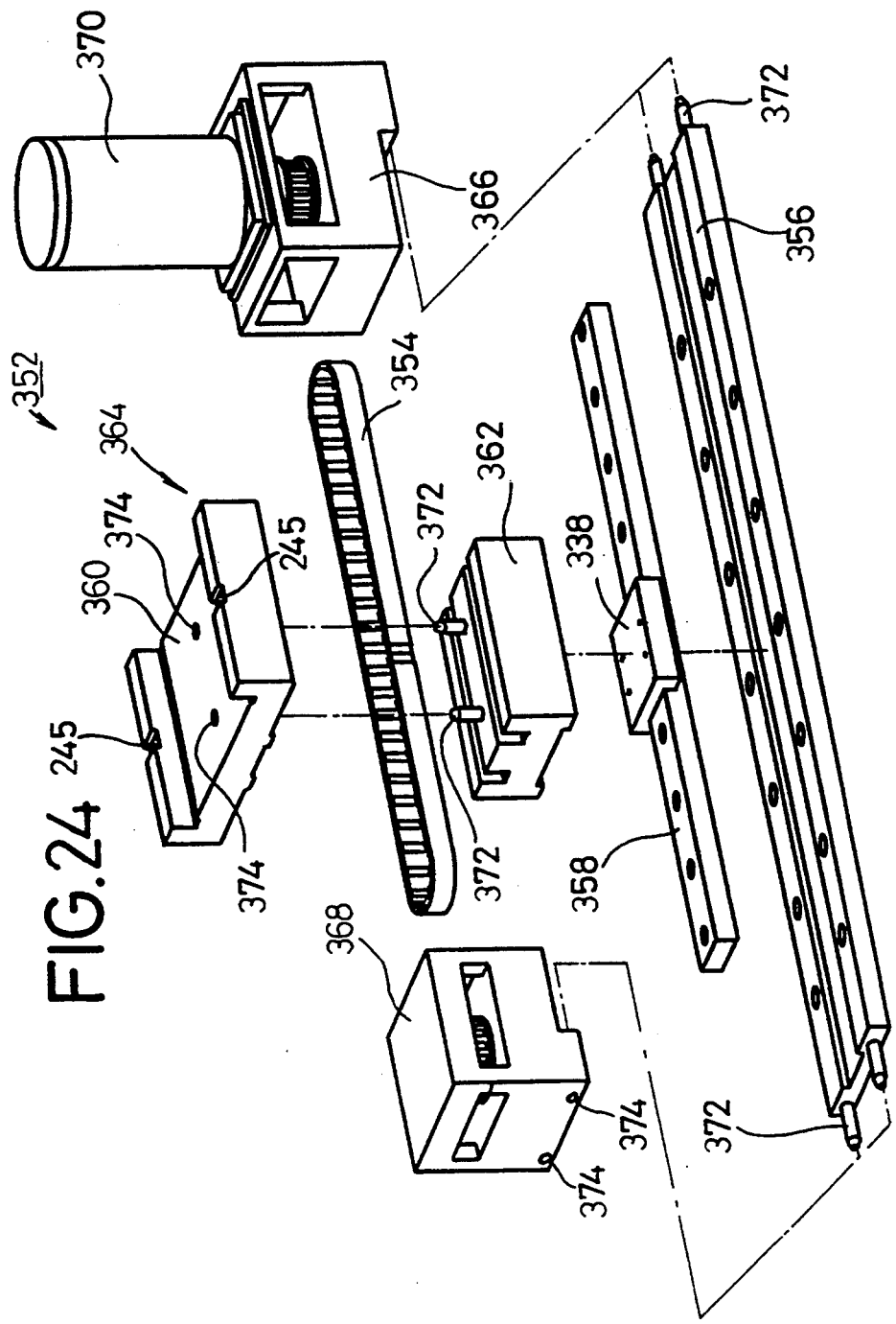
FIG. 24 is an exploded perspective view showing an actuator according to a ninth embodiment of the present invention.
Figure 25:
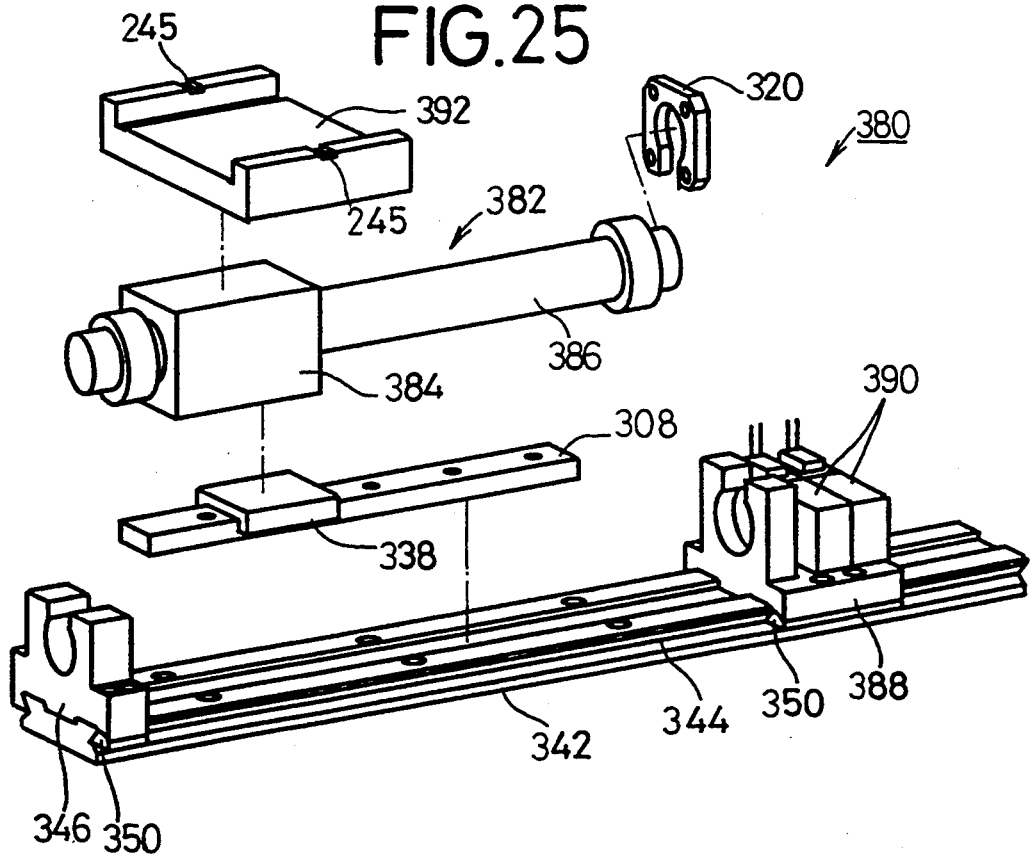
FIG. 25 is an exploded perspective view depicting an actuator according to a tenth embodiment of the present invention.
Figure 26:
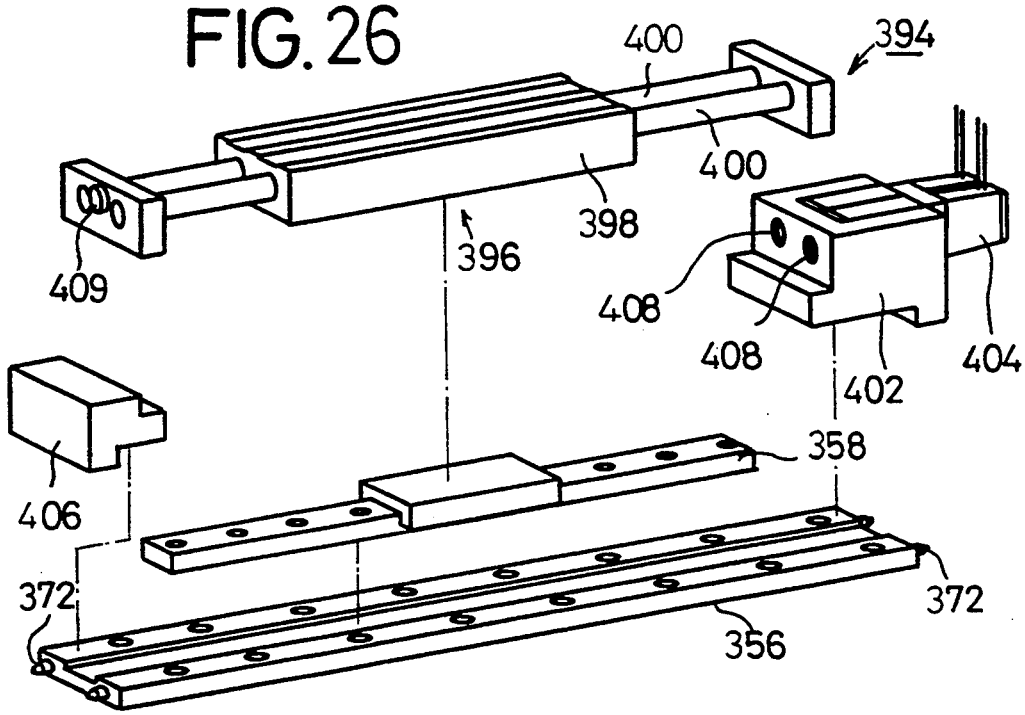
FIG. 26 is an exploded perspective view showing an actuator according to an eleventh embodiment of the present invention.

Then, module-type actuators according to seventh to eleventh embodiments of the present invention, which facilitate both the assembly and deassembly of components of respective slider bases, are shown in FIGS. 22 through 26. Incidentally, the seventh to ninth embodiments shown in FIGS. 22 through 24 differ from the remaining embodiments in that electric motors are used as drive sources, whereas the embodiments illustrated in FIGS. 25 and 26 are different from the remaining embodiments in that compressed air or liquid pressure such as vacuum pressure or the like is used as a drive source.

Figure 22:
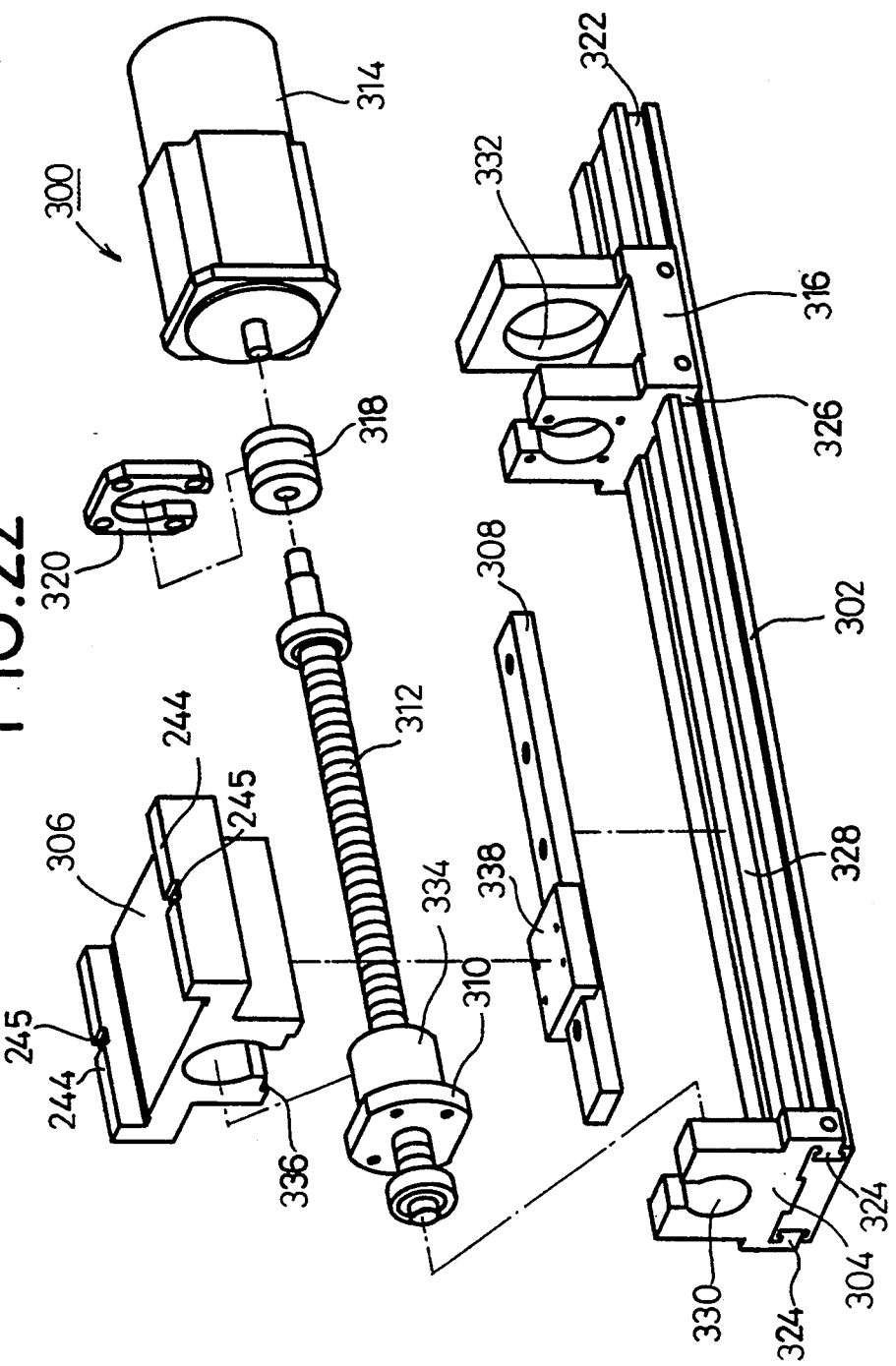
FIG. 22 is an exploded perspective view showing an actuator according to a seventh embodiment of the present invention.

FIG. 22 shows a slider base 300 which constitutes the actuator according to the seventh embodiment.

The slider base 300 comprises a base plate 302 uses as a foundation base, an end block 304 attached to one end of the base plate 302, a slider 306, a guide 308, a ball screw 312 on which a ball screw holder 310 serving as a drive mechanism is mounted, an electric motor 314 serving as a drive source, a valve block 316 acting as intermediary for transmission or transfer of the rotational motion between the electric motor 314 and the ball screw 312, an annular body 318, and a holding fitting 320.

A description will now be made of a method of assembling the actuator according to the seventh embodiment. A pair of protrusions 324 of the end block 304 is first slid in the longitudinal direction of the base plate 302 along linearly-extending grooves 322 from one end of the base plate 302 having the grooves 322 defined therein. Likewise, a pair of protrusions 326 of the valve block 316 is then slid horizontally along the grooves 322 from the other end of the base plate 302, so that the protrusions 326 can be fixed to the base plate 302. Further, the guide 308 is fitted in a concave portion 328 defined in the base plate 302. Next, the ball screw 312 and the electric motor 314 are respectively inserted in an opening or aperture 330 defined in the end block 304 and an opening or aperture 332 defined in the valve block 316 by means of the annular body 318 and the holding fitting 320. After the above components have been attached in the above-described manner, the lower part of the slider 306 is horizontally slid so as to be fitted on a cylindrical part of the ball screw holder 310 coupled to the ball screw 312. Afterwards, the slider 306 is attached to the guide 308 in such a manner that a block 338 continuously attached to the guide 308 is inserted in a concave portion 336 defined in the lower surface of the slider 306.

The slider base 300 can be simply assembled on-site in the above-described manner. Likewise, the slider base 300 can be so deassembled that its maintenance and checking can be easily carried out. Even when it is necessary to replace components, i.e., parts by others after the maintenance and checking of the slider base 300 have been completed, the parts can be easily replaced by others. The length of the base plate 302 can be adjusted by cutting the base plate 302 to a desired length.

Now, FIG. 23 shows a slider base 340 which constitutes the actuator according to the eighth embodiment.

The slider base 340 shown in FIG. 23 differ from the slider base 300 illustrated in FIG. 22 in that grooves 344 defined in sides of a base plate 342 are defined at acute angles. Thus, when an end block 346 and a valve block 348 are attached or fixed to the base plate 342, it is unnecessary to slide the end block 346 and the valve block 348 in a horizontal direction and fix them to the base plate 342. In addition, interlocking lugs 350 of the end block 346 and those of the valve block 348 are vertically inserted in the respectively corresponding grooves 344 of the base plate 342 from desired positions in such a manner that the opposed grooves 344 are interposed between the opposed interlocking lugs 350 as seen from the sides of the base plate 342, thereby making it possible to fix the end block 346 and the valve block 348 to the base plate 342. Other construction and operations of the slider base 340 are identical to those of the slider base 300, and their detailed description will therefore be omitted.

FIG. 24 illustrates a slider base which forms the actuator according to the ninth embodiment. The slider base 352 differs from the slider bases 300, 340 in that a timing belt 354 is used as a drive source.

The slider base 352 shown in FIG. 24 comprises a base plate 356, a guide 358, a slider 364 comprised of a table top 360 and a slide table 362, a motor pulley unit 366, an idle pulley unit 368, a timing belt 354, and a motor 370.

The slider base 352 can be assembled by inserting protrusions or pins 372 of the base plate 356 and the slide table 362 in respectively corresponding holes 374 of the motor pulley unit 366, the idle pulley unit 368 and the table top 360, for example.

Each of slider bases 380, 394 shown in FIGS. 25 and 26, which constitute the actuators according to the tenth and eleventh embodiments, has a feature in that compressed air or liquid pressure such as vacuum pressure or the like is used as a drive source and a rodless cylinder and a cylinder having band-type seal slits are used as a drive mechanism.

Referring now to FIG. 25, the rodless cylinder 382 comprises a rectangular parallelopiped housing 384, a cylindrical tube 386, an unillustrated internally-disposed piston, etc. A valve block 388 having interlocking lugs 350 fixedly mounted in corresponding grooves 344 of a base plate 342 is provided with a pair of solenoid controlled valves 390 for changing over the flow of the compressed air to be supplied to the rodless cylinder 382. In the rodless cylinder 382, the compressed air is introduced from unillustrated ports defined in both ends of the tube 386. Then, the solenoid controlled valves 390 are actuated to change over the flow of the compressed air to displace a piston (not shown) disposed in the tube 386 in left and right end directions, i.e., in the longitudinal direction of the rodless cylinder 382, thereby making it possible to continuously carry out the reciprocating linear motion of the piston. An unillustrated ring-shaped magnet is connected to the piston, whereas an unillustrated magnet is incorporated even in the housing 384. Thus, the housing 384 is also moved under the action of a magnetic holding or attracting force of the magnet in accordance with the motion of the piston. A table top 392 can be used so as to be held against the upper surface of the housing 384. The rodless cylinder 382 can also be replaced by a rodless cylinder similar to the cylinder 382, which is used with a rectangular or elliptic piston for reducing the vertical position without making a change in area of the piston, which is subjected to pressure.

The slider base 394 shown in FIG. 26 differs from the slider base 380 in that the rodless cylinder 396 is used in common in the same manner as described above, but two piston rods 400 for preventing a housing 398 from being rotated, are provided. Reference numerals 402, 404, 406 indicate a valve block, a solenoid controlled valve and an end plate respectively. Reference numerals 408, 408 indicate compressed-air intake and output ports respectively, and reference numeral 409 indicates a shock absorber. Moreover, for example, an operation for moving the housing 398 by a holding or attracting force of a magnet coupled to a piston is identical to the above-described action, and its detailed description will therefore be omitted.

Now, connecting means for connecting the beam members and the actuators or the like to one another will be described below with reference to FIGS. 27 through 34.

FIGS. 27 and 28 show a first example of a connecting means. FIG. 27(A) is a partly cut front view showing the manner of connection of beam members to each other. FIG. 27(B) is a partly sectional side view of FIG. 27(A). FIG. 28 is an exploded perspective view showing beam members.

Referring to FIG. 28, each of beam members 444, which is identical in structure to each other, has a plurality of linearly-extending grooves 446 defined in respective sides of the beam members 444 along the longitudinal directions thereof. A plate 450 fastened onto the beam member 444 by a screw 448 is slidably disposed in the corresponding groove 446. The leading end 451 of the screw 448 is shaped in the form of a cone. Each of the beam members 444 has a plurality of fluid passages 452 serving as paths for transporting or delivering fluids such as air, oil, water, which are defined in the corners of both ends of each beam member 444 so as to extend therethrough. In addition, each beam member 444 has a through hole 460 defined substantially in the center thereof, for inserting a bolt 458 therein against a spring 456. The head 462 of the bolt 458 is formed so as to be associated with the shape in cross section of each groove 446. In addition, the head 462 is loose-fit in the corresponding groove 446 from one end of the beam member 444 in the direction substantially normal to the groove 446. The bolt 458 has a V-shaped groove 464 defined centrally therein and a circular recess 466 for receiving the spring 456 therein, which is defined on the side opposite the head 462.

When the beam members 444 are then connected to each other, the plate 450 is inserted in the corresponding groove 446 from one end of one beam member 444 and the spring 456 and the bolt 458 are inserted in the corresponding hole 460 along the longitudinal direction thereof. In addition, the head 462 of the bolt 458 is loose-fit in the corresponding groove 446 in the direction normal to the groove 446 on one end side of the beam member 444. Then, the beam members 444 are connected and fixed to each other substantially at a right angle with the bolt 458 by causing the screw 448 to threadedly engage its corresponding hole of the plate 450 through the groove 446. That is, when a slanted surface of the leading end 451 of the screw 448 is brought into abutment against a slanted surface of the V-shaped groove 464 of the bolt 458 as shown in FIG. 27(B), the head 462 formed integrally with the bolt 458 is displaced in the direction indicated by the arrow A. As a result, the reverse side of the head 462, which has been loose-fit in the groove 446, is held against the groove 446 to thereby fix the beam members 444 to each other. Thus, the beam members 444 can be easily connected, thereby making it possible to transmit a fluid pressure signal through each of the fluid passages 452 in the beam members 444.

When the connection between the beam members 444 is then released so as to separate the beam members 444 from each other, the screw 448 is loosened to displace the bolt 458 in the direction indicated by the arrow B under the action of a resilient force of the spring 456. The reverse side of the head 462 of the bolt 458 is spaced away from the groove 446 by the above displacement to thereby loose-fit the head 462 of the bolt 458 in the groove 446. By loose-fitting the head 462 of the bolt 458, the head 462 of the bolt 458 inserted in the other beam member 444 can be slidably moved from the groove 446 of one beam member 444. Thus, the head 462 of the bolt 458 can be taken out from the groove 446 by moving the beam member 444 along the groove 446. A description has been made, as the first example of the connecting means, of a case in which the beam members are connected to each other. However, both methods of connecting a beam member to an actuator and connecting actuators to each other are also identical to the above method and their detail description will therefore be omitted.

Figure 29:
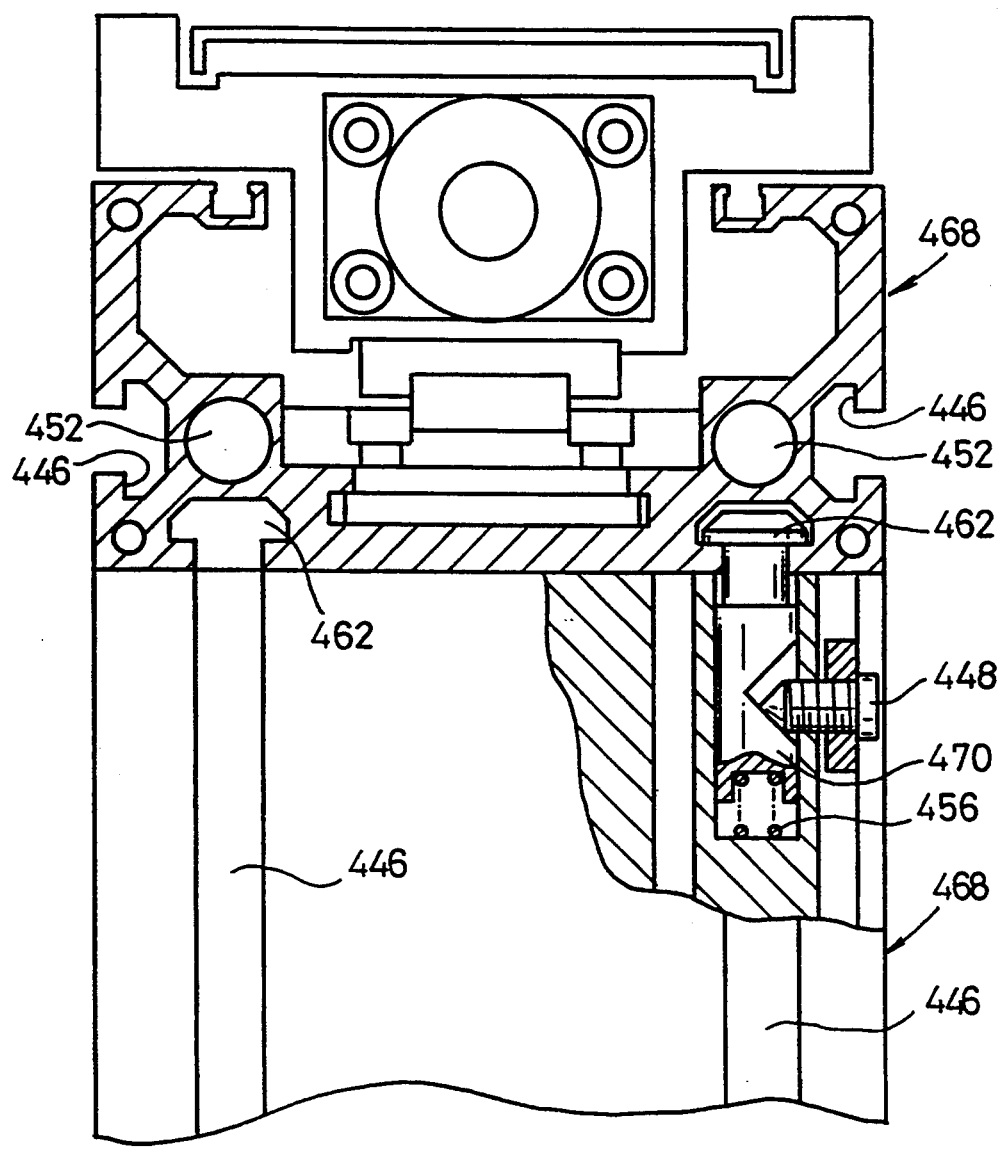
FIG. 29 is a partly cross-sectional view showing a second example of a connecting means.

A second example of a connecting means shown in FIG. 29 differs from the first example in that parallel grooves 446 are defined in one side of a beam member 468 and two bolts 470 formed integrally with heads 462 loose-fit in the grooves 446 are provided. Incidentally, components employed in examples subsequent to the second example of the connecting means, which are substantially identical to those employed in the first and second examples, are identified by like reference numerals and their detailed description will therefore be omitted.

Figure 30:
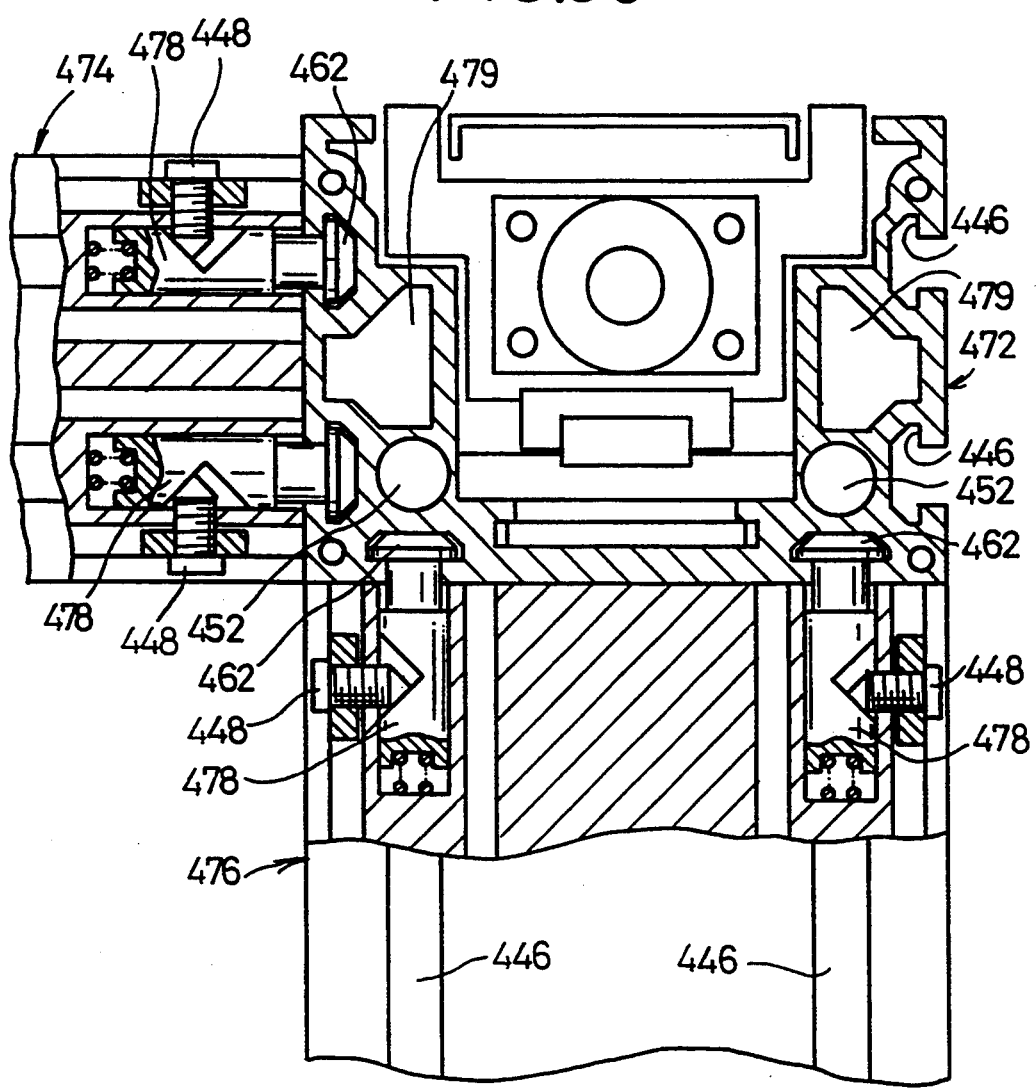
FIG. 30 is a partly cross-sectional view depicting a third example of a connecting means.
Figure 31:
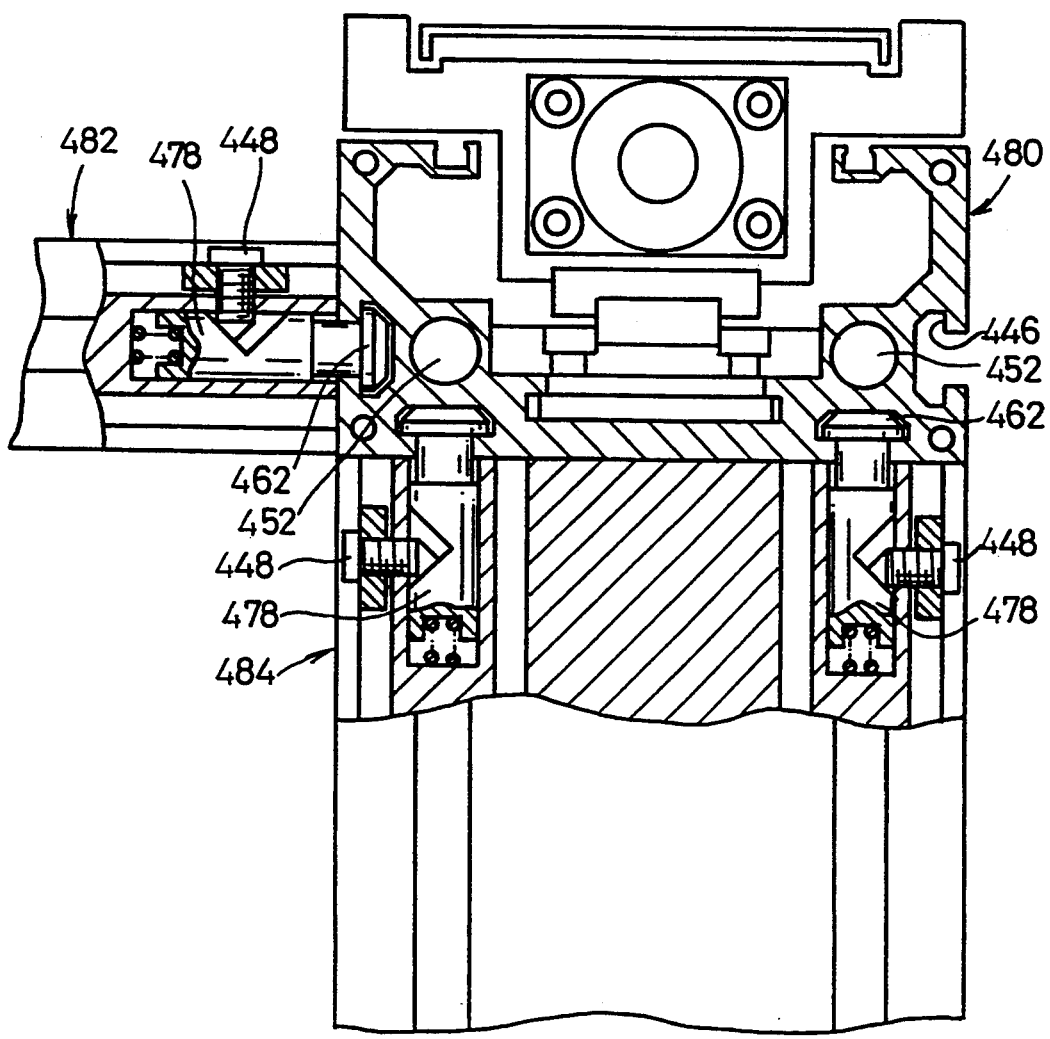
FIG. 31 is a partly cross-sectional view showing a fourth example of a connecting means.
Figure 32:
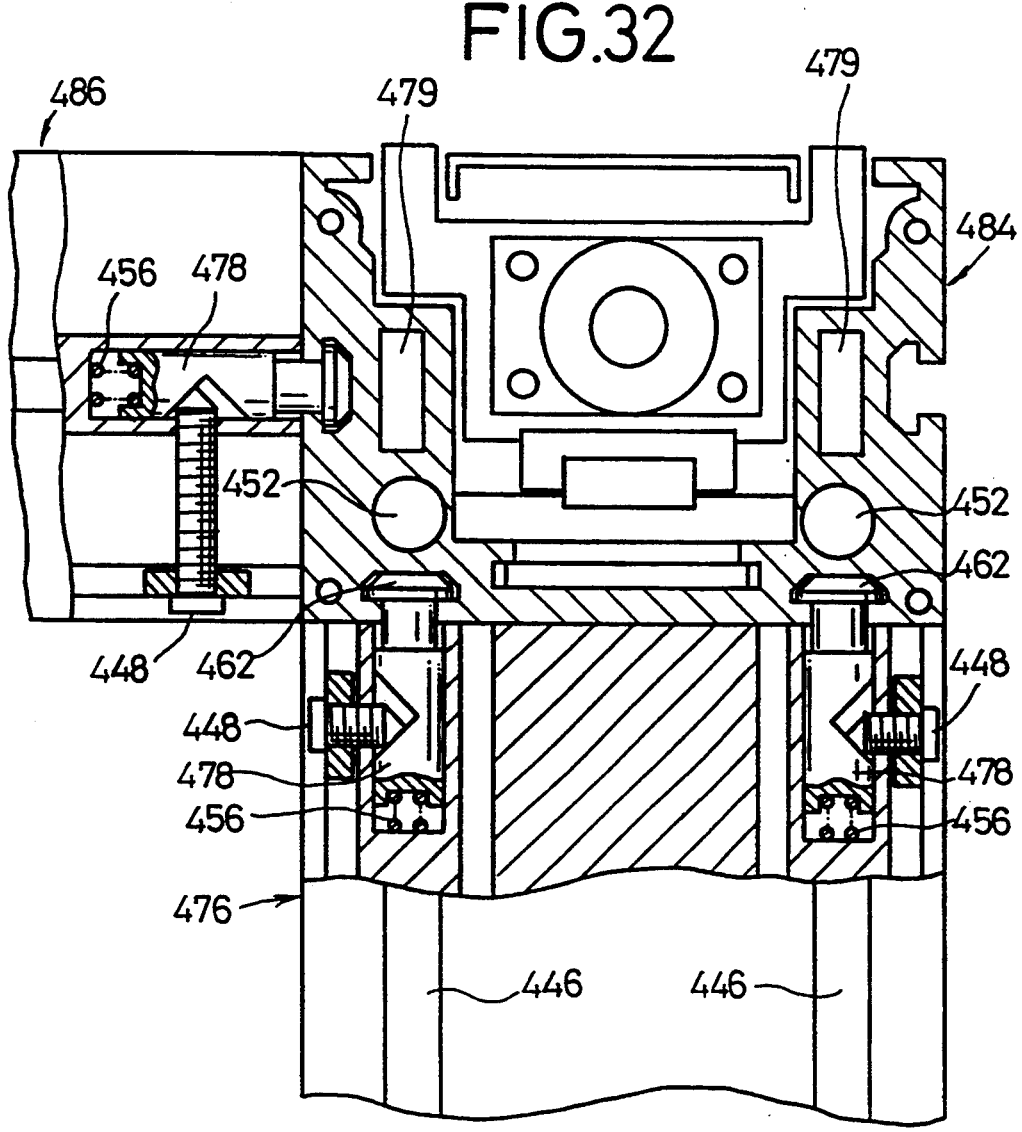
FIG. 32 is a partly cross-sectional view illustrating a fifth example of a connecting means.

In third through fifth examples of connecting means shown in FIGS. 30 through 32, for example, beam members are tridirectionally connected to one another substantially at right angles. In the third example shown in FIG. 30, a second beam member 474 and a third beam member 476 are perpendicularly held against two sides of a first beam member 472, whose widths are different from each other. Upon connection of the second and third beam members 474, 476 to the two sides of the first beam member 472, however, the second beam member 474 and the third beam member 476 are respectively connected to the first beam member 472 by inserting respective two bolts 478 in their corresponding grooves 446 defined parallel in the sides. Opposed electric signal transmission paths 479 formed in the same manner as the above-described fluid passages extending along the longitudinal direction are defined in each of the first through third beam members 472, 474, 476. Thus, a centralized wiring system can be made by using the electric signal transmission paths 479. The fourth example shown in FIG. 31 shows a case in which a single bolt 478 is inserted in a corresponding groove 446 defined in parallel in one side of a second beam member 482 to thereby connect the second beam member 482 having a connecting surface narrower than one side of the first beam member 480 to the first beam member 480. The fifth example shown in FIG. 32 differs from the third example depicted in FIG. 30 in that a second beam member 486 is held against one side of a first beam member 484 by fitting a single bolt 478 in a corresponding groove 446 defined in parallel in one side of the second beam member 486.

In the connecting means employed in the actuator arrangements of the present invention, the number of sides can be increased by shaping end cross-sections of beam members, actuators, etc. in the form of polygons such as a quadrangle, a hexagon, etc. It is needless to say that the end cross-sections may be shaped in the form of either a circle or a substantially circle. The beam members can be easily connected to one another in multi-directions by defining desired grooves in the sides, loose-fitting bolts in the grooves and screwing the beam members to the respectively corresponding beam members.

Figure 33:
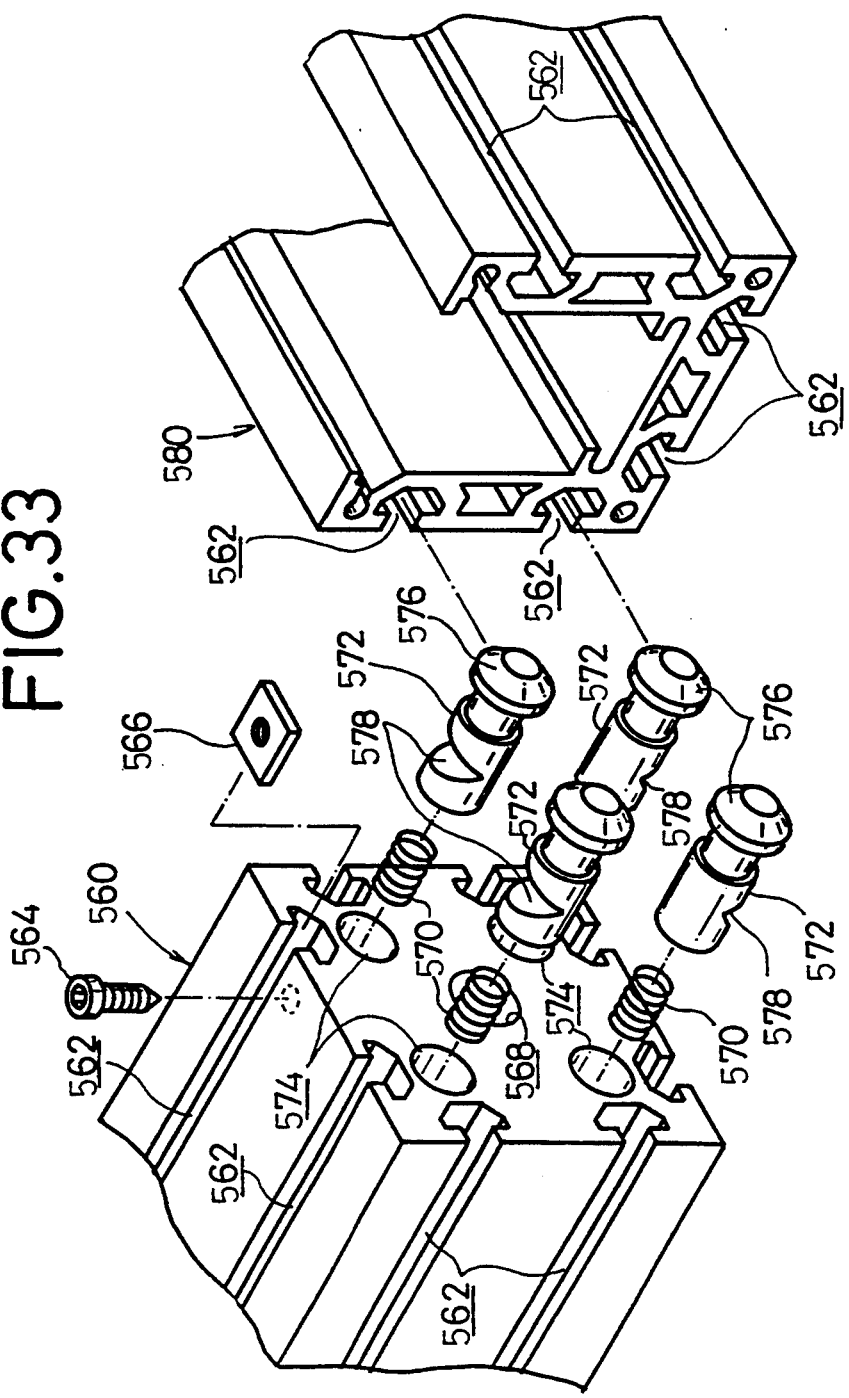
FIG. 33 is a perspective view showing a sixth example of a connecting means.
Figure 34:
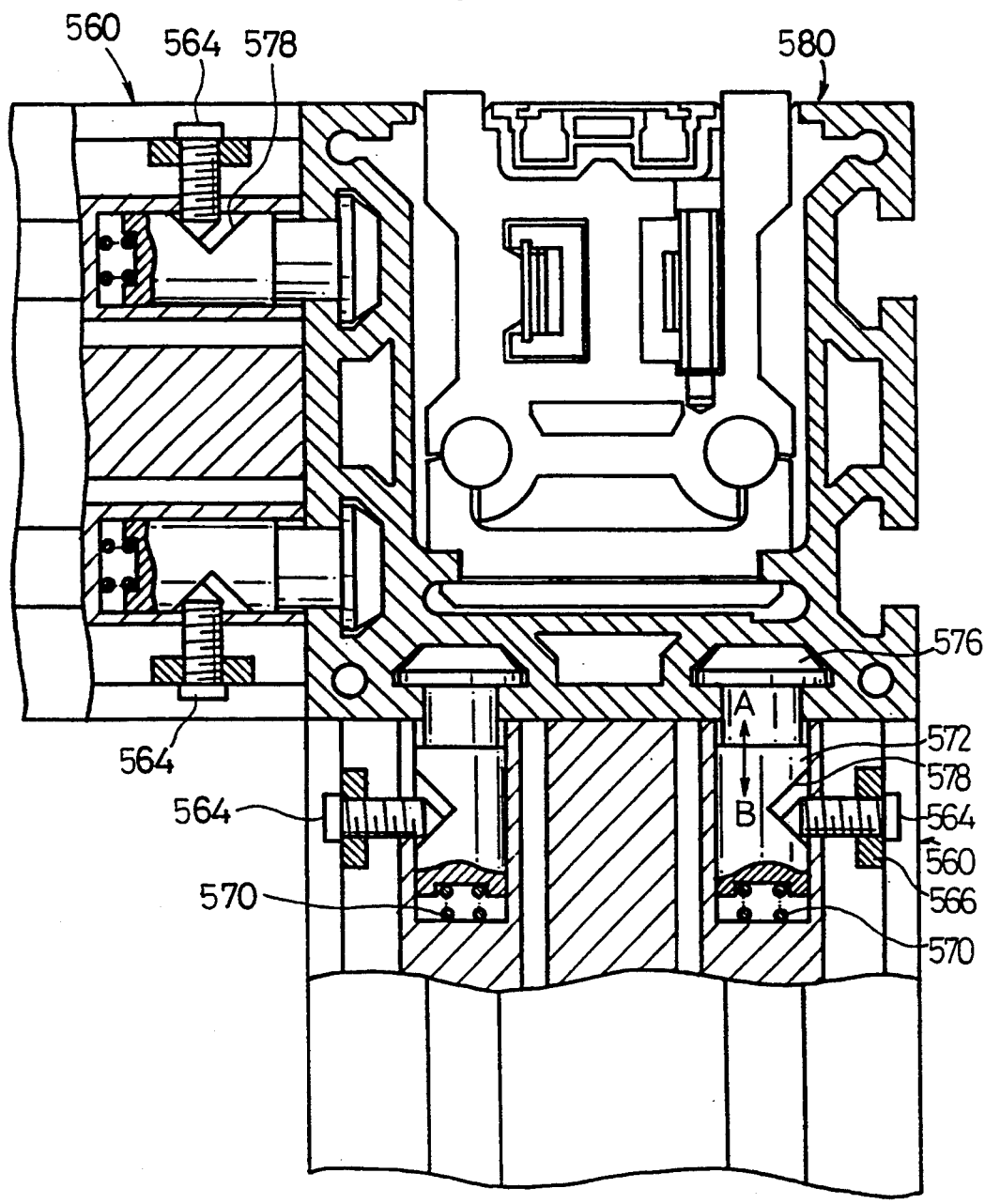
FIG. 34 is a partly cross-sectional view depicting the sixth example of the connecting means.

A sixth example of a connecting means will now be shown in FIGS. 33 and 34.

In FIG. 33, a beam member 560 has a plurality of linearly-extending grooves 562 defined in respective outer sides two by two so as to run substantially parallel to one another along the longitudinal direction thereof. Each of plates 566 to be tightened by a screw 564 is slidably disposed in each of the grooves 562. The leading end of the screw 564 is shaped in the form of a cone. The beam member 560 has a fluid passage 568 serving as a path for transporting or delivering fluids such as air, oil, water, which is internally defined substantially in the center thereof so as to extend therethrough. In addition, the beam member 560 has a plurality of through holes 574 defined in the vicinity of the four corners thereof, for inserting bolts 572 therein through springs 570 respectively. The heads 576 of the bolts 572 are formed so as to be associated with the shapes in cross sections of the grooves 562. Further, the heads 576 are loose-fit in the corresponding grooves 562 in the direction substantially normal to the grooves 562 as seen from one end of the beam member 560. The bolts 572 have a plurality of grooves 578 having V-shaped cross sections, which are defined centrally therein, and a plurality of circular recesses (not shown) for receiving the springs 570 therein, which are defined on the side opposite the heads 576.

When the beam member 560 is connected to a frame 580 provided therein with a slider base, a motor, etc., which are not shown, the plate 566 is inserted in each of the grooves 562 from one end of the beam member 560, and the spring 570 and the bolt 572 are inserted in each of the holes 574 along the longitudinal direction of each hole 574. In addition, the head 576 of each of the bolts 572 is loose-fit in the groove 562 in the direction normal to each groove 562 on one end side of the frame 580. Then, the beam member 560 and the frame 580 are connected and fixed to each other substantially at a right angle with the bolts 572 by causing the screws 564 to threadedly engage their corresponding holes of the plates 566 through the grooves 562. That is, when a slanted surface of the leading end of each of the screws 564 is brought into abutment against a slanted surface of each of the grooves 578 of the bolts 572 as shown in FIG. 34, the head 576 formed integrally with each bolt 572 is displaced in the direction indicated by the arrow B. The reverse side of the head 576, which has been loose-fit in each groove 562, is held against the groove 562 by the displacement of the head 576 in the direction indicated by the arrow B to thereby fix the frame 580 to the beam member 560. Thus, the beam member 560 can be easily connected to the frame 580, thereby making it possible to transmit a fluid pressure signal through the fluid passage 568 in the first beam member 560. It is preferable that a shielding means for surrounding a connected portion between the beam member 560 and the frame 580 is disposed in the above connected portion in order to hold the airtightness of the fluid passage 568 to be connected to the other. It is also possible to increase the rigidity of each of the beam member 560 and the frame 580 and more rigidly connect them to each other.

When the connection between the beam member 560 and the frame 580 is then released so as to separate the frame 580 from the beam members 560, the screws 564 are loosened to displace the bolts 572 in the direction indicated by the arrow A under the action of resilient forces of the springs 570. When the bolts 572 are displaced in the direction indicated by the arrow A in this way, the reverse sides of the heads 576 of the bolts 572 are spaced away from the grooves 562 to thereby re-loose-fit the heads 576 of the bolts 572 in the grooves 562, respectively. By loose-fitting the heads 576 of the bolts 572 in the grooves 562 in this way, the heads 576 of the bolts 572 inserted in the beam member 560 can be slidably moved away from the grooves 562 of the frame 580. Thus, the heads 576 of the bolts 572 can be detached from the grooves 562 by moving the frame 580 along the grooves 562.

A description will now be made of a case in which an assembly comprising a plurality of mutually-connected actuators according to the present invention is used as an actuator arrangement.

Figure 35:
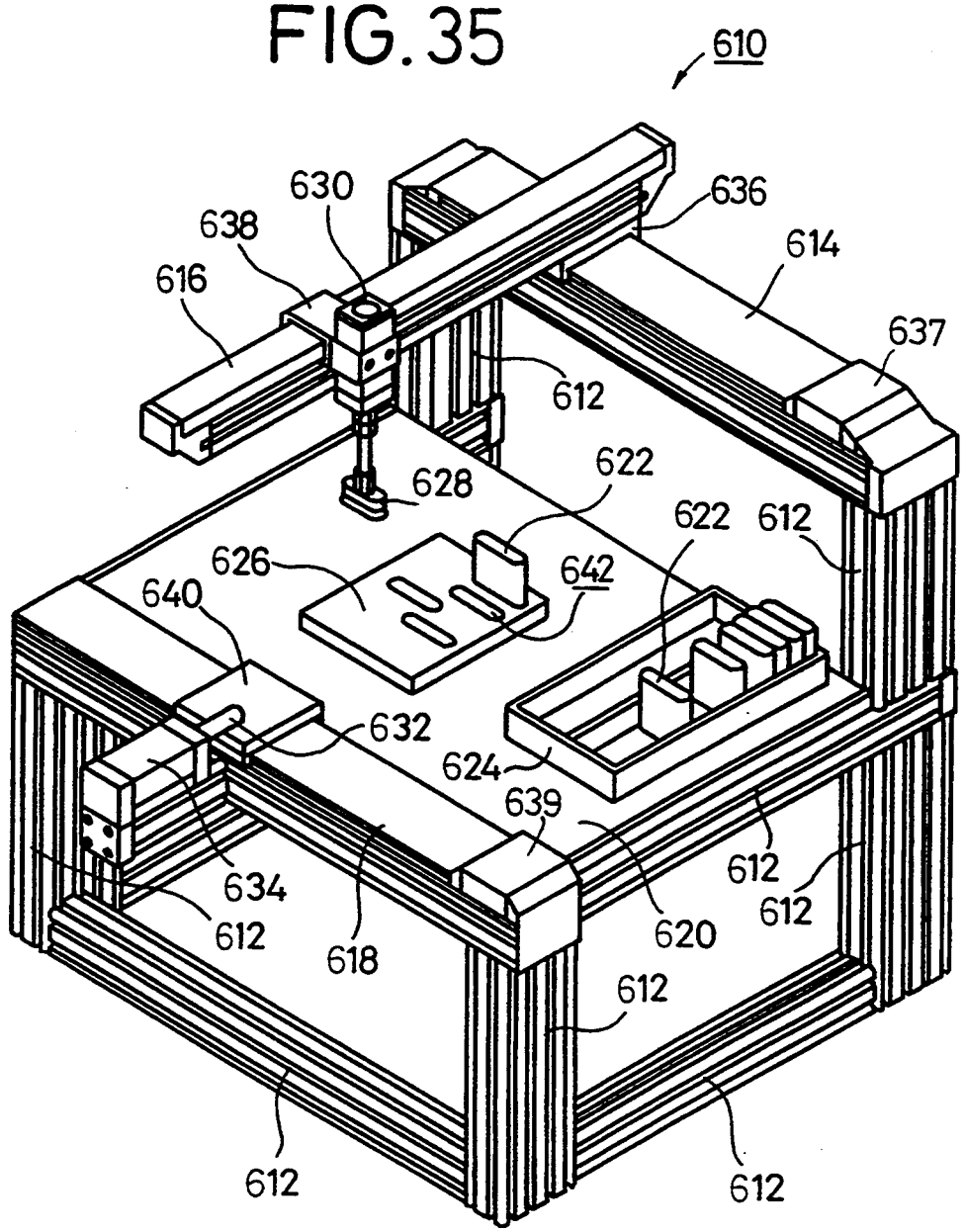
FIG. 35 is a perspective view showing a first assembly illustrative of an actuator arrangement.

As shown in FIG. 35, an actuator arrangement 610 illustrative of a first assembly comprises a plurality of beam members 612 which form a frame or skeleton, first through third actuators 614, 616, 618, a working table 620, a plurality of workpieces 622, a workpiece holding plate 624, sliders 636, 638, 640, a cylinder 630 connected with a suction pad 628 serving as a workpiece holding means, and a cylinder 634 having a cylinder rod 632 projecting therefrom.

The first actuator 614 is used to linearly move the second actuator 616 mounted on the upper surface of the slider 636. The slider 638 of the second actuator 616 connected with the first actuator 614 at a right angle is provided in continuation with the cylinder 630 to which the suction pad 628 has been connected. The slider 640 of the third actuator 618 is provided in continuation with the cylinder 634 and used to position a desired workpiece 622. Incidentally, a motor box 637 is placed in a connecting position between the first actuator 614 and the beam member 612, whereas a valve unit 639 is disposed in a connecting position between the third actuator 618 and the beam member 612.

The operation of the actuator arrangement will now be described. First of all, compressed air is supplied to the cylinder 630 coupled to the second actuator 616 through a fluid passage 652 in the beam member 612 to be described later. The cylinder rod of the cylinder 630 is displaced downward in accordance with the supply of the compressed air to the cylinder 630 to cause the suction pad 628 to attract and hold one of the workpieces 622 disposed in the workpiece holding plate 624. The compressed air is resupplied to the cylinder 630 to displace the cylinder rod in an upward direction. Under this condition, the slider 636 of the first actuator 614 is vertically moved to displace the second actuator 616 coupled to the slider 636 of the first actuator 614. When the workpiece 622 attracted and held by the suction pad 628 has approached a position above a desired position, the second actuator 616 stops moving. Then, the slider 638 of the second actuator 616 is horizontally moved to cause the workpiece 622 to be inserted in a desired hole 642 of the workpiece holding plate 626. At this time, the cylinder rod 632 of the third actuator 618 is displaced in such a manner that the workpiece 622 is reliably inserted in the hole 642 of the workpiece holding plate 626, thereby making it possible to accurately position the workpiece 622.

A description has been made of a case in which the actuator arrangement 610 illustrative of the first assembly is constructed in the form of a chair and the three actuators 614, 616, 618 are provided to convey the workpiece 622 to a desired position. However, a plurality of beam members 612 and actuators, etc. are combined together in variety to form a desired arrangement, thereby enabling workpieces to be fed in all directions including the upper and lower directions under the action of the arrangement.

Figure 36:
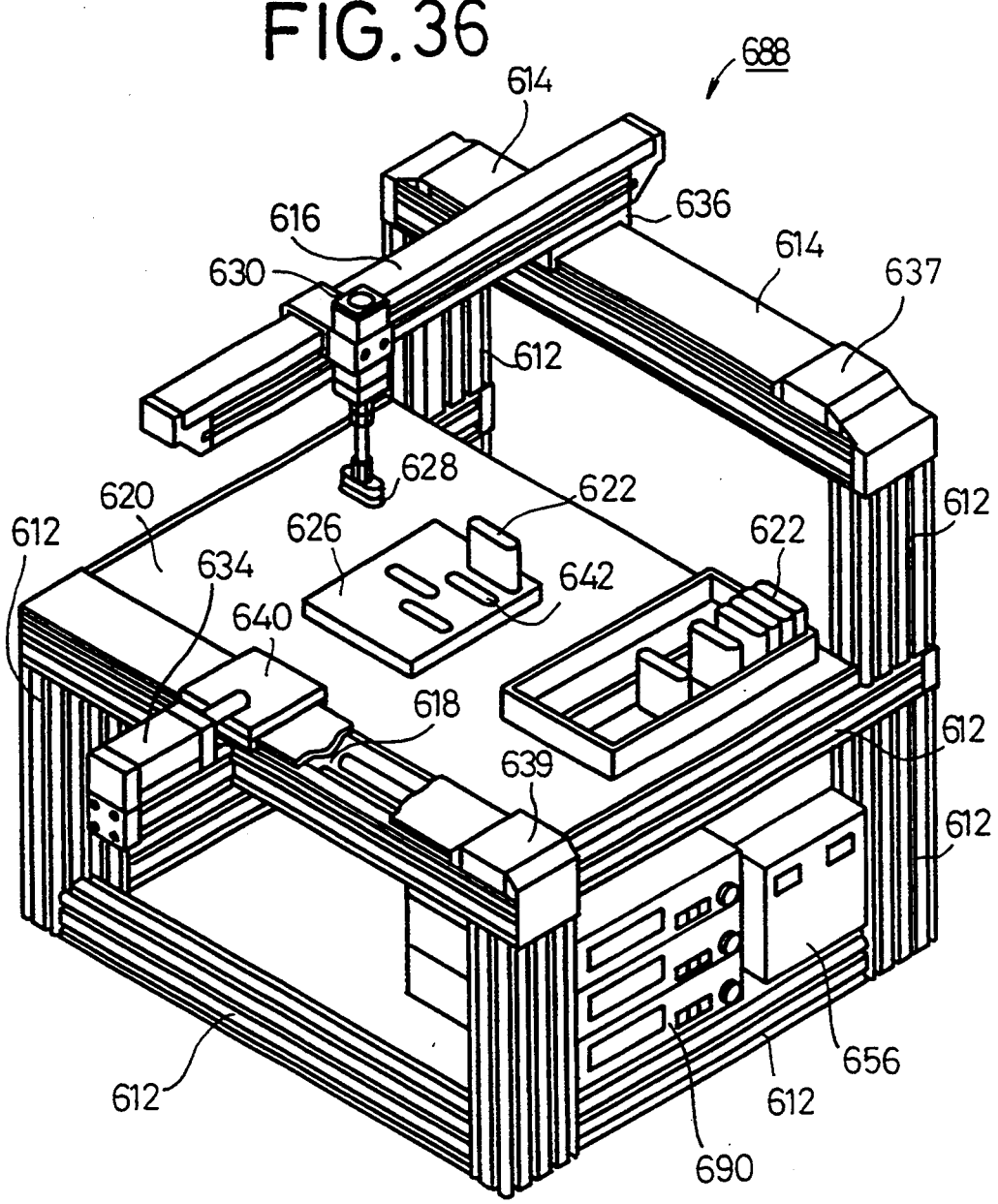
FIG. 36 is a perspective view showing a second assembly illustrative of an actuator arrangement.
Figure 37:
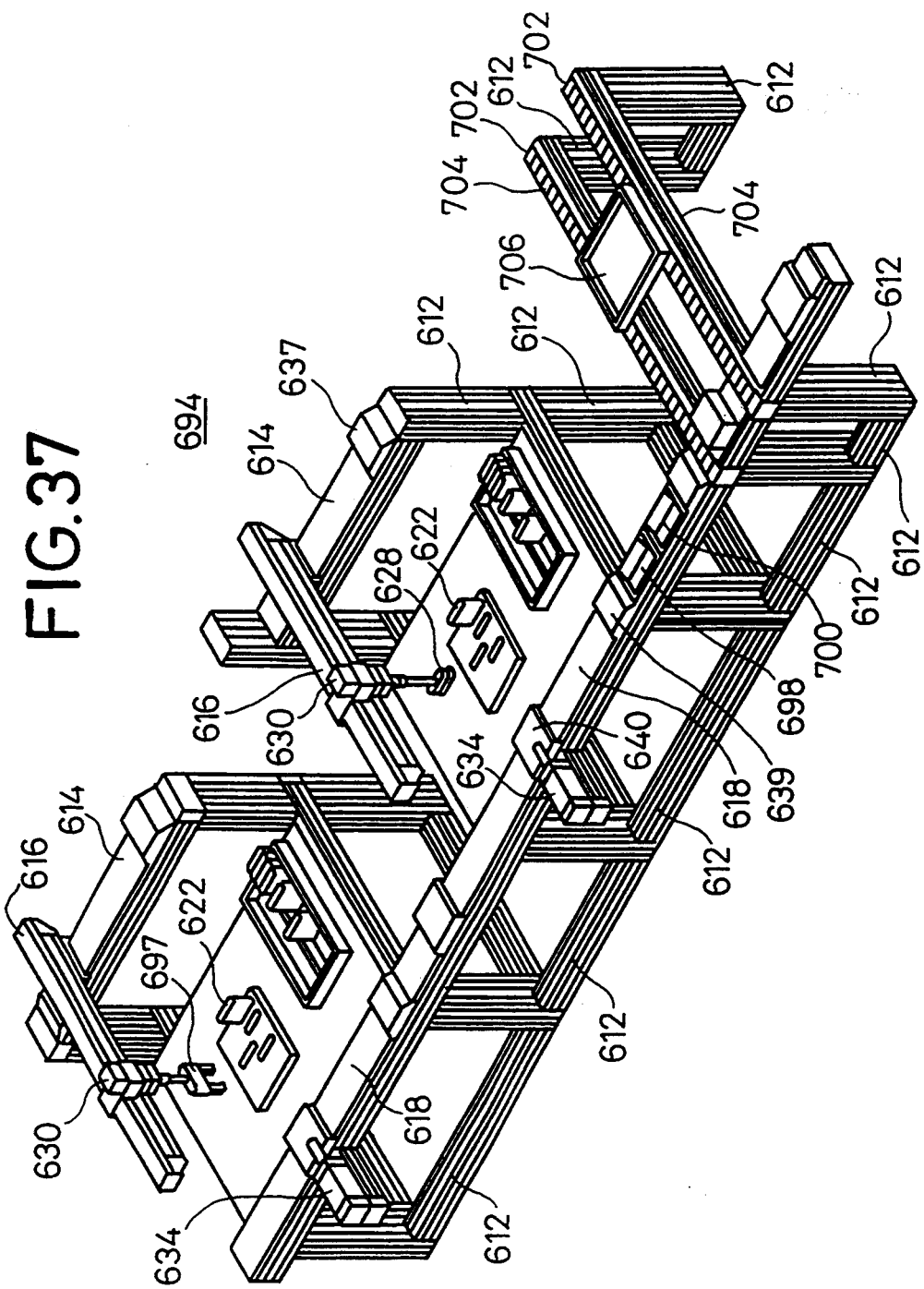
FIG. 37 is a perspective view showing a third assembly illustrative of an actuator arrangement.
Figure 38:
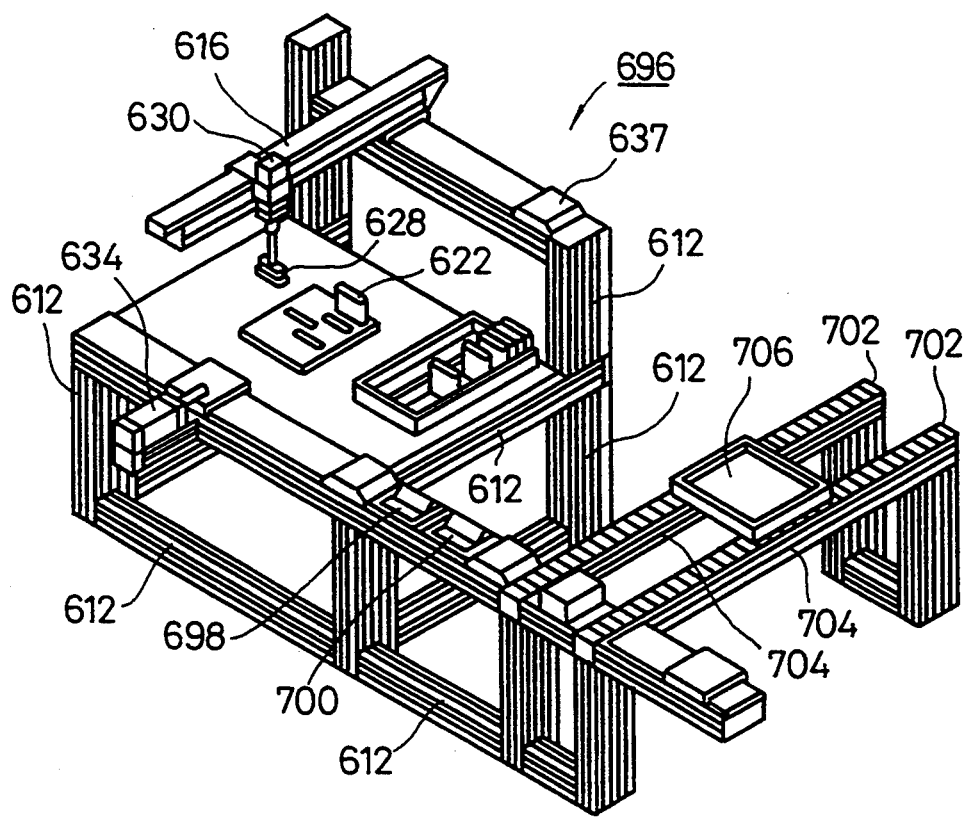
FIG. 38 is a perspective view showing a fourth assembly illustrative of an actuator arrangement.
Figure 39:
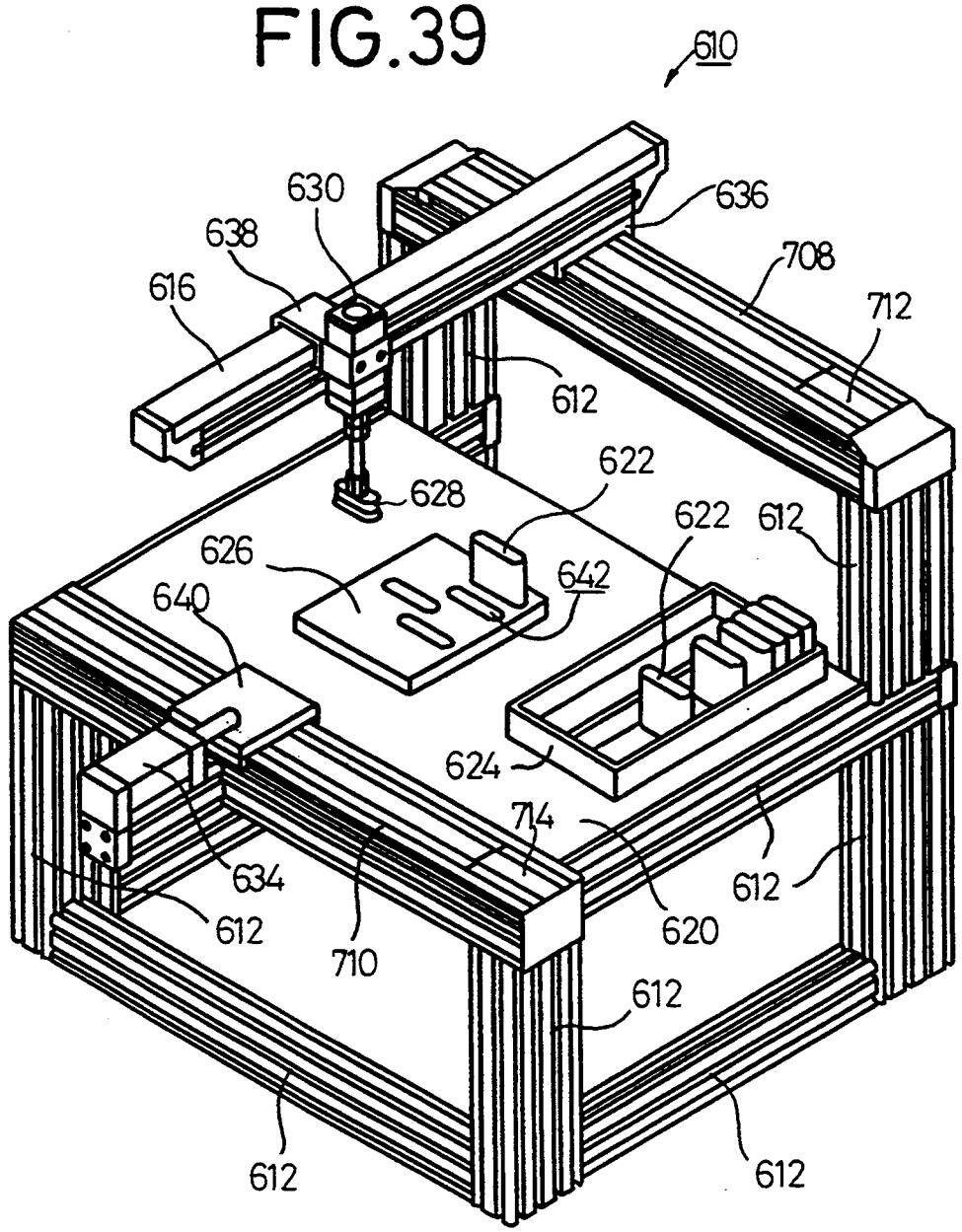
FIG. 39 is a perspective view illustrating the manner in which motor boxes of actuators shown in FIG. 35 have been flattened.
Figure 40:
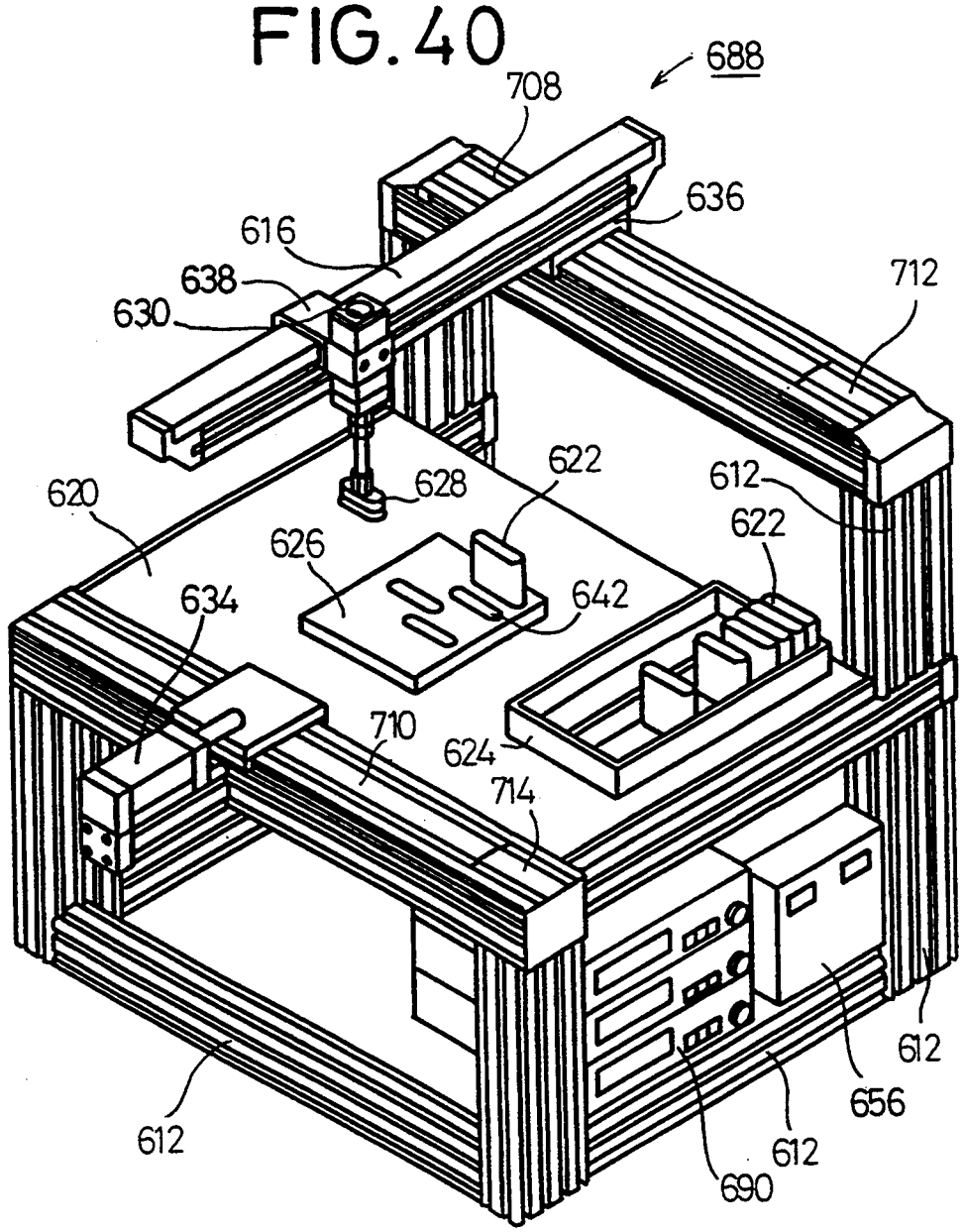
FIG. 40 is a perspective view showing the manner in which motor boxes of actuators shown in FIG. 36 have been flattened.
Figure 41:
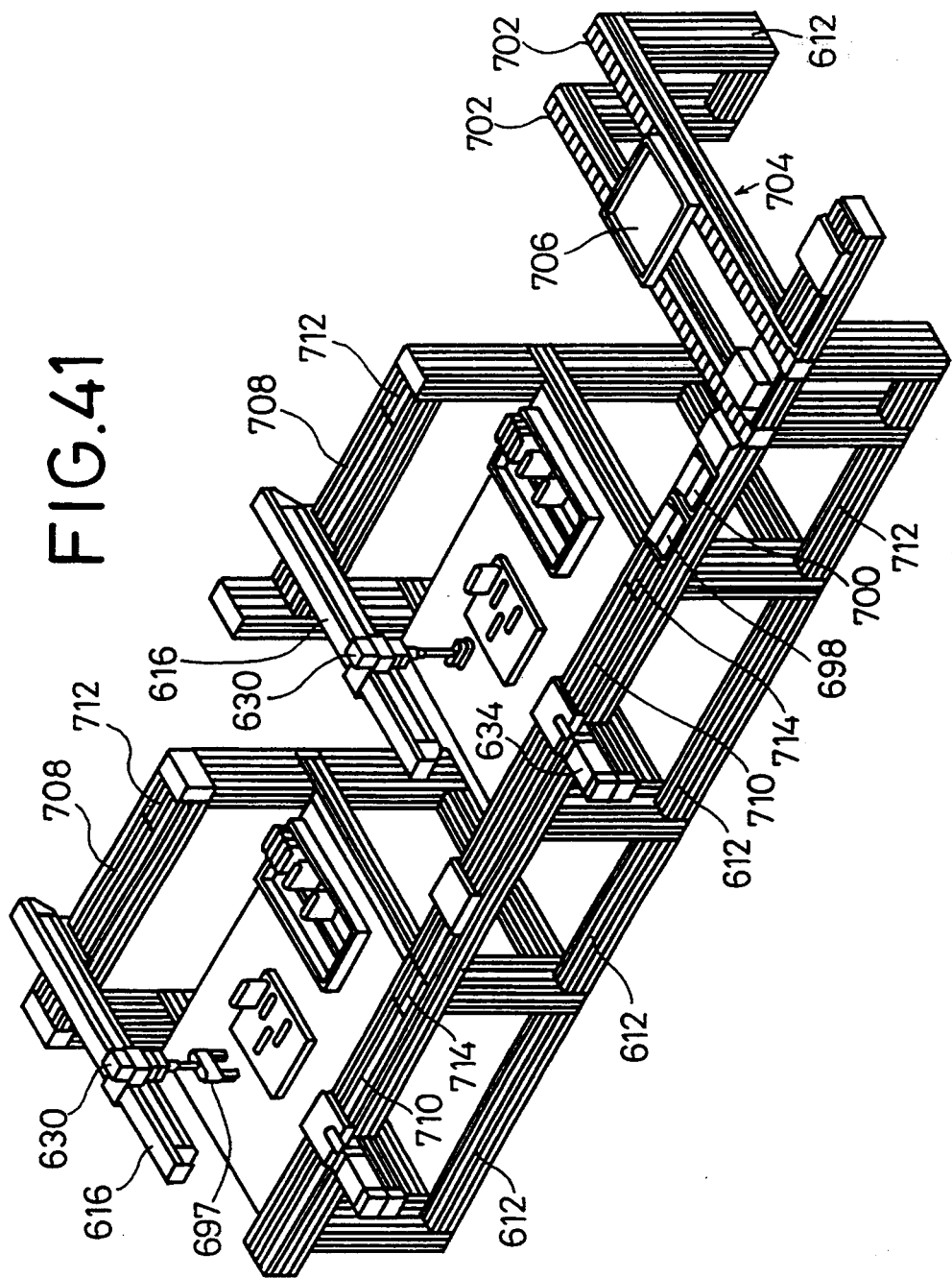
FIG. 41 is a perspective view illustrating the manner in which motor boxes of actuators shown in FIG. 37 have been flattened.
Figure 42:
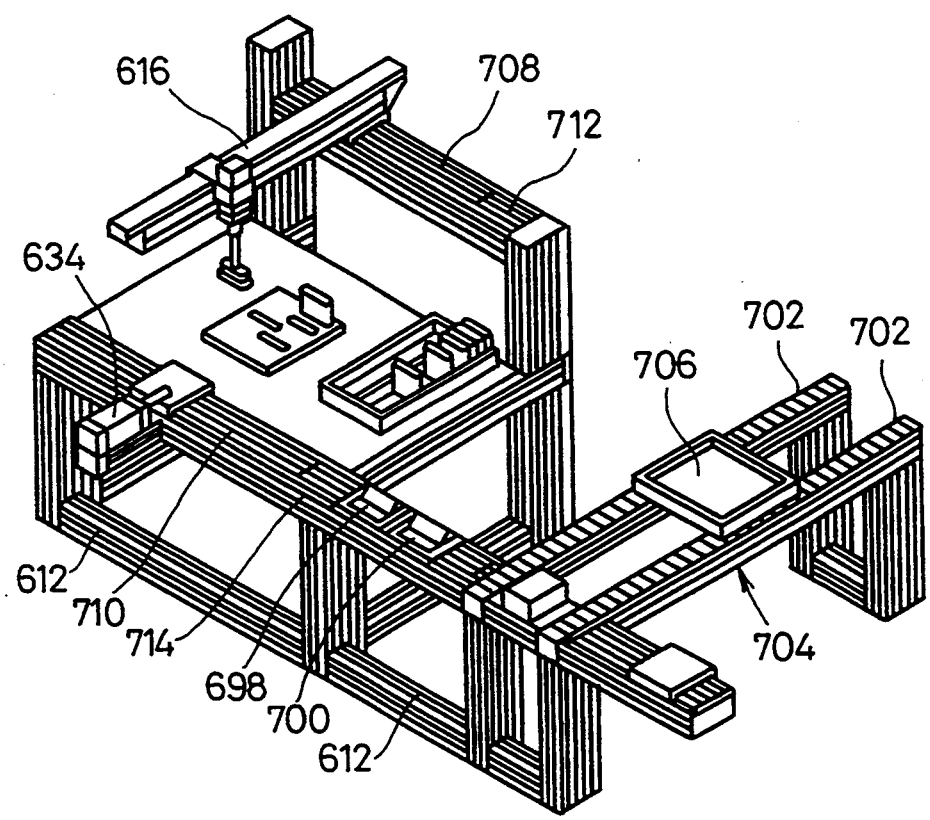
FIG. 42 is a perspective view showing the manner in which motor boxes of actuators shown in FIG. 38 have been flattened.

Similarly to FIG. 35, second through fourth assemblies illustrative of actuator arrangements will now be shown in FIGS. 36 through 38. Incidentally, components employed in the second through fourth assemblies, which are identical to those employed in the first assembly, are identified by like reference numerals, and their detailed description will therefore be omitted.

FIG. 36 shows the second assembly illustrative of an actuator arrangement 688. That is, FIG. 36 shows the manner in which a control box 690 for electrically-driven actuators and a controller 656 for a filter, a regulator and a lubricator have been attached to the first assembly shown in FIG. 35. Incidentally, a compressor, a dehumidifier, an aftercooler, etc., which are not shown, can also be integrally formed so as to be inserted in a block of each actuator. In this case, they are integrally formed or connected to one another by wiring within each beam member 612. In addition, suction devices such as a known compressor, a scroll compressor, etc. may also be used so as to circularly deliver vacuum pressure.

FIGS. 37 and 38 show third and fourth assemblies of actuator arrangements 694, 696. That is, FIGS. 37 and 38 each show the manner in which sequencers 698, 700 with programming boards, which serve as controllers for actuators, have been mounted on a beam member 612. In FIG. 37, a mechanical hand 697 is attached to the leading end of a cylinder 630. The sequencers 698, 700 are detachably mounted on the beam member 612. In addition, belt conveyor actuators 704 provided with endless belts 702 are continuously provided in the vicinity of the sequencers 698, 700. A plate 706 can be conveyed by the belt conveyor actuators 704. Incidentally, various signals such as electric signals, fluid pressure signals inputted to the sequencers 698, 700 shown in FIGS. 37 and 38 are transmitted through fluid passages 652 and electric signal paths 679, which are of internal paths of the actuators and the beam members 612. Incidentally, FIGS. 39 through 42 show actuator arrangements including actuators 708, 710 whose upper surfaces are rendered flush with the upper surfaces of the motor boxes 637, 639, the views corresponding to FIGS. 35 through 38. By placing the upper surfaces of the actuators 708, 710 and the upper surfaces of the motor boxes 712, 714 into the same plane, the actuator arrangements can be brought into compact shapes and the beam members can be easily assembled.

In order to enable an actuator arrangement to be placed on a production line in a factory, an actuator according the present invention is constructed in the following manner. That is, grooves having substantially T-shaped cross sections are defined in respective outer sides of a frame. Thus, other frames or actuators or the like can be connected to one another by using the grooves. Alternatively, the grooves can be used not only for attachment of panels or the like, but for fixing of wires, tubes, etc. Therefore, the above actuator arrangement can be constructed by combining other frames or the like with the present actuators as needed. In the so-constructed actuator arrangement, a slider base can be moved in the longitudinal direction of the frame by loosening a fixing bolt serving as a connecting member, thereby making it possible to position the actuator at a position suitable for an assembly operation.

Slider bases 18a, 18b shown in FIG. 43 can be accommodated in an elongated frame 720 having the same length as the overall length of the slider bases 18a, 18b (see FIG. 43). Therefore, an actuator can be reduced in size and weight by providing a plurality of sliders in the frame having the same length as the overall length of the sliders.

Further, when trouble is developed in the actuator or when it is desired to maintain and check the actuator, only the slider bases can be detached from the frame. Therefore, the workability can be improved and the slider bases can be easily replaced by spare slider bases. It is thus possible to greatly reduce the time required to stop the assembled actuator arrangement from operating.

Figure 44A:
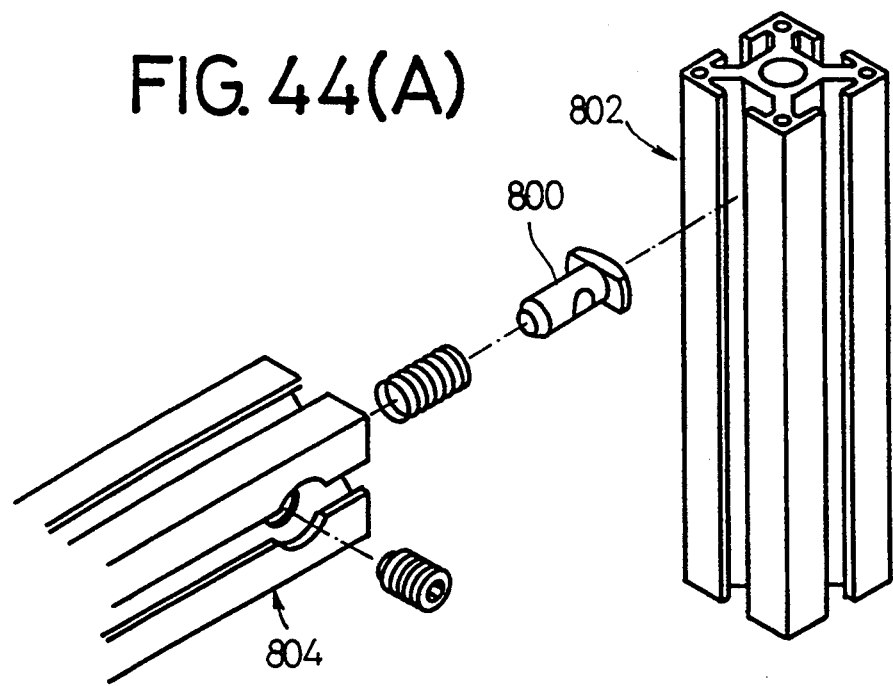
FIGS. 44(A), 44(B) and 44(C) are perspective views showing reinforcing members.
Figure 44B:
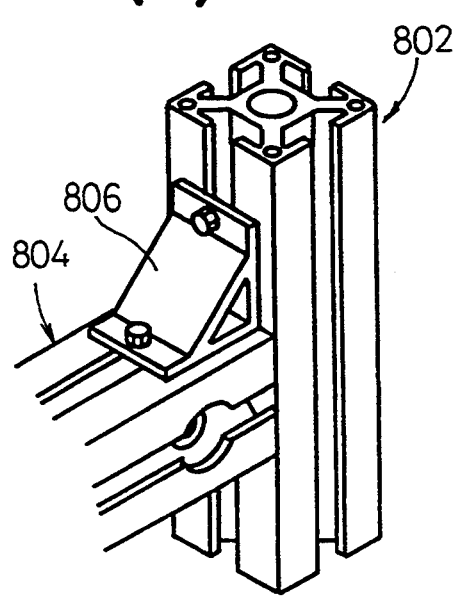
Figure 44C:
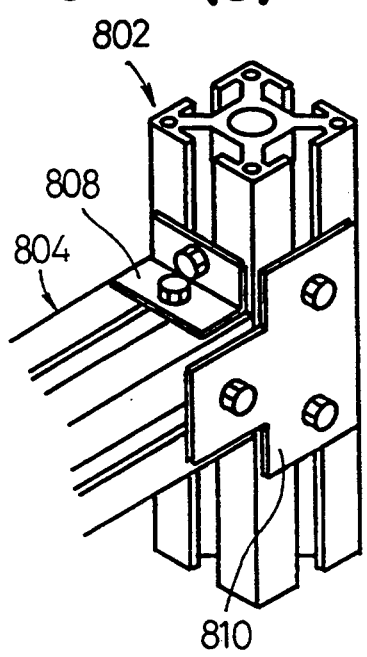

In the present embodiments, the plural bolts 572 are used as means used for connecting the frames and the actuators or the like to each other (see FIG. 33). However, a frame 802 and a frame 804 may be connected to each other by using a single bolt 800 as shown in FIG. 44(A). In order to supplement or compensate for lack or shortage in the strength of connection between the frames 802 and 804, reinforcing members 806, 808, 810 are used as shown in FIGS. 44(B) and 44(C), thereby making it possible to make a further increase in the strength of connection between the frames 802 and 804.

The actuators and the actuator arrangements according to the present invention can bring about the following advantageous effects.

That is, a concave portion of a frame can be substantially flattened by accommodating a drive source and a slider in the concave portion thereof and closing the concave portion by a cover. Thus, other beam members or actuators or the like are connected to one another by using grooves having substantially T-shaped cross sections, which are defined in respective outer sides of the frame, so as to assemble an actuator arrangement having a desired shape, thereby making it possible to place the so-assembled actuator arrangement on a production line in a factory. When the slider held in the frame is moved back and forth within the concave portion under the action of a driving force transmitting means, the slider can be stably displaced because it is supported by a supporting means. Since the actuator has the outer sides shaped substantially in a flat manner, spaces can be effectively used. It is also possible to assemble a desired actuator arrangement corresponding to a limited space.

Further, even after an actuator has been temporarily positioned and set up so as to feed a workpiece to a desired position, a mounting means for connecting a frame and a slide base to each other can be displaced so as to readjust or change the shift position of a slider disposed in the slider base. In addition, the slider base can be easily detached from the frame, thereby making it possible to maintain and check it.

Furthermore, a reduction in working spaces and the feeding of a workpiece in all directions can be carried out by connecting a plurality of beam members or actuators to one another so as to assemble a desired actuator arrangement. Accordingly, a plurality of CIM (Computer-Integrated Manufacturing) type working units can be easily used in a factory.

Having now fully described the invention, it will be apparent to those skilled in the art that many changes and modifications can be made without departing from the spirit or scope of the invention as set forth herein.

What is claimed is:

1. An actuator comprising:
   a beam member;
   a drive source held in said beam member;
   a slider base held in said beam member and having a slider displaced along said beam member under the action of said drive source; and
   a cover covering said drive source and said slider base held in said beam member;
   said beam member having at least one groove which enables other beam members to be mounted therewith, said groove being defined in at least an outer side of said beam member along a longitudinal direction thereof in a substantially identical structure to the other beam members;
   said slider base comprising a base plate, said base plate having connecting members thereon detachably connecting an end block and a connecting block thereto; and
   wherein said drive source is disposed between said connecting block and said end block, such that said drive source is removably disposed within said beam member.

2. An actuator according to claim 1, wherein said drive source comprises an electric drive motor connected to said connecting block on one side thereof, and a ball screw disposed between said connecting block and said end block, said ball screw being operatively connected to said drive motor, wherein said slider is moved by turning said ball screw.

3. An actuator according to claim 1, wherein said connecting block comprises a valve block, and said drive source comprises a rodless cylinder disposed between said valve block and said end block, said valve block having a plurality of solenoid controlled valves controlling a flow of air to said rodless cylinder, wherein said slider is moved by supplying air to said rodless cylinder.

4. An assembly apparatus constructed from a plurality of beam members connected together in a frame, and including a plurality of actuator modules disposed at respective positions around a work table, each of said actuator modules comprising:
   a beam member;
   a drive source held in said beam member;
   a slider base held in said beam member and having a slider displaced along said beam member under the action of said drive source; and
   a cover covering said drive source and said slider base held in said beam member;
   said beam members each having at least one groove which enables said beam members to be mounted to other beam members of said work table and said actuator modules, said groove being defined in at least an outer side of said beam members along the longitudinal direction thereof in a substantially identical structure to the other beam members.

5. An assembly apparatus according to claim 4, further comprising a control mechanism controlling said plurality of actuator modules disposed integrally with said assembly table.

6. An assembly table according to claim 4, wherein said actuator modules comprise:
   a first actuator having a first slider mounted thereon so as to move in a first horizontal direction (X);
   a second actuator mounted on said first slider, said second actuator having a second slider mounted thereon so as to move in a second horizontal direction (Y) substantially perpendicular to said first horizontal direction;
   a cylinder mounted on said second slider, said cylinder having a manipulator mounted thereon so as to move in a vertical direction (Z) substantially perpendicular to said first and second horizontal directions, whereby said manipulator is movable in three orthogonal directions (X,Y,Z); and
   a conveyor connected to said assembly table, said conveyor conveying workpieces operated on at said assembly table to a subsequent station.

7. An assembly apparatus according to claim 4, further comprising a control mechanism controlling said plurality of actuator modules disposed integrally with said worktable.

8. An assembly table according to claim 4, wherein said actuator modules comprise:
   a first actuator having a first slider mounted thereon so as to move in a first horizontal direction (X);
   a second actuator mounted on said first slider, said second actuator having a second slider mounted thereon so as to move in a second horizontal direction (Y) substantially perpendicular to said first horizontal direction;
   a cylinder mounted on said second slider, said cylinder having a manipulator mounted thereon so as to move in a vertical direction (Z) substantially perpendicular to said first and second horizontal directions, whereby said manipulator is movable in three orthogonal directions; and
   a conveyor connected to said assembly table, said conveyor conveying workpieces operated on at said assembly table to a subsequent station.

9. An assembly apparatus including a plurality of beam members connected together in a frame and a plurality of actuator modules disposed at respective positions around a worktable, each of said actuator modules comprising:
   a beam member;
   a drive source held in said beam member, said drive source comprising at least one of an electric motor and a rodless cylinder;
   a slider base held in said beam member and having a slider displaced along said beam member under the action of said drive source; and
   a cover covering said drive source and said slider base held in said beam member;
   said beam members each having at least one groove which enables said beam members to be mounted to other beam members of said worktable and said actuator modules, said groove being defined in at least an outer side of said beam members along the longitudinal direction thereof in a structure substantially identical to the other beam members; and
   a control mechanism integrally disposed on said assembly apparatus, and control mechanism supplying at least one of electric power and air to said actuator modules and controlling movement of said slider.

10. An assembly apparatus constructed from a plurality of beam members connected together in a frame, and including a plurality of actuator modules disposed at respective positions around a worktable, each of said actuator modules comprising:
- a beam member;
- a drive source held in said beam member, said drive source comprising at least one of an electric motor and a rodless cylinder;
- a slider base held in said beam member and having a slider displaced along said beam member under the action of said drive source; and
- a cover covering said drive source and said slider base held in said beam member;
- said beam members each having at least one groove which enables said beam members to be mounted to other beam members of said worktable and said actuator modules, said groove being defined in at least one outer side of said beam members along the longitudinal direction thereof in a structure substantially identical to the other beam members; and
- a control mechanism integrally disposed on said assembly apparatus, said control mechanism supplying at least one of electric power and air to said actuator modules and controlling movement of said slider.

* * * * *